US007203660B1

(12) United States Patent  
Majeed

(10) Patent No.: US 7,203,660 B1
(45) Date of Patent: Apr. 10, 2007

(54) APPARATUS, SYSTEM, AND METHOD FOR DYNAMIC DEMAND REPORTING AND AFFECTATION

(75) Inventor: Michael Majeed, Stamford, CT (US)

(73) Assignee: priceline.com Incorporated, Norwalk, CT (US)

( * ) Notice: Subject to any disclaimer, the term of this patent is extended or adjusted under 35 U.S.C. 154(b) by 798 days.

(21) Appl. No.: 09/829,488

(22) Filed: Apr. 9, 2001

(51) Int. Cl.
*G06F 17/30* (2006.01)
(52) U.S. Cl. .......................................... 705/27; 705/26
(58) Field of Classification Search ............. 705/26–27
See application file for complete search history.

(56) References Cited

U.S. PATENT DOCUMENTS

| | | | | |
|---|---|---|---|---|
| 5,794,207 | A | * | 8/1998 | Walker et al. .................. 705/1 |
| 5,897,620 | A | * | 4/1999 | Walker et al. .................. 705/5 |
| 6,041,308 | A | * | 3/2000 | Walker et al. ................. 705/14 |
| 2001/0044788 | A1 | * | 11/2001 | Demir et al. ............... 705/400 |

OTHER PUBLICATIONS

PRI: "Priceline.com to personalize customer experience with Prime@Vantage.com software from Prime Response, Inc.," Business Wire, Jul. 27, 1999, Proquest #43465854, 3pgs.*
PRI: "Prime Response and Information Advantage offer integrated marketing automation application for direct marketers," Business Wire, Dec. 14, 1998, Proquest #37091556, 3pgs.*
IQS: "IQ Software announces Eureka! for enterprise reporting," Business Wire, Sep. 22, 1998, Proquest #34473030, 3pgs.*
Brio Technology; "Brio Technology reports record second quarter revenues and earnings," M2 Presswire, Oct. 22, 1999, Proquest # 45785434, 2pgs.*

Navigant: "Navigant International launches unique Internet-accessible, intuitive reporting platform," PR Newswire, Jan. 18, 2001, Proquest #66886472, 5pgs.*
De Marco, Donna; "Travelers go online to make their vacation arrangements," Washington Times, Apr. 3, 2000, Proquest #52162893, 6pgs.*
Brio Technology; "Next Wave in Business Intelligence," Internet Archive Wayback Machine (www.archive.org); www.brio.com; Mar. 3,4, 2000; 17 pgs.*

(Continued)

*Primary Examiner*—Robert M. Pond
(74) *Attorney, Agent, or Firm*—Walter G. Hanchuk; Chadbourne & Parke LLP

(57) ABSTRACT

An apparatus, system, and method for dynamic demand monitoring and/or affectation uniquely allows a provider to access, utilize and/or integrate demand setting, reporting, and updating into a commerce system. In one non-limiting example embodiment, the present disclosure teaches a facility that responds to a user's selection of criteria in a user interface and dynamically constructs queries that will select information collected in a commerce database and generate reports of demand for goods or services based on the user's selections. The present disclosure also teaches how reported demand levels may be used to change current levels of demand to desired demand levels specified by a user. Furthermore, the present disclosure teaches how to create and utilize a cache of rejected CPOs. As a result, a provider may affect demand for their provisions to desired levels and both providers and consumers may benefit from a better balance of price levels with demand. Also, providers and consumers may benefit from executions of transactions that may otherwise expire upon initial processing.

69 Claims, 45 Drawing Sheets

OTHER PUBLICATIONS

Brio Technology; "Brio One," Internet Archive Wayback Machine (www.archive.org); www.brio.com; Aug. 15, 2000, 4 pgs.*

Brio Technology; "Brio.Impact," Internet Archive Wayback Machine (www.archive.org); www.brio.com; Aug. 15, 2000, 4 pgs.*

"Brio introduces Impact 4.5 revenue process optimization application for the enterprise," PR Newswire, Jun. 29, 2000; Proquest #55632043, 3pgs.*

Hjermstad, Megan; "Navigant offers web reports," Business Travel News, Jan. 29, 2001, v18i2pg1, Proquest #68129990, 4pgs.*

Tyo, Jay; "The web of reports," InformationWeek, May 18, 1998, Proquest #29689904, 11 pgs.*

Informatica: "Informatica and Brio accelerate deployment of data warehousing solutions on Microsoft SQL Server," PR Newswire, Jun. 17, 1998, Proquest #30251028, 4pgs.*

WO 99/57658, "System and Method for updating a multi-dimensional database," Nov. 11, 1999.*

EP 1081611, "Query engine and method of querying data using metadata model," Mar. 7, 2001.*

* cited by examiner

Start-Travel Date ▶
End-Travel Date ▶

Select Date Range
Jan ▲ 1 ▲ 1999 ▲
Jan ▲ 1 ▲ 1999 ▲
○ Sale Date ○ Travel Date
7720
7701

Select Date Range
Month     Year
Jan ▲     2000 ▲
ALL ▲     ALL ▲
7721
7702

Region Selection
7723  World Area Codes
☒ Domestic     0
☐ International  100  7703b
                 200
              ☒ ALL
7703

Market Selection
7704b
☒ All Markets
7704

Top Psgr Segments
○ Top 50    ○ Top 250
○ Top 100   ⊙ ALL
7705

Aircraft Types
717
727
737 7706b  ☒ All Jets
747         ☒ All Non-Jets
757
7722
7706

O&D Selection
7707b  ○ Origin
       ○ Dest.
☒ All O&Ds
7707

US Carriers    Foreign Carriers
AA ▼    AC ▼
CO 7708b  AF 7708c
DL ▲    AM ▲
☐ ALL   ☐ ALL
7708

Flight Number(s)    Service Class
        F
7709b   J  7709c
        D
☐ ALL   ☐ ALL
7709

Time-Hour
0
1  7710b   ○ Departure
2          ○ Arrival
☐ All Times
7710

Data Items
☐ Total Passengers
☐ RPMs
☐ ASMs
☐ Facilitator Load Factor
☐ Stage Length (miles)
☐ Segment Yield
☐ Segment RASM
☐ Select All
7713

| FIG.7A |
|--------|
| FIG.7B |

DSF-Facilities
FIG.7

FIG.7A

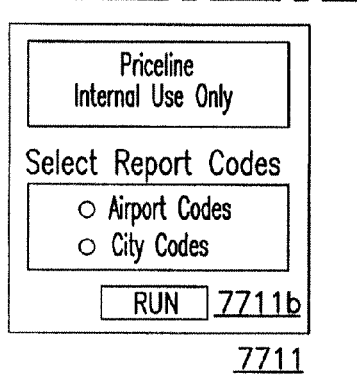
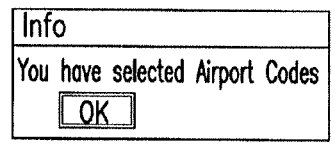
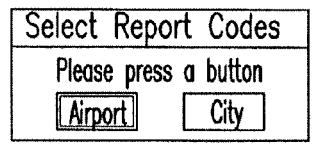
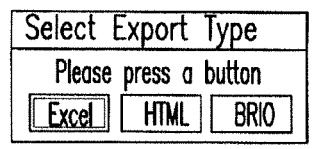
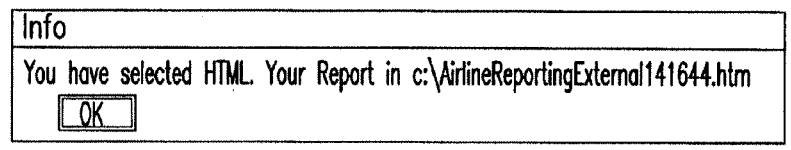
FIG.7B

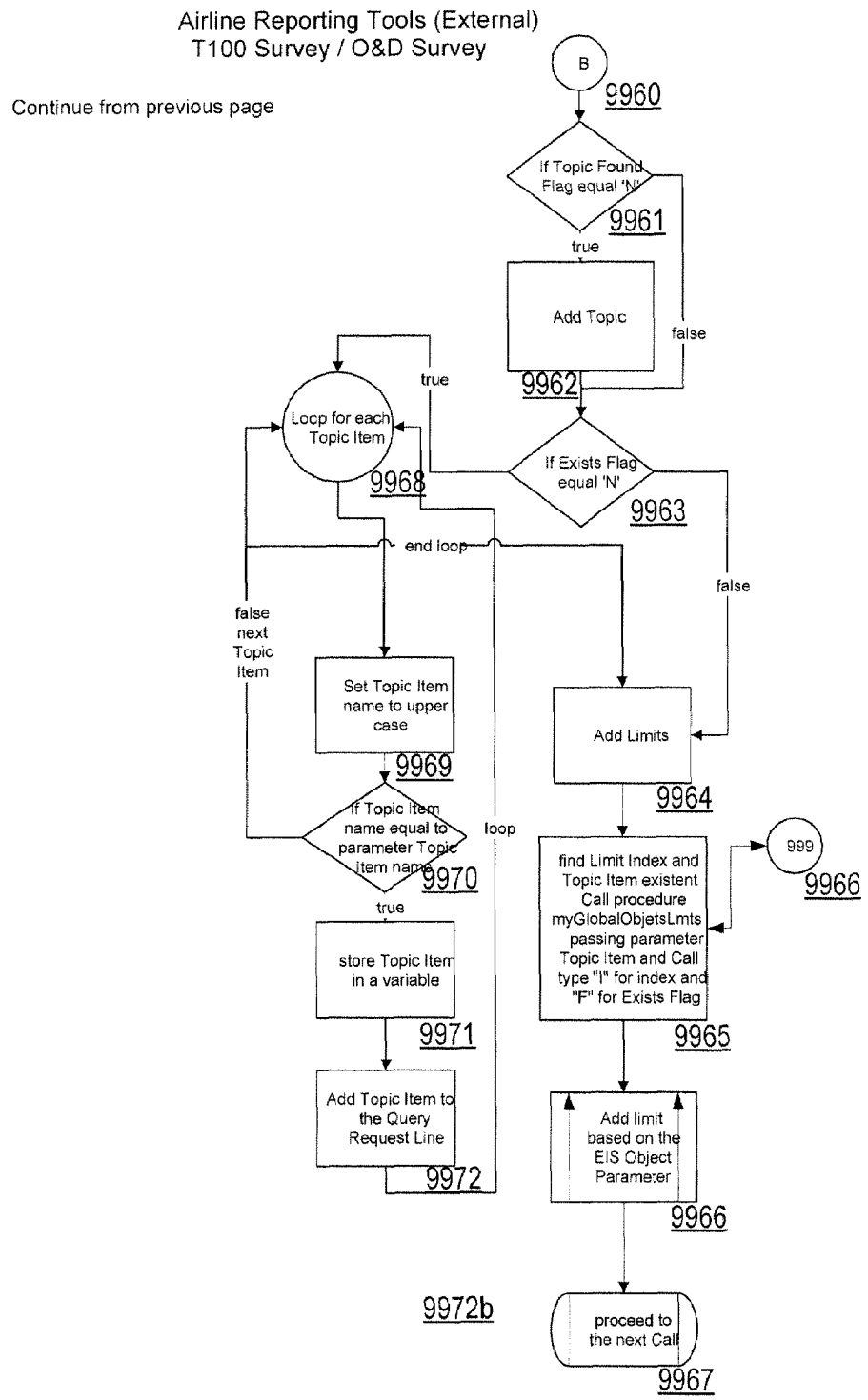
Figure 9B2

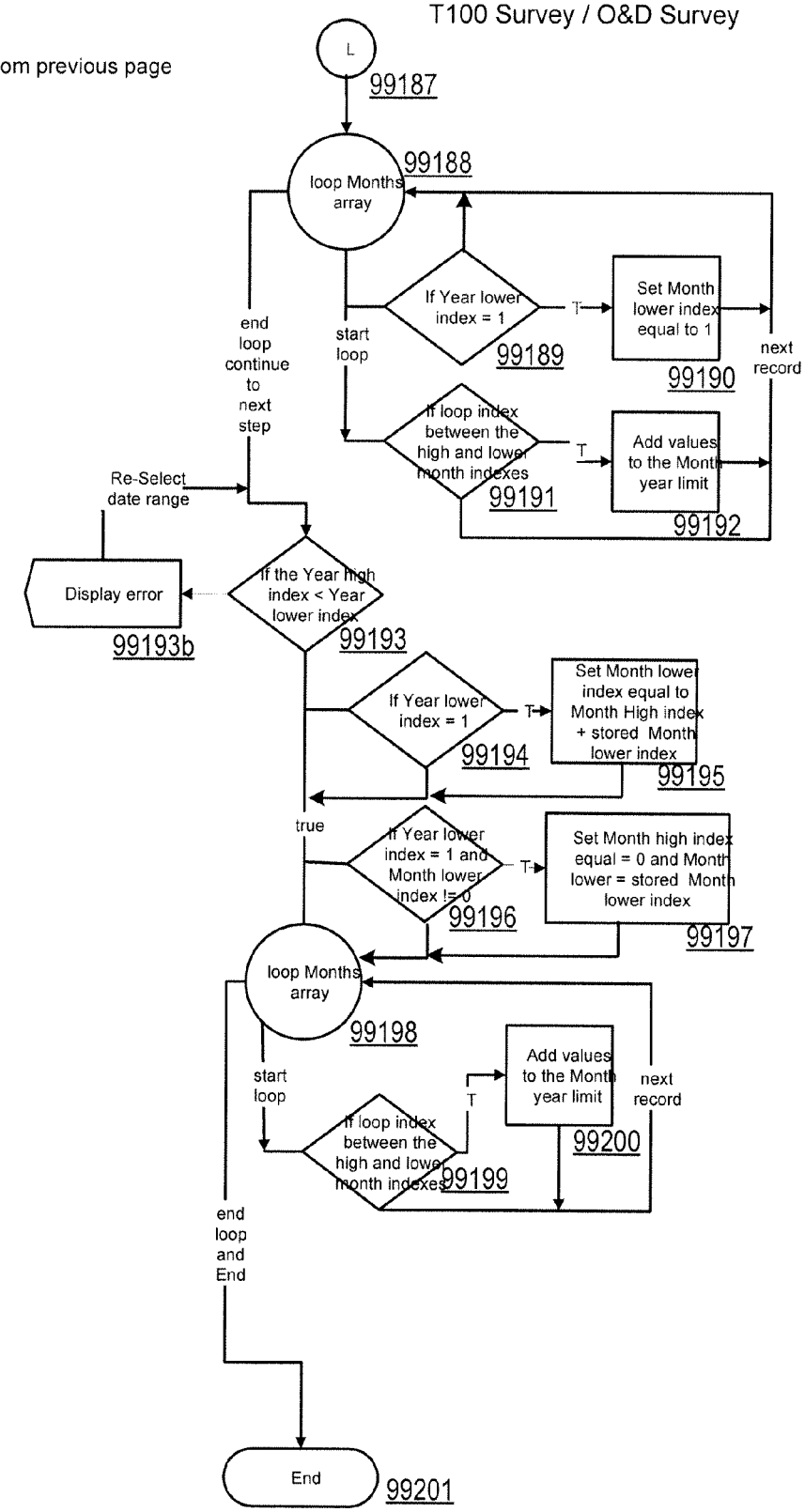
Figure 9L2

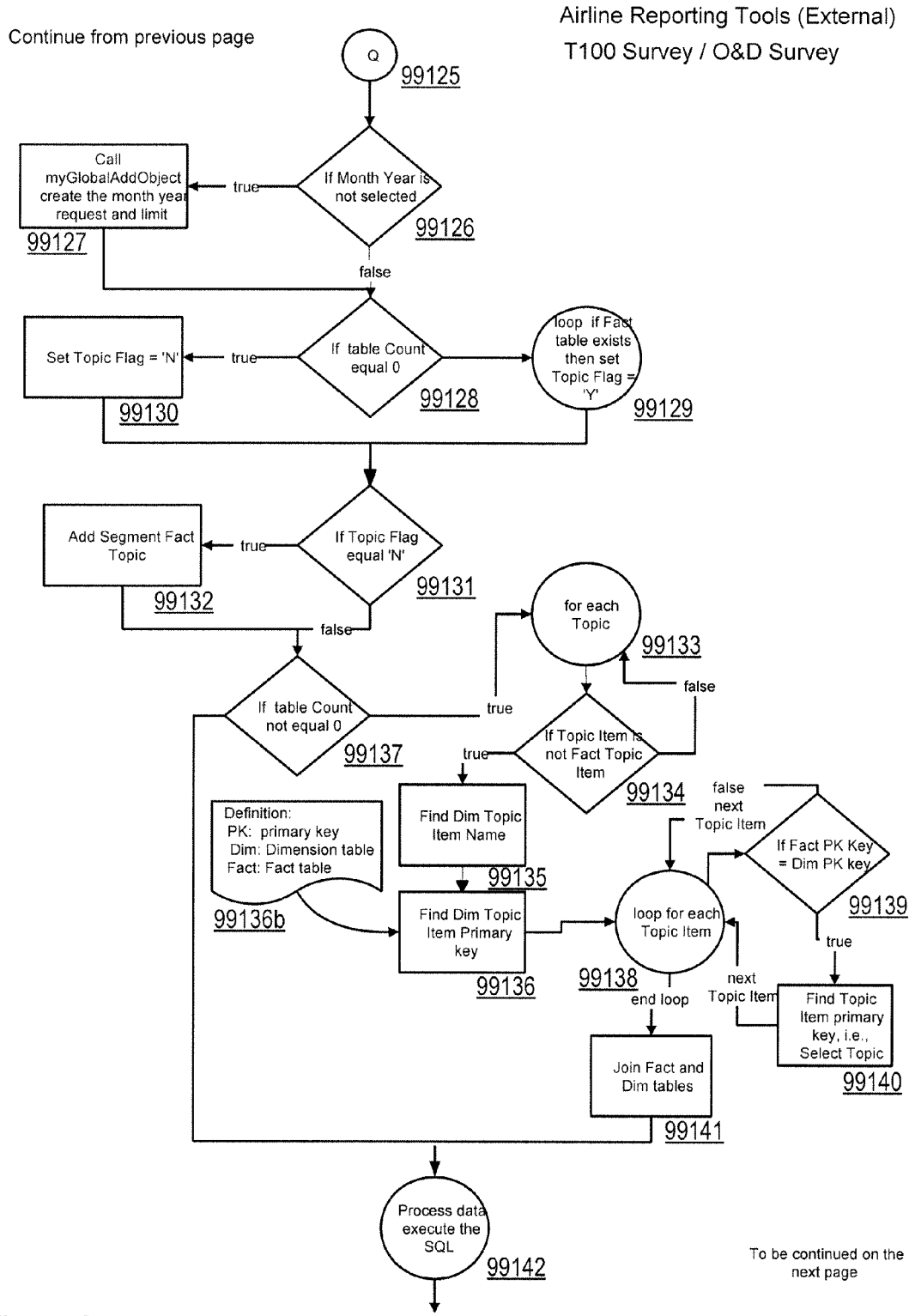
Figure 9Q2

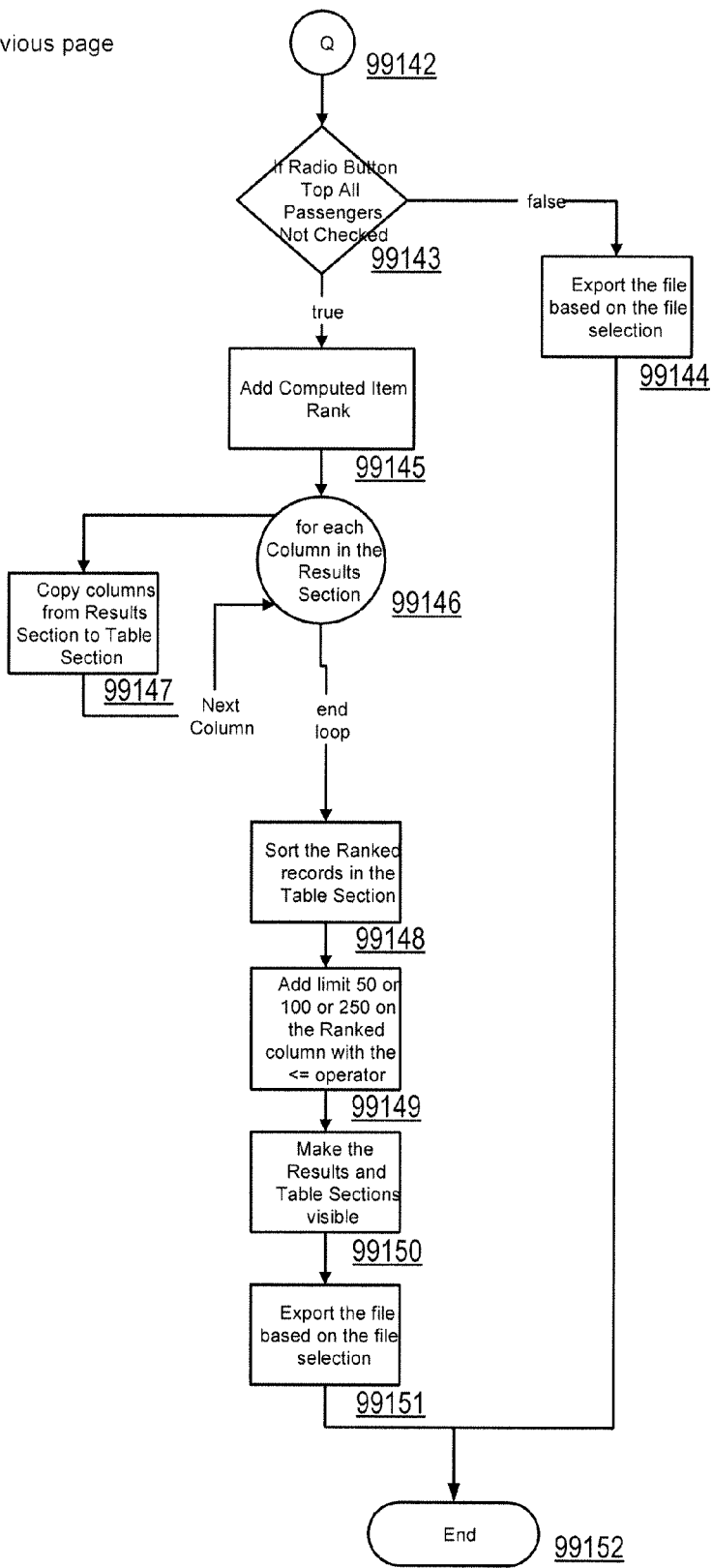
Figure 9Q3

Demand Survey Facility Flow Continued
Airline Reporting Tools (External)
T100 Survey / O&D Survey
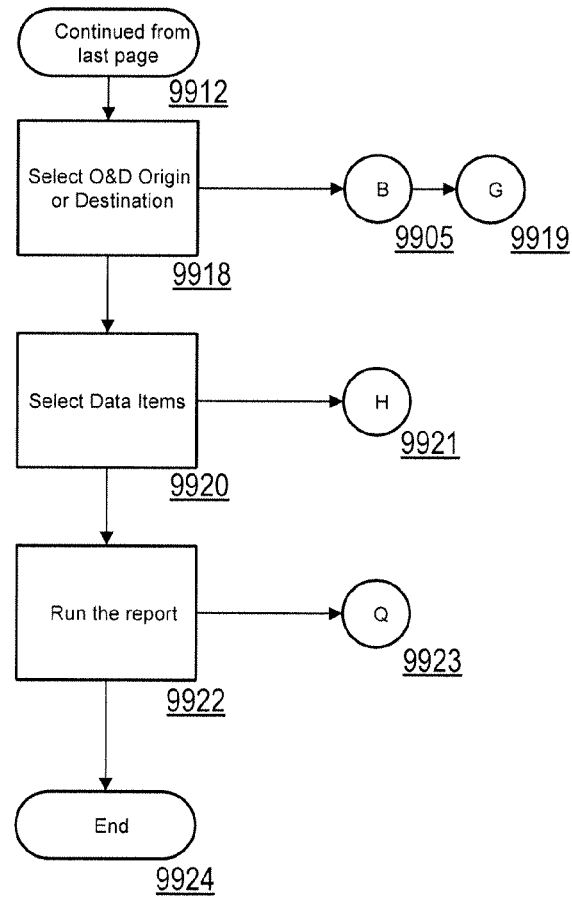
Figure 9Z2

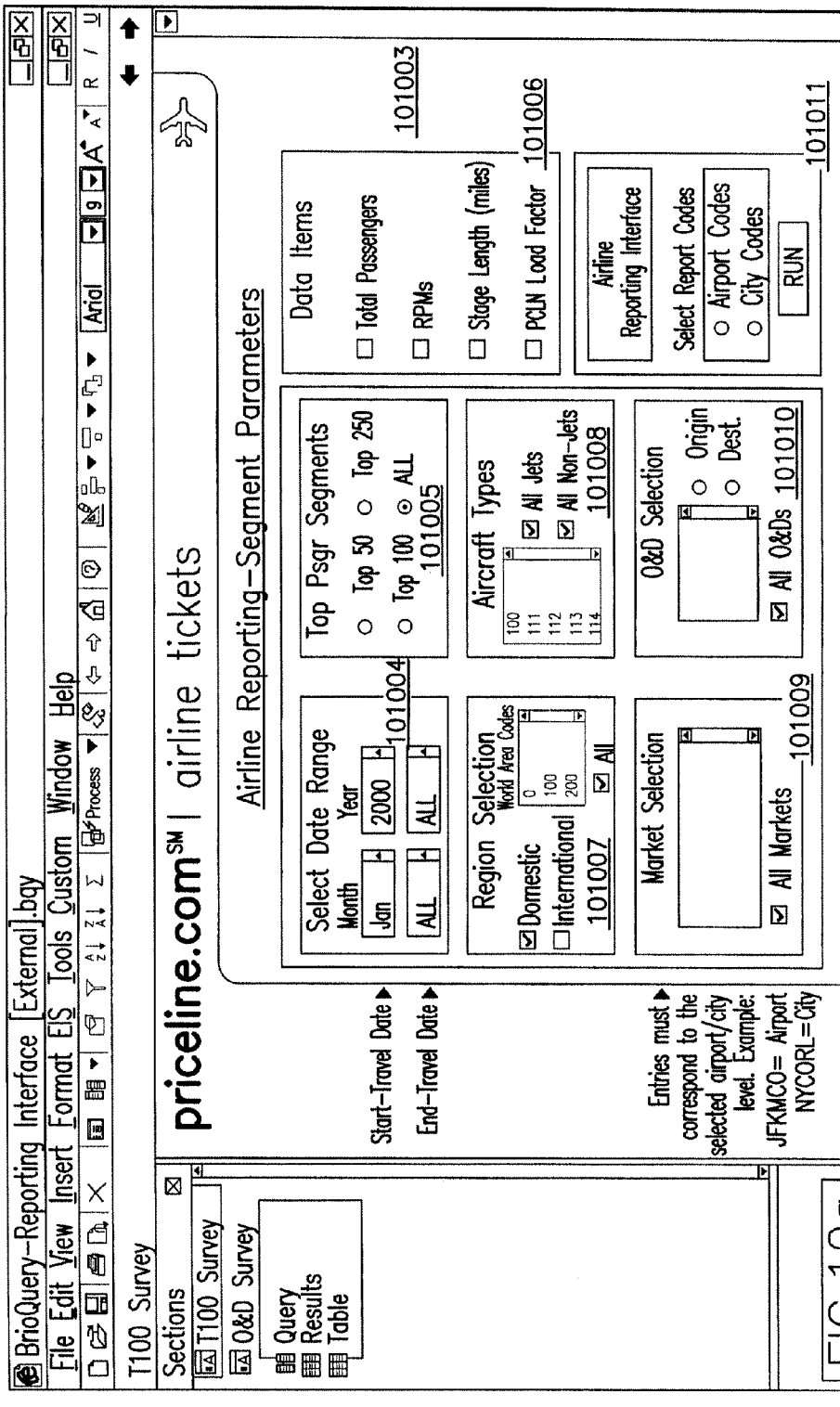

FIG. 12a

DSR Generation Interactions

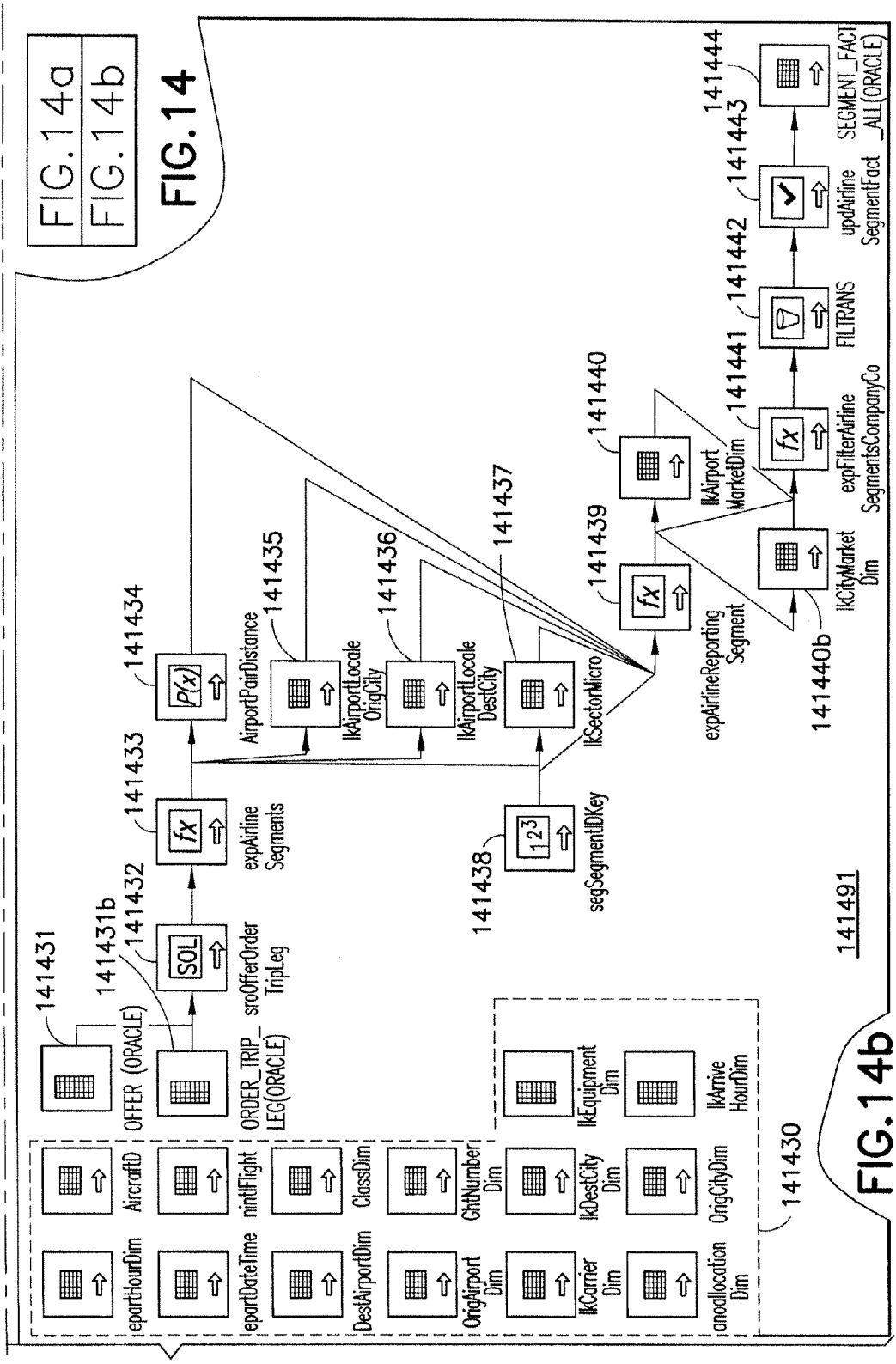

priceline.com℠ | airline tickets

Airline Reporting—O&D Parameters

161601

Start-Travel Date ▲

End-Travel Date ▲

Select Date Range
Jan 1 1999
Jan 1 1999
○ Sale Date  ○ Travel Date

Region Selection
World Area Codes
0
100
200
□ Domestic
□ International
□ ALL

Market Selection
□ All Markets

Top Psgr Segments
○ Top 50  ○ Top 250
○ Top 100  ○ ALL

Time-Hour
0
1
2
○ Departure
○ Arrival
□ All Times

O&D Selection
○ Origin
○ Dest.
□ All O&Ds

US Carriers
AA
CO
DL
HA
HP
J
NW
TW
□ ALL

Foreign Carriers
AC
AF
AM
EI
FI
IB
LH
LY
□ ALL

Data Items
□ Total Passengers
□ RPMs
□ Distance (miles)
□ O&D Average Fare
□ O&D Average Fare
□ PCLN Revenue
□ PCLN Cost
□ PCLN Margin
□ Select All

Priceline Internal Use Only

Select Report Codes
○ Airport Codes
○ City Codes

RUN

Demand Cache Range    Time till expiration 161602

Entries must ▲ correspond to the selected airport/city level. Example:
JFKMCO= Airport
NYCOL=City

FIG.16

Setting Demand Requirement

Demand Survey Report in HTML

Page 1 of 1

| Dom Intl Flight Type | Jet Flag | Airport Market | Orig Airport Code | Dest Airport Code | Month Year | PAX | RPMs | |
|---|---|---|---|---|---|---|---|---|
| D | N | PITCLE | PIT | CLE | Feb2000 | 272 | 28,914.8784 | ( |
| D | N | CLEPIT | CLE | PIT | Feb2000 | 266 | 28,277.0502 | ( |
| D | N | BUFCLE | BUF | CLE | Feb2000 | 232 | 44,337.7752 | 1 |
| D | N | EWRBWI | EWR | BWI | Feb2000 | 231 | 39,051.7743 | 1 |
| D | N | CLEDTW | CLE | DTW | Feb2000 | 225 | 21,394.17 |  |
| D | N | DFWOKC | DFW | OKC | Feb2000 | 218 | 38,355.2906 | 1 |
| D | N | PFNATL | PFN | ATL | Feb2000 | 217 | 53,698.2775 | 1 |
| D | N | OKCDFW | OKC | DFW | Feb2000 | 214 | 37,651.5238 | 1 |
| D | N | BWIEWR | BWI | EWR | Feb2000 | 213 | 36,008.7789 |  |
| D | N | DTWCLE | DTW | CLE | Feb2000 | 205 | 19,492.466 |  |
| D | N | CLECMH | CLE | CMH | Feb2000 | 193 | 21,806.0471 | ( |
| D | N | SFOSMF | SFO | SMF | Feb2000 | 191 | 16,379.1286 | ( |
| D | N | SMFSFO | SMF | SFO | Feb2000 | 187 | 16,036.1102 | ( |
| D | N | ATLPFN | ATL | PFN | Feb2000 | 185 | 45,779.6375 | ( |
| D | N | TULDFW | TUL | DFW | Feb2000 | 182 | 43,220.177 | 1 |
| D | N | CMHCLE | CMH | CLE | Feb2000 | 182 | 20,563.2154 | ( |
| D | N | IAHDFW | IAH | DFW | Feb2000 | 170 | 38,227.747 | 1 |
| D | N | DFWTUL | DFW | TUL | Feb2000 | 156 | 37,045.866 | 1 |
| D | N | ILMATL | ILM | ATL | Feb2000 | 151 | 56,981.1637 | 3 |
| D | N | ROAATL | ROA | ATL | Feb2000 | 150 | 53,599.065 | 2 |
| D | N | MIARSW | MIA | RSW | Feb2000 | 146 | 16,810.075 | ( |
| D | N | ICTDFW | ICT | DFW | Feb2000 | 143 | 47,094.9336 | 2 |
| D | N | DFWICT | DFW | ICT | Feb2000 | 141 | 46,436.2632 | 2 |
| D | N | ATLGNV | ATL | GNV | Feb2000 | 138 | 41,551.8966 | 2 |
| D | N | BOSJFK | BOS | JFK | Feb2000 | 134 | 25,126.1524 | 1 |
| D | N | DFWIAH | DFW | IAH | Feb2000 | 133 | 29,907.5903 | 1 |
| D | N | SANLAX | SAN | LAX | Feb2000 | 132 | 14,474.9088 | ( |
| D | N | ATLILM | ATL | ILM | Feb2000 | 130 | 49,056.631 | 2 |
| D | N | MIAEYW | MIA | EYW | Feb2000 | 130 | 16,493.984 | ( |
| D | N | ATLCRW | ATL | CRW | Feb2000 | 125 | 45,465.7625 | 2 |
| D | N | DFWHOU | DFW | HOU | Feb2000 | 125 | 30,932.025 | 2 |
| D | N | RSWMIA | RSW | MIA | Feb2000 | 123 | 14,161.9125 | ( |
| D | N | CLEBUF | CLE | BUF | Feb2000 | 123 | 23,506.6653 | 1 |
| D | N | SEAPDX | SEA | PDX | Feb2000 | 121 | 15,718.5776 |  |
| D | N | CRWATL | CRW | ATL | Feb2000 | 121 | 44,010.8581 | 2 |
| D | N | EYWMIA | EYW | MIA | Feb2000 | 118 | 14,971.4624 | 1 |
| D | N | SLCGJT | SLC | GJT | Feb2000 | 118 | 25,512.7682 | 1 |
| D | N | JFKBOS | JFK | BOS | Feb2000 | 115 | 21,563.489 | 1 |
| D | N | RAPDEN | RAP | DEN | Feb2000 | 114 | 34,447.2888 | 2 |
| D | N | PITJFK | PIT | JFK | Feb2000 | 114 | 38,650.959 | 2 |
| D | N | ATLMYR | ATL | MYR | Feb2000 | 113 | 35,780.6138 | 2 |
| D | N | ATLDHN | ATL | DHN | Feb2000 | 113 | 19,308.5134 | 1 |
| D | N | LAXSAN | LAX | SAN | Feb2000 | 111 | 12,172.0824 |  |
| D | N | GJTSLC | GJT | SLC | Feb2000 | 110 | 23,783.089 | 1 |
| D | N | DENRAP | DEN | RAP | Feb2000 | 110 | 33,238.612 | 2 |
| D | N | DHNATL | DHN | ATL | Feb2000 | 108 | 18,454.1544 | 1 |
| D | N | HOUDFW | HOU | DFW | Feb2000 | 108 | 26,725.2696 | 1 |
| D | N | BTVEWR | BTV | EWR | Feb2000 | 106 | 28,156.9708 | 2 |
| D | N | MHTEWR | MHT | EWR | Feb2000 | 104 | 21,743.0304 | 1 |
| D | N | PHLEWR | PHL | EWR | Feb2000 | 103 | 8,361.54 | ( |
| D | N | PVDEWR | PVD | EWR | Feb2000 | 103 | 16,393.5109 | 1 |

222201 file://C:\Program Files\Brio\Dev\Reporting interface □(external)_Table.htm       10/9/00

Figure 22

DEMAND SURVEY REPORT IN EXCEL

| DOM INTL FLIGHT TYPE | JET FLAG | AIRPORT MARKET | ORIG AIRPORT CODE | DEST AIRPORT CODE | MONTH YEAR | PAX | RPMs | MILES | PCLN LOAD FACTOR | TOP MARKET |
|---|---|---|---|---|---|---|---|---|---|---|
| D | N | PITCLE | PIT | CLE | FEB2000 | 272 | 28,914.8784 | 85.98174 | 0.05242 | 1 |
| D | N | CLEPIT | CLE | PIT | FEB2000 | 266 | 28,277.0502 | 85.52333 | 0.05116 | 2 |
| D | N | BUFCLE | BUF | CLE | FEB2000 | 232 | 44,337.7752 | 141.68582 | 0.03432 | 3 |
| D | N | EWRBWI | EWR | BWI | FEB2000 | 231 | 39,051.7743 | 126.60851 | 0.03139 | 4 |
| D | N | CLEDTW | CLE | DTW | FEB2000 | 225 | 21,394.17 | 72.26475 | 0.03713 | 5 |
| D | N | DFWOKC | DFW | OKC | FEB2000 | 218 | 38,355.2906 | 140.43053 | 0.03208 | 6 |
| D | N | PFNATL | PFN | ATL | FEB2000 | 217 | 53,698.2775 | 185.87821 | 0.02017 | 7 |
| D | N | OKCDFW | OKC | DFW | FEB2000 | 214 | 37,651.5238 | 136.47814 | 0.03323 | 8 |
| D | N | BWIEWR | BWI | EWR | FEB2000 | 213 | 36,008.7789 | 120.6404 | 0.03197 | 9 |
| D | N | DTWCLE | DTW | CLE | FEB2000 | 205 | 19,492.466 | 75.1405 | 0.0398 | 10 |
| D | N | CLECMH | CLE | CMH | FEB2000 | 193 | 21,806.0471 | 83.71405 | 0.03369 | 11 |
| D | N | SFOSMF | SFO | SMF | FEB2000 | 191 | 16,379.1286 | 61.95882 | 0.04194 | 12 |
| D | N | SMFSFO | SMF | SFO | FEB2000 | 187 | 16,036.1102 | 61.44982 | 0.04229 | 13 |
| D | N | ATLPFN | ATL | PFN | FEB2000 | 185 | 45,779.6375 | 183.2531 | 0.02046 | 14 |
| D | N | TULDFW | TUL | DFW | FEB2000 | 182 | 43,220.177 | 174.84313 | 0.0357 | 15 |
| D | N | CMHCLE | CMH | CLE | FEB2000 | 182 | 20,563.2154 | 86.91131 | 0.0321 | 15 |
| D | N | IAHDFW | IAH | DFW | FEB2000 | 170 | 38,227.747 | 170.63596 | 0.03993 | 17 |
| D | N | DFWTUL | DFW | TUL | FEB2000 | 156 | 37,045.866 | 181.14966 | 0.03389 | 18 |
| D | N | ILMATL | ILM | ATL | FEB2000 | 151 | 56,981.1637 | 302.38677 | 0.03365 | 19 |
| D | N | ROAATL | ROA | ATL | FEB2000 | 150 | 53,599.065 | 293.00822 | 0.02674 | 20 |
| D | N | MIARSW | MIA | RSW | FEB2000 | 146 | 16,810.075 | 83.59298 | 0.02557 | 21 |
| D | N | ICTDFW | ICT | DFW | FEB2000 | 143 | 43,094.9336 | 262.54694 | 0.03791 | 22 |
| D | N | DFWICT | DFW | ICT | FEB2000 | 141 | 46,436.2632 | 259.26388 | 0.03841 | 23 |
| D | N | ATLGNV | ATL | GNV | FEB2000 | 138 | 41,551.8966 | 211.64325 | 0.02178 | 24 |

FIG.23A

| | | | | | | | | |
|---|---|---|---|---|---|---|---|---|
| D | N | BOSJFK | BOS | JFK | FEB2000 | 134 | 25,126.1524 | 134.33452 | 0.04274 | 25 |
| D | N | DFWIAH | DFW | IAH | FEB2000 | 133 | 29,907.5903 | 175.83749 | 0.03875 | 26 |
| D | N | SANLAX | SAN | LAX | FEB2000 | 132 | 14,474.9088 | 85.56678 | 0.03817 | 27 |
| D | N | ATLILM | ATL | ILM | FEB2000 | 130 | 49,056.631 | 296.08144 | 0.03177 | 28 |
| D | N | MIAEYW | MIA | EYW | FEB2000 | 130 | 16,493.984 | 97.59754 | 0.02715 | 28 |
| D | N | ATLCRW | ATL | CRW | FEB2000 | 125 | 45,465.7625 | 276.43184 | 0.03987 | 30 |
| D | N | DFWHOU | DFW | HOU | FEB2000 | 125 | 30,932.025 | 201.92426 | 0.03249 | 30 |
| D | N | RSWMIA | RSW | MIA | FEB2000 | 123 | 14,161.9125 | 87.99126 | 0.02376 | 32 |
| D | N | CLEBUF | CLE | BUF | FEB2000 | 123 | 23,506.6653 | 144.49864 | 0.03381 | 32 |
| D | N | SEAPDX | SEA | PDX | FEB2000 | 121 | 15,718.5776 | 91.256 | 0.04314 | 34 |
| D | N | CRWATL | CRW | ATL | FEB2000 | 121 | 44,010.8581 | 264.52807 | 0.04167 | 34 |
| D | N | EYWMIA | EYW | MIA | FEB2000 | 118 | 14,971.4624 | 101.07135 | 0.02615 | 36 |
| D | N | SLCGJT | SLC | GJT | FEB2000 | 118 | 25,512.7682 | 163.07357 | 0.04018 | 36 |
| D | N | JFKBOS | JFK | BOS | FEB2000 | 115 | 21,563.489 | 145.11535 | 0.03906 | 38 |
| D | N | RAPDEN | RAP | DEN | FEB2000 | 114 | 34,447.2888 | 241.20524 | 0.04041 | 39 |
| D | N | PITJFK | PIT | JFK | FEB2000 | 114 | 38,650.959 | 288.48438 | 0.03582 | 39 |
| D | N | ATLMYR | ATL | MYR | FEB2000 | 113 | 35,780.6138 | 212.96316 | 0.02253 | 41 |
| D | N | ALTDHN | ALT | DHN | FEB2000 | 113 | 19,308.5134 | 143.65328 | 0.02952 | 41 |
| D | N | LAXSAN | LAX | SAN | FEB2000 | 111 | 12,172.0824 | 87.9243 | 0.03714 | 43 |
| D | N | GJTSLC | GJT | SLC | FEB2000 | 110 | 23,783.089 | 169.03683 | 0.03876 | 44 |
| D | N | DENRAP | DEN | RAP | FEB2000 | 110 | 33,238.612 | 241.73536 | 0.04032 | 44 |
| D | N | DHNATL | DHN | ATL | FEB2000 | 108 | 18,454.1544 | 142.39317 | 0.0303 | 46 |
| D | N | HOUDFW | HOU | DFW | FEB2000 | 108 | 26,725.2696 | 199.33972 | 0.03227 | 46 |
| D | N | BTVEWR | BTV | EWR | FEB2000 | 106 | 28,156.9708 | 213.00663 | 0.02643 | 48 |

| FIG.23A |
|---|
| FIG.23B |

Demand Survey Report in Brio

| Dom Intl Fl | Jet Flag | Airport Mar | Orig Airpor | Dest Airpo | Month Yea | PAX | RPMs | Miles | Pcln Load | TopMarket |
|---|---|---|---|---|---|---|---|---|---|---|
| D | N | PITCLE | PIT | CLE | Feb-00 | 272 | 28,914.88 | 85.98174 | 0.05242 | 1 |
| D | N | CLEPIT | CLE | PIT | Feb-00 | 266 | 28,277.05 | 85.52333 | 0.05116 | 2 |
| D | N | BUFCLE | BUF | CLE | Feb-00 | 232 | 44,337.78 | 141.6858 | 0.03432 | 3 |
| D | N | EWRBWI | EWR | BWI | Feb-00 | 231 | 39,051.77 | 126.6085 | 0.03139 | 4 |
| D | N | CLEDTW | CLE | DTW | Feb-00 | 225 | 21,394.17 | 72.26475 | 0.03713 | 5 |
| D | N | DFWOKC | DFW | OKC | Feb-00 | 218 | 38,355.29 | 140.4305 | 0.03208 | 6 |
| D | N | PFNATL | PFN | ATL | Feb-00 | 217 | 53,698.28 | 185.8782 | 0.02017 | 7 |
| D | N | OKCDFW | OKC | DFW | Feb-00 | 214 | 37,651.52 | 136.4781 | 0.03323 | 8 |
| D | N | BWIEWR | BWI | EWR | Feb-00 | 213 | 36,008.78 | 120.6404 | 0.03197 | 9 |
| D | N | DTWCLE | DTW | CLE | Feb-00 | 205 | 19,492.47 | 75.1405 | 0.0398 | 10 |
| D | N | CLECMH | CLE | CMH | Feb-00 | 193 | 21,806.05 | 83.71405 | 0.03369 | 11 |
| D | N | SFOSMF | SFO | SMF | Feb-00 | 191 | 16,379.13 | 61.95882 | 0.04194 | 12 |
| D | N | SMFSFO | SMF | SFO | Feb-00 | 187 | 16,036.11 | 61.44982 | 0.04229 | 13 |
| D | N | ATLPFN | ATL | PFN | Feb-00 | 185 | 45,779.64 | 183.2523 | 0.02046 | 14 |
| D | N | TULDFW | TUL | DFW | Feb-00 | 182 | 43,220.18 | 174.8431 | 0.0357 | 15 |
| D | N | CMHCLE | CMH | CLE | Feb-00 | 182 | 20,563.22 | 86.91131 | 0.0321 | 15 |
| D | N | IAHDFW | IAH | DFW | Feb-00 | 170 | 38,227.75 | 170.636 | 0.03993 | 17 |
| D | N | DFWTUL | DFW | TUL | Feb-00 | 156 | 37,045.87 | 181.1497 | 0.03389 | 18 |
| D | N | ILMATL | ILM | ATL | Feb-00 | 151 | 56,981.16 | 302.3868 | 0.03365 | 19 |
| D | N | ROAATL | ROA | ATL | Feb-00 | 150 | 53,599.07 | 293.0082 | 0.02674 | 20 |
| D | N | MIARSW | MIA | RSW | Feb-00 | 146 | 16,810.08 | 83.59298 | 0.02557 | 21 |
| D | N | ICTDFW | ICT | DFW | Feb-00 | 143 | 47,094.93 | 262.5469 | 0.03791 | 22 |
| D | N | DFWICT | DFW | ICT | Feb-00 | 141 | 46,436.26 | 259.2639 | 0.03841 | 23 |
| D | N | ATLGNV | ATL | GNV | Feb-00 | 138 | 41,551.90 | 211.6433 | 0.02178 | 24 |
| D | N | BOSJFK | BOS | JFK | Feb-00 | 134 | 25,126.15 | 134.3345 | 0.04274 | 25 |
| D | N | DFWIAH | DFW | IAH | Feb-00 | 133 | 29,907.59 | 175.8375 | 0.03875 | 26 |
| D | N | SANLAX | SAN | LAX | Feb-00 | 132 | 14,474.91 | 85.56678 | 0.03817 | 27 |
| D | N | ATLILM | ATL | ILM | Feb-00 | 130 | 49,056.63 | 296.0814 | 0.03177 | 28 |
| D | N | MIAEYW | MIA | EYW | Feb-00 | 130 | 16,493.98 | 97.59754 | 0.02715 | 28 |
| D | N | ATLCRW | ATL | CRW | Feb-00 | 125 | 45,465.76 | 276.4318 | 0.03987 | 30 |
| D | N | DFWHOU | DFW | HOU | Feb-00 | 125 | 30,932.03 | 201.9243 | 0.03249 | 30 |
| D | N | RSWMIA | RSW | MIA | Feb-00 | 123 | 14,161.91 | 87.99126 | 0.02376 | 32 |
| D | N | CLEBUF | CLE | BUF | Feb-00 | 123 | 23,506.67 | 144.4986 | 0.03381 | 32 |
| D | N | SEAPDX | SEA | PDX | Feb-00 | 121 | 15,718.58 | 91.256 | 0.04314 | 34 |
| D | N | CRWATL | CRW | ATL | Feb-00 | 121 | 44,010.86 | 264.5281 | 0.04167 | 34 |
| D | N | EYWMIA | EYW | MIA | Feb-00 | 118 | 14,971.46 | 101.0714 | 0.02615 | 36 |
| D | N | SLCGJT | SLC | GJT | Feb-00 | 118 | 25,512.77 | 163.0736 | 0.04018 | 36 |
| D | N | JFKBOS | JFK | BOS | Feb-00 | 115 | 21,563.49 | 145.1154 | 0.03906 | 38 |
| D | N | RAPDEN | RAP | DEN | Feb-00 | 114 | 34,447.29 | 241.2052 | 0.04041 | 39 |
| D | N | PITJFK | PIT | JFK | Feb-00 | 114 | 38,650.96 | 288.4844 | 0.03582 | 39 |
| D | N | ATLMYR | ATL | MYR | Feb-00 | 113 | 35,780.61 | 212.9632 | 0.02253 | 41 |
| D | N | ATLDHN | ATL | DHN | Feb-00 | 113 | 19,308.51 | 143.6533 | 0.02952 | 41 |
| D | N | LAXSAN | LAX | SAN | Feb-00 | 111 | 12,172.08 | 87.9243 | 0.03714 | 43 |
| D | N | GJTSLC | GJT | SLC | Feb-00 | 110 | 23,783.09 | 169.0368 | 0.03876 | 44 |
| D | N | DENRAP | DEN | RAP | Feb-00 | 110 | 33,238.61 | 241.7354 | 0.04032 | 44 |
| D | N | DHNATL | DHN | ATL | Feb-00 | 108 | 18,454.15 | 142.3932 | 0.0303 | 46 |
| D | N | HOUDFW | HOU | DFW | Feb-00 | 108 | 26,725.27 | 199.3397 | 0.03227 | 46 |
| D | N | BTVEWR | BTV | EWR | Feb-00 | 106 | 28,156.97 | 213.0066 | 0.02643 | 48 |
| D | N | MHTEWR | MHT | EWR | Feb-00 | 104 | 21,743.03 | 146.7494 | 0.02214 | 49 |
| D | N | PHLEWR | PHL | EWR | Feb-00 | 103 | 8,361.54 | 60.68796 | 0.02907 | 50 |
| D | N | PVDEWR | PVD | EWR | Feb-00 | 103 | 16,393.51 | 106.622 | 0.02729 | 50 |

APPARATUS, SYSTEM, AND METHOD FOR DYNAMIC DEMAND REPORTING AND AFFECTATION

FIELD

The present invention relates generally to computer systems and software, and more particularly to apparatuses, methods, and systems for providing dynamic demand reports.

BACKGROUND

Information Technology Systems

Typically, users engage computers to facilitate information processing. A computer operating system enables and facilitates the ability of users to access and operate computer information technology. Information technology systems provide interfaces that allow users to access and operate the various systems.

User Interface

The function of computer interfaces such as cursors, menus, and window components are, in many respects, similar to automobile operation interfaces. Automobile operation interfaces such as steering wheels, gearshifts, and speedometers facilitate the access, operation, and display of automobile resources, functionality, and status. Computer interaction interfaces such as cursors, menus, and windows similarly facilitate the access, operation, and display of computer hardware and operating system resources, functionality, and status. Operation interfaces are commonly called user interfaces. Graphical user interfaces (GUIs) such as the Apple Macintosh Operating System or Microsoft's Windows provide a baseline and means of accessing and displaying information.

World Wide Web

The proliferation and expansion of computer systems, databases, the Internet, and particularly the World Wide Web (the web), have resulted in a vast and diverse collection of information. Various user interfaces that facilitate the interaction of users with information technology systems (i.e., people using computers) are currently in use. An information navigation interface called WorldWideWeb.app (the web) was developed for the NeXTSTEP operating system in late 1990. Subsequently, information navigation interfaces such as web browsers have become widely available on almost every computer operating system platform.

Generally, the web is the manifestation and result of a synergetic interoperation between user interfaces (e.g., web browsers), servers, distributed information, protocols, and specifications. Web browsers were designed to facilitate navigation and access to information, while information servers were designed to facilitate provision of information. Typically, web browsers and information servers are disposed in communication with one another through a communications network. As such, information servers typically provide information to users employing web browsers for navigating and accessing information about the web. Microsoft's Internet Explorer and Netscape Navigator are examples of web browsers. In addition, navigation user interface devices such as WebTV have also been implemented to facilitate web navigation. Microsoft's Information Server and Apache are examples of information servers, i.e., their function is to serve information to users that typically access the information by way of web browsers.

Hypertext

Information on the web typically is provided through and distributed employing a HyperText Markup Language (HTML) specification. HTML documents are also commonly referred to as web pages. HTML documents may contain links to other HTML documents that can be traversed by users of web browsers by selecting the links, which are commonly highlighted by color and underlining. HTML has been extended and upgraded resulting in new standards such as Extensible Markup Language (XML) and other such variants, which provide greater functionality.

HTML documents typically are accessed through navigation devices via a HyperText Transfer Protocol (HTTP). HTTP is a stateless application-level protocol for distributed, collaborative, hypermedia information systems, and is further described at the World Wide Web Consortium organization (W3C) web site in a document entitled HTTP Specifications and Drafts (available at www.w3.org/Protocols/Specs.html).

The basic web browsing paradigm presents users with a scrolling page full of text, pictures, and various other forms of information media such as movies and links to other documents. Web browsers allow users to access uniquely identified HTML documents on the web by entering a navigation location in a Universal Resource Locator (URL) and employing HTTP as a transfer protocol to provide and obtain web pages. Typically, a user provides the address of a desired HTML document into a URL (either directly or through the selection of links in an already viewed HTML document).

Commerce System

The rise in Internet usage has resulted in a tremendous increase in transactions occurring through communications networks such as the Internet, i.e., an increase in on-line transactions. The increase in on-line transactions has been facilitated by commerce systems.

Most systems for processing the sale of products, are seller-driven, whereby the seller prices, packages, configures and offers the product for sale, and the buyer decides whether or not to accept the seller's offer. In a buyer-driven commerce system, on the other hand, the buyer dictates the terms of the offer and one or more sellers decide whether or not to accept.

U.S. Pat. No. 5,794,207, owned by the assignee of the present invention and incorporated herein by reference, discloses a buyer-driven Conditional Purchase Offer (CPO) Management System that processes binding purchase offers received from individual consumers. The purchase offers contain one or more buyer-defined conditions for the purchase of goods or services, at a buyer-defined price. The purchase offers are typically guaranteed by a general-purpose financial account, such as a debit or credit account, and thereby provide sellers with a mechanism for enforcing any agreement that may be reached with the consumer. The purchase offers are provided by the CPO Management System to sellers, for individual sellers to either accept or reject. If a seller accepts a purchase offer, the CPO Management System may bind the buyer on behalf of the accepting seller, typically by charging the general-purpose financial account designated by the buyer or providing the account information to the accepting seller for processing. Thus, the CPO Management System empowers individual consumers to obtain goods and services, such as travel or insurance services, at prices that are set by the consumers. The CPO Management System provides numerous commercial advantages to sellers as well. For example, the CPO Management System permits individual sellers to effectively sell excess capacity when actual demand fails to meet forecasted demand. In particular, the CPO Management System provides an effective mechanism for sellers to be confident that if they accept a consumer's offer, the consumer will purchase the requested goods or services at the agreed-upon price. Yet, the consumer remains unable to use the information to ascertain the seller's underlying level of price flexibility, which, if known to a seller's competitors or customers, could dramatically impact the seller's overall revenue structure.

U.S. Pat. No. 6,085,169 entitled "Conditional Purchase Offer Management System," which issued to the assignee of the present application and is incorporated by reference in its entirety herein, discloses a CPO Management System that permits sellers to provide proprietary rules for the acceptance of CPOs. Each of these rules establishes one or more restrictions that the seller is willing to accept for a predefined minimum price. The rules are utilized by the CPO Management System to determine whether to accept, reject or counter a CPO on behalf of a particular seller. In this manner, the CPO Management System can respond to submitted CPOs in real-time on behalf of sellers, with a minimal amount of expensive, time consuming and error prone human intervention. For many transactions, the embodiments of the CPO Management Systems discussed above, will effectively complete transactions between buyers and sellers, with minimal intervention by the parties once the CPO has been submitted.

Reporting Systems

Reporting systems exist that allow administrators to generate reports. Brio Technology, Inc.'s Brio software allows administrators to construct and generate reports. Such software requires the skill and time of a skilled administrator to construct various queries that form the basis of various and subsequent static reports.

SUMMARY

As set forth below, a need exists for an apparatus, method, and system for dynamic demand reporting and affectation. One of the non-limiting embodiments of the present disclosure teaches a reporting facility that dynamically constructs various database queries and generates reports of demand. One of the advantages of dynamically constructing queries and producing demand reports is that the reported data is always up to date. A further advantage of dynamic construction and reporting is there is no need for a skilled administrator to construct queries.

U.S. Provisional Patent Application Ser. No. 60/231,456, owned by the assignee of the present disclosure and incorporated herein by reference, disclose systems allowing for sellers to view static reports constructed and generated at set intervals by operators of a CPO Management System.

The performance of the CPO Management System depends, at least in part, upon its utilization by a large number of both buyers and sellers. Specifically, buyers are more likely to submit purchase offers if they know the purchase offers will be reviewed by a sufficiently large number of sellers. Likewise, sellers are more likely to review offers if a sufficiently large number of offers are submitted. Buyers and sellers alike will be frustrated and discouraged from utilizing the CPO Management System if the acceptance rate for submitted purchase offers does not meet acceptable levels.

Invariably, some buyers will submit purchase offers that are not initially accepted by any seller, typically because the price offered by the buyer is too low. In addition, some sellers may set their acceptance parameters too high to attract sufficient demand to fulfill all available bookings. Also, a system operator of the CPO Management System may set operating parameters, such as a minimum required margin on a sale, which are incompatible with adjustments in purchaser demand. These factors, alone or in combination, may then result in an inordinate amount of purchase offers being rejected as originally posted. Thus, buyers, sellers and system operators of a buyer-driven commerce system alike would benefit from a system for analyzing demand data so as to make strategic determinations to affect and/or increase acceptance of purchase offers. Also, a system allowing for dynamic demand determination is provided to determine optimum parameters to increase acceptance of purchase offers. Such a dynamic reporting system may in turn be integrated with the CPO Management System so as to affect demand dynamically and/or to provide reports of demand. Such a system allows the system operator to affect revenues such as increasing or maximizing revenues. Furthermore, such a dynamic demand surveying and affectation system (DDSAS) allows sellers who participate in the buyer-driven commerce system to also affect revenues.

One embodiment of the present invention is a method, which includes the following: traversing a navigation location for a commerce demand system, obtaining login information, identifying at least one database associated with the commerce demand system, providing a demand survey facility, obtaining a demand survey request; querying the associated databases based on the demand survey request, ranking the query results, formatting the ranked query results, providing the formatted query results, providing a desired demand requirement facility, and obtaining a desired demand requirement request; and updating the strike price to induce a change in demand.

Another embodiment of the present invention is a method, which includes traversing a navigation location for a commerce demand system, obtaining login information; identifying at least one database associated with the commerce demand system, providing a demand survey facility, obtaining a demand survey request; querying the associated databases based on the demand survey request, ranking the query results, formatting the ranked query results, and providing the formatted query results.

Another embodiment of the present invention is a memory for access by a program module that is executed on a processor, the memory stores a data structure which comprises a provision type, a strike price for the provision type, and a desired level of demand type for the provision type.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the disclosure.

FIG. 7 illustrates one embodiment of DSF facilities;

FIG. 9Z2 is a continuation of a flowchart illustrating another embodiment of the DSF;

FIG. 9B2 is a continued flowchart illustrating one embodiment of QGT parsing;

FIG. 9Q2 is a continued flowchart illustrating one embodiment of QGT SQL construction;

FIG. 9Q3 is a continued flowchart illustrating one embodiment of QGT SQL construction;

FIG. 9L2 is a continued flowchart illustrating one embodiment of date range limit management;

FIG. 16 illustrates an alternative example embodiment of a DSF with expanded facilities;

FIG. 22 illustrates one example embodiment of a demand survey report in HTML format;

FIG. 23 illustrates one example embodiment of a demand survey report in Excel format; and FIG. 24 illustrates one example embodiment of a demand survey report in Brio format.

DETAILED DESCRIPTION

Actors and Resources

The present invention involves various actors and/or resources. Generally, the actors take on three forms: (1) accessers 5504 of FIG. 5, (2) providers 5501 of FIG. 5, and (3) facilitators 5501 of FIG. 5. An accesser may be a human and/or system embodying the role of a buyer, client, customer, user, and/or the like. Accessers and providers may affect the access of a resource. A provider may be a human, entity, seller, system, and/or user that engages in the purveying of goods, information, services, and/or the like. Typically a provider engages in commerce. A facilitator facilitates in matching the wants and/or requests of accessers with the provisions of providers. In the context of electronic commerce (E-commerce) one or more computer systemizations executing software (such as information server software) may embody the purveying role of the facilitator.

Figure 1:
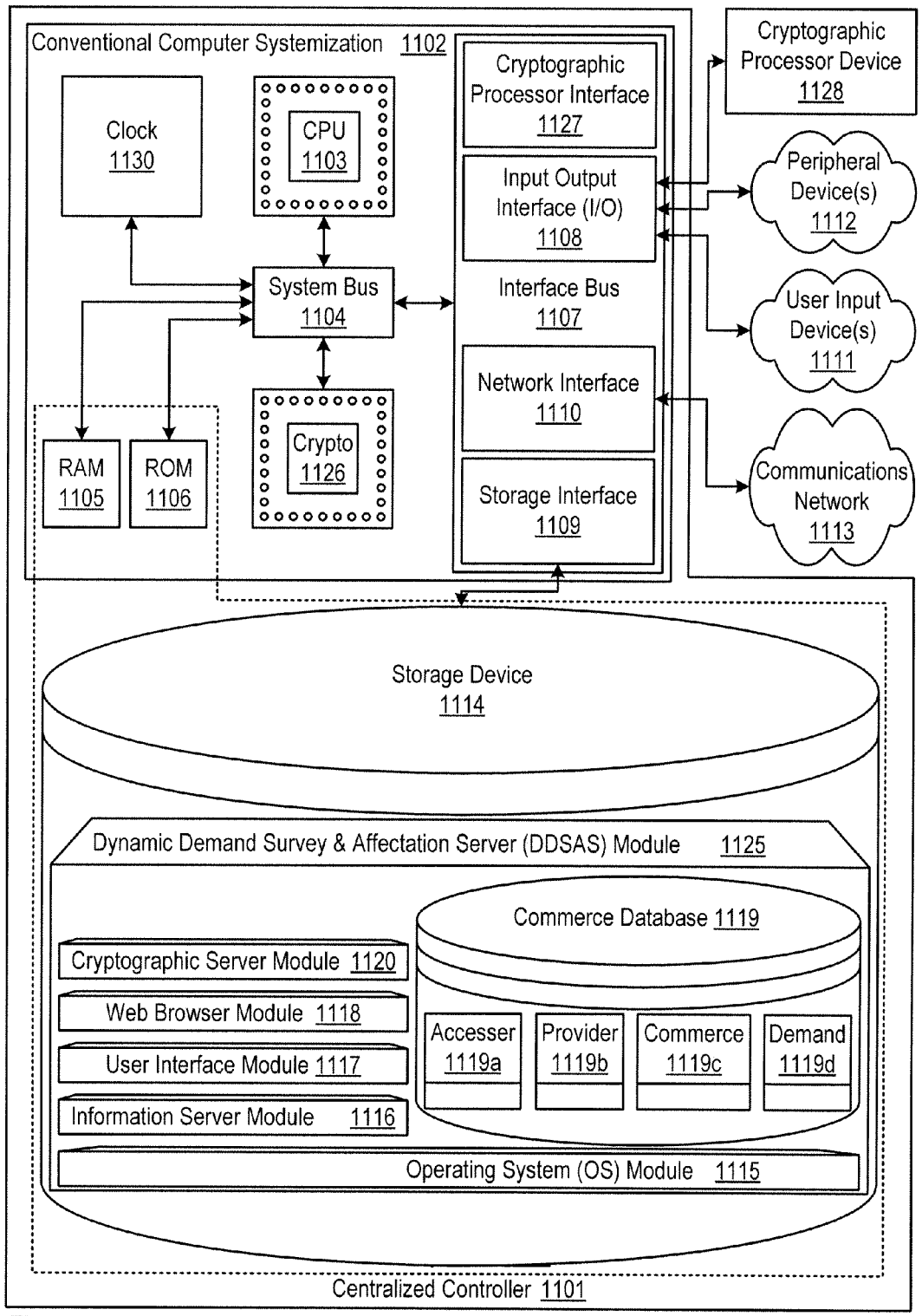
FIG. 1 illustrates a centralized controller according to one embodiment.
Figure 2:
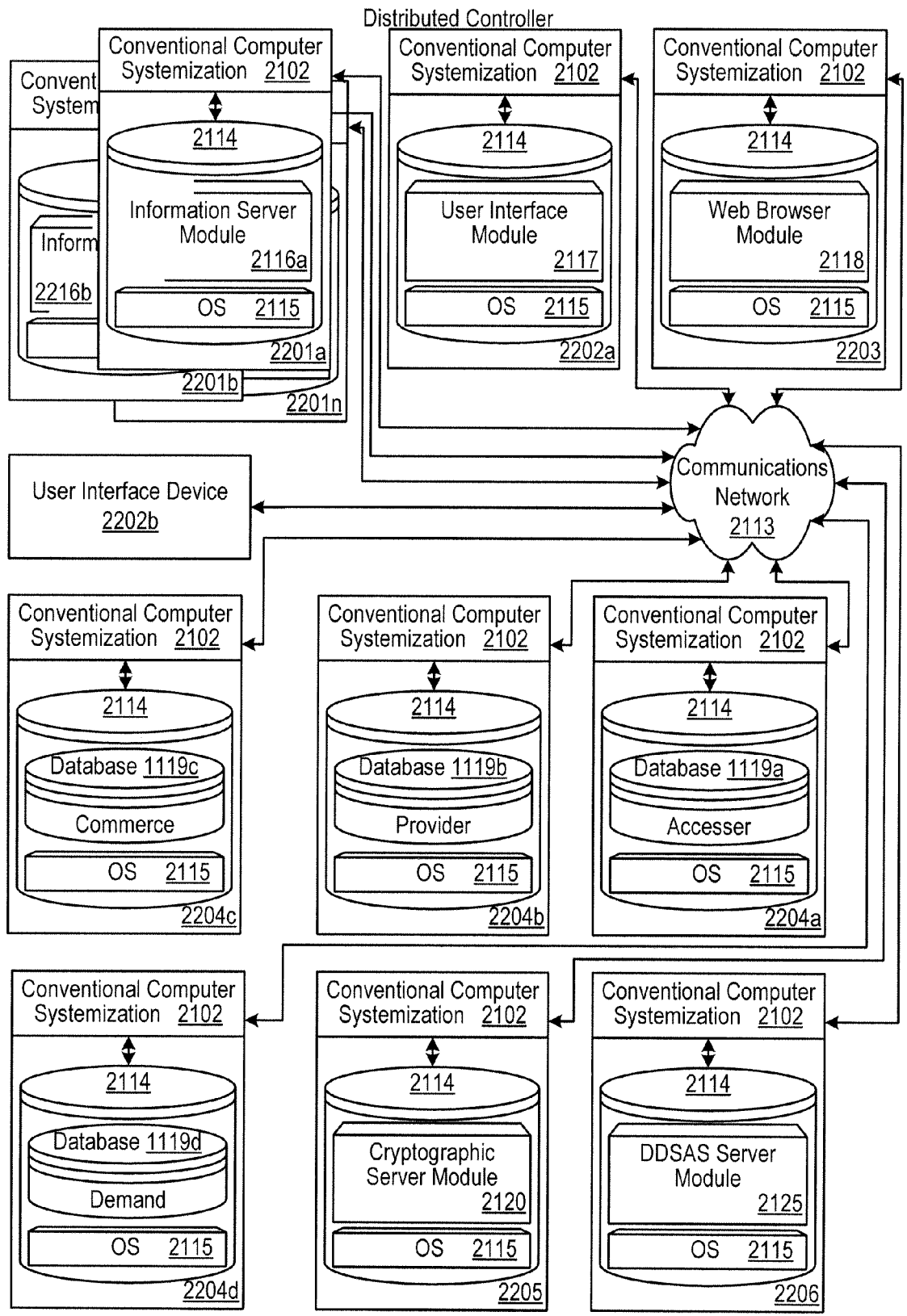
FIG. 2 illustrates another embodiment in the form of a distributed Dynamic Demand Survey System (DDSAS) interacting through a communications network.

A typical resource is an information server controller 2201 of FIG. 2. An information server module 2116 of FIG. 2, 3316 of FIG. 3 executes on an information server controller 2201 and/or centralized controller 1101 of FIG. 1. A CPO Management system typically allows facilitators to affect the provision of provisions to buyers from sellers. A Dynamic Demand Survey & Affectation Server (DDSAS) server controller 2206 is another resource. A DDSAS is a resource that may be employed by accessers (such as buyers) through a facilitator so as to affect or dynamically report on the demand for the provider's (such as seller's) provisions. Resources may also be controllers, conventional computer systems and software, associated enabling systems and/or software, and/or the like.

Centralized Controller

FIG. 1 illustrates one embodiment incorporated into a centralized controller.

In this embodiment, the centralized controller 1101 may be connected to and/or communicate with entities such as, but not limited to: one or more users from user input devices 1111; peripheral devices 1112; and/or a communications network 1113. The centralized controller may even be connected to and/or communicate with a cryptographic processor device 1128.

A typical centralized controller 1101 may be based on common computer systems that may comprise, but are not limited to, components such as: a conventional computer systemization 1102 connected to a storage device 1114. Storage devices may be a fixed hard disk drive, and/or other devices of the like.

A conventional computer systemization 1102 may comprise a clock 1130, central processing unit (CPU) 1103, a read only memory (ROM), a random access memory (RAM), and/or an interface bus 1107, and conventionally, although not necessarily, are all interconnected and/or communicating through a system bus 1104. The system clock typically has a crystal oscillator and provides a base signal. The clock is typically coupled to the system bus and various means known to those skilled in the art will increase or decrease the base operating frequency for other components interconnected in the conventional computer systemization. The clock and various components in a conventional computer systemization drive signals embodying information throughout the system. Optionally, a cryptographic processor 1126 may similarly be connected to the system bus. Of course, any of the above components may be connected directly to one another, connected to the CPU, and/or organized in numerous variations employed as exemplified by conventional computer systems.

A centralized controller and/or a conventional computer systemization may employ various forms of memory 1129. In a typical configuration, memory will include ROM, RAM, and a storage device.

The CPU comprises at least one high-speed data processor adequate to execute program modules for executing user and/or system-generated requests. Preferably, the CPU is a conventional microprocessor such as the Intel Pentium Processor and/or the like. The CPU interacts memory to execute stored program code according to conventional data processing techniques.

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the conventional computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (PCI), Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Network interfaces may employ connection protocols such as, but not limited to: direct connect, Ethernet (thick, thin, twisted pair 10/100/1000 Base T, and/or the like), Token Ring, wireless connection, and/or the like. A communications network may be: a direct connection; the Internet; a Local Area Network (LAN); a secured custom connection; a Wide Area Network (WAN); a wireless network (e.g., employing protocols such as, but not limited to a Wireless Application Protocol (WAP)); and/or the like. A network interface may be regarded as a specialized form of an input output interface.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: Apple Desktop Bus (ADB); Apple Desktop Connector (ADC); audio: analog, digital, monaural, RCA, stereo, and/or the like IEEE 1394; infrared; joystick; keyboard; midi; optical; PC AT; PS/2; parallel; radio; serial; USB; video: BNC, composite, digital, RCA, S-Video, VGA, and/or the like; wireless; and/or the like. A common output device is a video display, which typically comprises a CRT with an interface (e.g., VGA circuitry and cable) that accepts signals from a video interface. The video interface composites information generated by a conventional computer systemization and generates video signals based on the composited information. Typically, the video interface provides the composited video information through a video connection interface that accepts a video display interface (e.g., a VGA connector accepting a VGA display cable).

User input devices 1111 may be card readers, dongles, finger print readers, gloves, graphics pads, joysticks, keyboards, mouse (mice), trackballs, trackpads, retina readers, and/or the like.

Peripheral devices 1112 may be connected and/or communicate with or to I/O and/or with or to other facilities of the like (e.g., network interfaces, storage interfaces, and/or the like). Peripheral devices may be cameras, dongles (e.g., for copy protection, ensuring secure transactions as a digital signature, and/or the like), external processors (e.g., for added functionality), goggles, microphones, monitors, network interfaces, printers, scanners, storage devices, visors, and/or the like.

Cryptographic units such as, but not limited to, microcontrollers, processors 1126, interfaces 1127, and/or devices 1128 may be attached, and/or communicate with the centralized controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner284.

A storage device 1114, may be any conventional computer system storage. Commonly a storage device is a fixed hard disk. However, those skilled in the art will recognize that a conventional computer systemization may be configured to employ many types of memory 1129. For example, a conventional computer systemization may be configured wherein the functionality of on-chip CPU memory (e.g., registers), RAM, ROM, and any other storage devices are provided by a paper punch tape or paper punch card mechanism; of course such an embodiment is not preferred and would result in an extremely slow rate of operation. Generally, any mechanization and/or embodiment allowing a processor to affect the storage and/or retrieval of information is memory 1129. Thus, a conventional computer systemization generally requires and makes use of memory. However, memory is a fungible technology and resource, thus, any number of memory embodiments may be employed in lieu of or in concert with one another.

The storage devices 1114 may contain a collection of program and/or database modules and/or data such as, but not limited to: an operating system module 1115 (operating system); an information server module 1116 (information server); a user interface module 1117 (user interface); a web browser module 1118 (web browser); databases 1119 including tables such as but not limited to an accesser table 1119a, provider table 1119b, transaction table 1119c, demand table 1119d, and/or the like; a cryptographic server module 1120 (i.e., cryptographic server); Dynamic Demand Survey & Affectation Server (DDSAS) module; and/or the like (i.e., collectively a module collection). These modules may be stored and accessed from the storage devices and/or from storage devices accessible through an interface bus. Although these modules typically and preferably are stored in a local storage device, they may also be stored in peripheral devices, RAM, remote storage facilities through a communications network, ROM, and/or the like.

The operating system 1115 is executable program code facilitating the operation of a centralized controller. Typically, the operating system facilitates access of I/O, network interfaces, peripheral devices, storage devices, and/or the like. The operating system preferably is a conventional product such as a Microsoft Windows NT Server and/or Unix operating systems. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like; e.g., it may contain, communicate, generate, obtain, and/or provide program module, system, user, and/or data communications, requests, and/or responses. The operating system, once executed by the CPU, may interact with communications networks, data, I/O, peripheral devices, program modules, memory, user input devices, and/or the like. Preferably, the operating system provides communications protocols that allow the centralized controller to communicate with other entities through a communications network 1113. The preferred protocol is transmission control protocol Internet protocol (TCP/IP).

Decentralized Controllers

FIG. 2 illustrates another embodiment of a system incorporating the present disclosure. In this embodiment, the centralized controller 1101 embodiment of FIG. 1 has been decentralized into components such as, but not limited to: a information server controller 2201; user interface controller 2202a and/or alternatively a user interface device 2202b; a web browser controller 2203; database controllers such as, but not limited to accesser database controllers 2204a, provider database controllers 2204b, transaction database controllers 2204c, demand database controllers 2204d, and/or the like; a cryptographic controller 2205; a DDSAS controller 2206; and/or the like (i.e., collectively decentralized server controllers). The aforementioned controllers of FIG. 2 may be attached, coupled, interconnected, and/or communicate through a communications network 2113 and/or like facility.

An information server controller 2201 is comprised similarly to the centralized controller of FIG. 1 except it does not require an entire module collection other than an information server module. An information server module 2116 is stored program code that is executed by the CPU. Preferably, the information server is a conventional Internet information server such as, but not limited to Microsoft's Internet Information Server revision 4.0 and/or the Apache Software Foundation's Apache revision 1.3.12. Preferably, the information server allows for the execution of program modules through facilities such as C++, Java, JavaScript, ActiveX, Common Gateway Interface (CGI) scripts, Active Server Page (ASP), any facility with regular expression (regex) abilities, and/or the like. Preferably the information server supports secure communications protocols such as, but not limited to, Secure Hypertext Transfer Protocol (HTTPS), Secure Socket Layer (SSL), and/or the like. Conventionally, an information server provides results in the form of web pages to web browsers, and allows for the manipulated generation of the web pages through interaction with other program modules. An information server may communicate to and/or with other modules in a module collection, including itself, and/or facilities of the like. Most frequently, the information server communicates with operating systems, other program modules, user interfaces, web browsers, and/or the like; e.g., it may contain, communicate, generate, obtain, and/or provide program module, system, user, and/or data communications, requests, and/or responses.

In an alternative embodiment, the information server controller 2201, may itself be further distributed across several conventional computer systemizations 2102, 2201a, 2201b . . . 2201n. The information server module (2216a and 2216b) may itself run partially on various conventional computer systemizations (2201a . . . 2201n) such that part of the information server module 2116 runs on (respectively on 2116a, 2116b, (2116c . . . 2116n not shown)) numerous systemizations to increase both fault tolerance and load balancing. Those skilled in the art will recognize that any single and/or multiple program modules may similarly be distributed across several conventional computer systemizations for similar and/or varying reasons.

A user interface controller 2202a is comprised similarly to the centralized controller of FIG. 1 except it does not require an entire module collection other than an user interface module 2117. A user interface is stored program code that is executed by the CPU. Preferably, the user interface is a conventional user interface as provided by, with, and/or atop operating systems and/or operating environments such as Apple Macintosh OS such as Aqua, Microsoft Windows (NT), Unix X Windows (KDE, Gnome, and/or the like), and/or the like. Preferably, the user interface allows for the display, execution, interaction, manipulation, and/or operation of program modules and/or system facilities through graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like; e.g., it may contain, communicate, generate, obtain, and/or provide program module, system, user, and/or data communications, requests, and/or responses.

In alternative embodiments, a user interface device 2202 may take the place of and/or be used in conjunction with a user interface controller. The user interface device may be a consumer electronics online access device (e.g., Philips Magnavox Inc.'s WebTV), personal digital assistant (PDA), telephone, a terminal, and/or the like.

A web browser controller 2203 is comprised similarly to the centralized controller of FIG. 1 except it does not require an entire module collection other than web browser module 2118. A web browser is stored program code that is executed by the CPU. Preferably, the web browser is a conventional hypertext viewing application such as Microsoft Internet Explorer or Netscape Navigator (preferably with 128 bit encryption by way of HTTPS, SSL, and/or the like). Preferably, the web browser allows for the execution of program modules through facilities such as Java, JavaScript (preferably revision 1.2 or greater), ActiveX, any facility with regular expression (regex) abilities, and/or the like. A web browser may communicate to and/or with other modules in a module collection, including itself, and/or facilities of the like. Most frequently, the web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a web browser a proprietary accesser controller may be developed to perform similar functions. An accesser module would similarly affect the obtaining and the provision of information to accessers, providers, providers' agents, and facilitators from a DDSAS and/or any proprietary facilitator systems. The accesser module may be nugatory on systems employing standard web browsers. For added security, such an accesser module, and consequently any resulting accesser controllers, could be configured to communicate directly with the DDSAS without an intermediary information server to further enhance security.

A database controller 2204 is comprised similarly to the centralized controller of FIG. 1 except it does not require an entire module collection other than database modules 2119. A database is stored program code that is executed by the CPU and it is stored data; the stored program code portion configuring the CPU to process the stored data. Preferably, the database is a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship. A database may communicate to and/or with other modules in a module collection, including itself, and/or facilities of the like. Most frequently, the database communicates with information servers, operating systems, other program modules, and/or the like; e.g., it may contain, communicate, generate, obtain, and/or provide program module, system, user, and/or data communications, requests, and/or responses.

Databases may be consolidated and/or distributed in countless variations through standard data processing techniques. Portions of databases, e.g., tables, may be exported and/or imported and thus decentralized and/or integrated. In one non-limiting example embodiment, a commerce database 1119 of FIG. 1 was implemented including accesser 1119a, provider 1119b, transaction 1119c, and demand 1119d tables. In an alternative embodiment, these tables have been decentralized into their own databases (i.e., accesser database 2219a, provision database 2119b, transaction database 2119c, and provider database 2119d) and respective database controllers (i.e., accesser database controller 2204a, provider database controller 2204b, transaction database controller 2204c, demand database controller 2204d). Of course, employing standard data processing techniques, one may further distribute the databases over several conventional computer systemizations and/or storage devices. Similarly, configurations of the database controllers 2204 may be varied by consolidating and/or distributing a database modules 2119. A CPO Management System, i.e., commerce system, may maintain databases to keep track of inventory, vendors, providers' client's transactions, and/or the like.

An accesser database controller 2204a is a specialized controller designed to facilitate accesser related transactions. A provider may maintain an accesser database to keep track of accessers' accounts and/or transactions. The accesser database controller employs an accesser database module 2119a.

A provider database controller 2204b is a specialized controller designed to facilitate provider related transactions. The provider database may store information such as, but not limited to: information to allow for accesses to relevant provider database resources (e.g., passwords and/or the like), contact information, inventory levels and provision availability, payment information, vendor information, and/or the like.

A transaction database controller 2204c is a specialized controller designed to facilitate both accesser provider transactions. The transaction database may store information relating to a transaction such as, but not limited to: CPOs, items requested, method of payment, name of accesser, shipping address, and/or the like.

A demand database controller 2204c is a specialized controller designed to facilitate provider transactions. The demand database may store information relating to transactions, strike prices, current demand, and/or the like.

A cryptographic server controller 2205 is comprised similarly to the centralized controller of FIG. 1 except it does not require an entire module collection other than cryptographic server module 2120. A cryptographic server module is stored program code that is executed by the CPU 1103 of FIG. 1, cryptographic processor 1126 of FIG. 1, cryptographic processor interface 1127 of FIG. 1, cryptographic processor device 1128 of FIG. 1, and/or the like. Preferably, cryptographic processor interfaces will allow for expedition of encryption and/or decryption requests by the cryptographic server; however, the cryptographic server, alternatively, may run on a conventional CPU. Preferably, the cryptographic server allows for the encryption and/or decryption of provided data. Preferably, the cryptographic server allows for both symmetric and asymmetric (e.g., Pretty Good Protection (PGP)) encryption and/or decryption. Preferably, the cryptographic server allows conventional cryptographic techniques such as, but not limited to: digital certificates (e.g., X.509 authentication framework), digital signatures, dual signatures, enveloping, public key management, and/or the like. Preferably, the cryptographic server will facilitate numerous encryption and/or decryption protocols such as, but not limited to: Data Encryption Standard (DES), Elliptical Curve Encryption (ECC), International Data Encryption Algorithm (IDEA), Message Digest 5 (MD5, i.e., a one way hash function), RC5 (Rivest Cipher), Rijndael, RSA (an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. A cryptographic server may communicate to and/or with other modules in a module collection, including itself, and/or facilities of the like. Preferably, the cryptographic server supports encryption schemes allowing for the secure transmission of information across a communications network. Most frequently, the cryptographic server communicates with information servers, operating systems, other program modules, and/or the like; e.g., it may contain, communicate, generate, obtain, and/or provide program module, system, user, and/or data communications, requests, and/or responses.

A DDSAS server controller 2206 is comprised similarly to the centralized controller of FIG. 1 except it does not require an entire module collection other than a Dynamic Demand Survey & Affectation Server module 2125. A DDSAS module is stored program code that is executed, by the CPU. Generally, the DDSAS affects obtaining and the provision of communication, information, transactions, and/or the like between facilitator modules for providers. The DDSAS adds the ability to gauge and affect demand dynamically. The DDSAS allows providers to discover the current demand for their provisions, how their current strike prices affect demand, and either manually or automatically may have the system affect demand in real time by changing the strike price for provisions. The DDSAS may itself be integrated into a commerce system such as, but not limited to, a CPO Management system. Generally, the DDSAS acts as an interface to commerce systems and/or databases for constructing on the fly queries to survey demand and to change strike prices to affect demand for provider provisions. The DDSAS provides facilities for users, such as providers, to make requests for demand reports, and parses those requests so that a Query Generator Tool (QGT) may then further parse that information into SQL to query relevant databases. Of course, in alternative embodiments, the DDSAS may parse submitted requests directly into SQL for submission to the relevant databases. A QGT facilitates communication between the DDSAS and the facilitator's commerce system. A QGT may employ standard data processing and communications protocols known to those skilled in the art such as, but not limited to: extensible markup language (XML); Java Database Connectivity (JDBC); Lightweight Directory Access Protocol (LDAP); Open Database Connectivity (ODBC); Structured Query Language (SQL); and various Application Program Interfaces (APIs) and/or development tools provided by standard development environments and/or database systems such as C, Java, Javascript, Oracle, Perl, Sybase, MySQL, and/or the like; and/or the like. In one non-limiting example embodiment Brio Technology, Inc.'s Brio is configured as a QGT, however, choice of a QGT will depend on the context of system deployment; factors may be the capacity and/or location of the underlying hardware resources of the provider's system, and the nature of the facilitator's system, and/or the like. A DDSAS enabling communications between a provider and a facilitator's commerce systems maybe be developed by employing standard development tools such as, but not limited to: C, shell scripts, Java, Javascript, SQL commands, web application server extensions, Apache modules, Perl scripts, binary executables, and/or other mapping tools, and/or the like. Some embodiments may also and/or alternatively employ a mix of program modules such as, but not limited to, Brio Technology, Inc.'s Brio, Informatica, Corp. Informatica software, and/or the like. Preferably the DDSAS server employs a cryptographic server to encrypt and decrypt communications. The DDSAS may store, retrieve, and/or execute demand provided requests in a database. A DDSAS server may communicate to and/or with other modules in a module collection, including itself, and/or facilities of the like. Most frequently, the DDSAS server communicates with databases, information servers, operating systems, other program modules, QGTs (if embodied as a separate module), and/or the like; e.g., it may contain, communicate, generate, obtain, and/or provide program module, system, user, and/or data communications, requests, and/or responses.

The functionality of any of the distributed server controllers may be combined, consolidated, and/or distributed in any number of ways to facilitate development and/or deployment. To accomplish recombining the functionality of the distributed server controllers, one may simply copy the executable program module code from the module collection and/or with other program modules, first ensuring the executable program module code has been compiled for the appropriate CPU of the controller for which it is destined, and/or data onto a local storage device of any of the various controllers. Similarly, the module collection may be combined in any number of ways to facilitate deployment and/or development. To accomplish this, one must simply integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single controller, and/or across numerous controllers to improve performance through standard load balancing data processing techniques. Furthermore, single instances may also be distributed across multiple controllers and/or storage devices; e.g., databases.

All program module instances and controllers working in concert may do so through standard data processing communication techniques.

The preferred centralized and/or distributed controller configuration will depend on the context of system deployment; factors such as, but not limited to, the capacity and/or location of the underlying hardware resources may affect deployment requirements and configuration. Regardless of if the configuration results in more consolidated and/or integrated program modules, results in a more distributed series of program modules, and/or results in some combination between a consolidated and/or distributed configuration, communication of data may be communicated, obtained, and/or provided. Instances of modules (from the module collection) consolidated into a common code base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (e.g., intra-application communication).

If module collection components are discrete, separate, and/or external to one another, then communicating, obtaining, and/or providing data with and/or to other module components may be accomplished through standard data processing techniques such as, but not limited to: Application Program Interfaces (API) information passage; e.g., (distributed) Component Object Model ((D)COM), (Distributed) Object Linking And Embedding ((D)OLE), and/or the like), Common Object Request Provider Architecture (CORBA), process pipes, shared files, and/or the like (for example, inter-application communication). Again, the preferable embodiment will depend upon the context of system deployment.

User Interaction Systems

Figure 3:
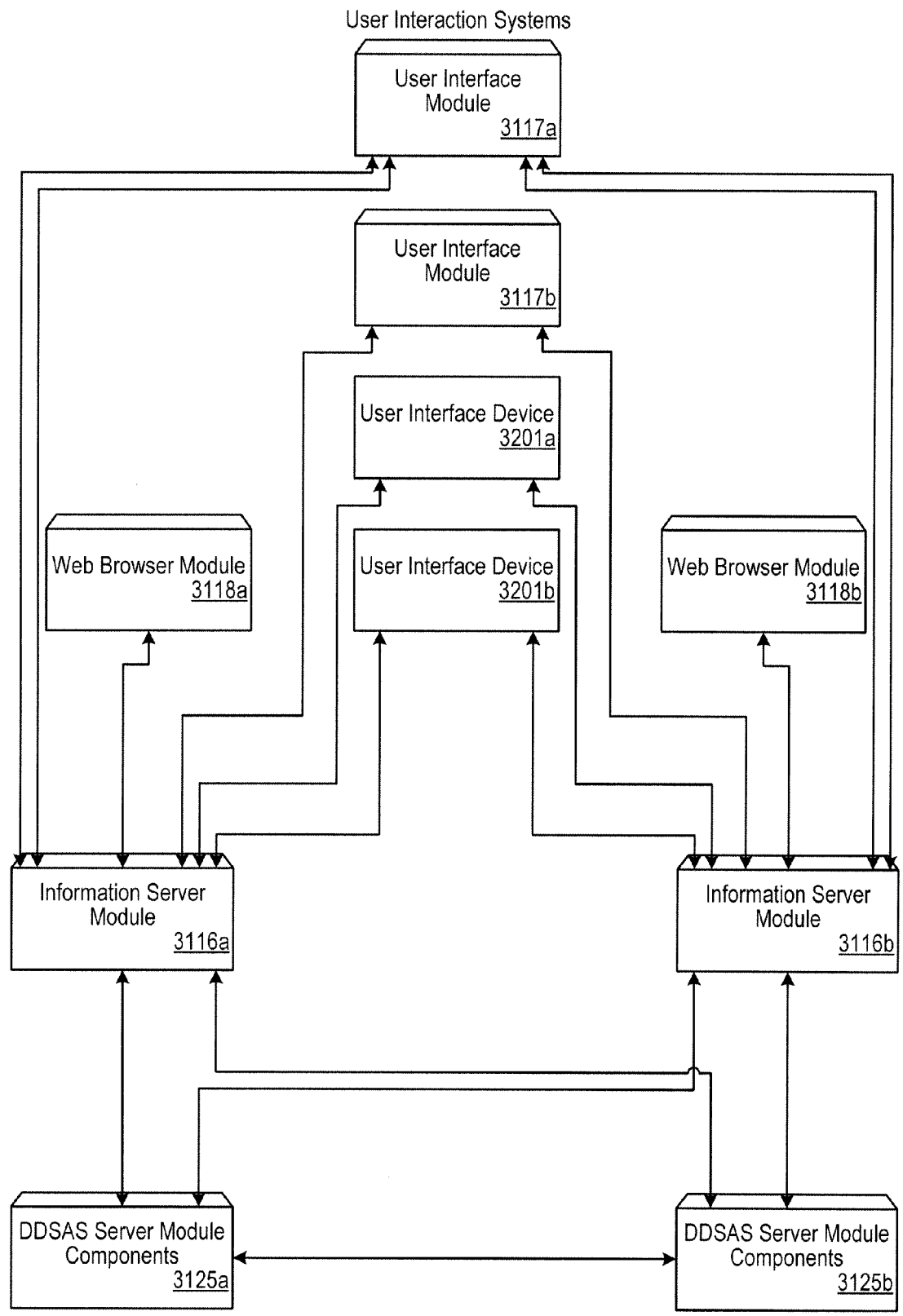
FIG. 3 illustrates another embodiment of the DDSAS and various user system interactions.

FIG. 3 illustrates an overview of various user systems interactions. Information servers 3116 act as an in-between for DDSAS server module components 3125 and user interfaces 3117, user interface devices 3201, web browsers 3118, and/or the like. Generally, the information servers take requests. The information server can make further requests of DDSAS server modules components 3125. DDSAS server module components comprise modules from the module collection, modules detailed in FIG. 4, and/or the like, except it does not include and/or require a web browser module, user interface module, and/or information server module. Both the information server and DDSAS server module components may service multiple instances of any of the user interfaces, user interface devices, and/or web browsers; e.g., user interface components. However, it is preferable for the information server to act as a proxy for DDSAS server module components rather than them directly interfacing with user interface components. Also, there may be one or more instances of the information server and/or DDSAS server module components that may severally or jointly interact with one another.

Generally, DDSAS server module components service information servers, which in turn service user interface components. FIG. 3 illustrates that components may be numerously instantiated and may service multiple and various components. For example a user interface 3117 may make numerous communications. In this example, the user interface 3117a makes two communication with an information server 3116a while also making two communications with another information server 3116b; all while another instance of a user interface 3117b also communicates with the information servers 3116a, 3116b. Similarly in another example, a user interface device 3201 may make numerous communications. In this example, the user interface device 3201a makes two communications, one with an information server 3116a, and a second with another information server 3116b; all while another instance of a user interface device 3201b also makes two communications, also one with an information server 3116a, and a second with the other information server 3116b. Similarly, the web browser 3118a communicates with an information server 3116a while another instance of a web browser 3118b also communicates another instance of the information server 3116b.

Similarly, information server modules 3116 and DDSAS server module components 3125 may make multiple communications and may be instantiated multiple times. For example, DDSAS server module components 3125 may make numerous communications. In this example, the DDSAS server module component 3125a makes three communications with an information server 3116a, another information server 3116b, and with another instance of a DDSAS server module component 3125b (also, the DDSAS server module component 3125a may communicate with itself). Similarly, the DDSAS server module components 3125b makes three communications with an information server 3116a, another information server 3116b, and with the first instance of DDSAS server module components 3125a (also, the DDSAS server module components 3125b may communicate with itself). It should be noted, all the communications taking place as illustrated in FIG. 3 by lines may take place over and/or through a communications network 1113 of FIG. 1.

Dynamic Demand Survey & Affectation Server

Figure 4:
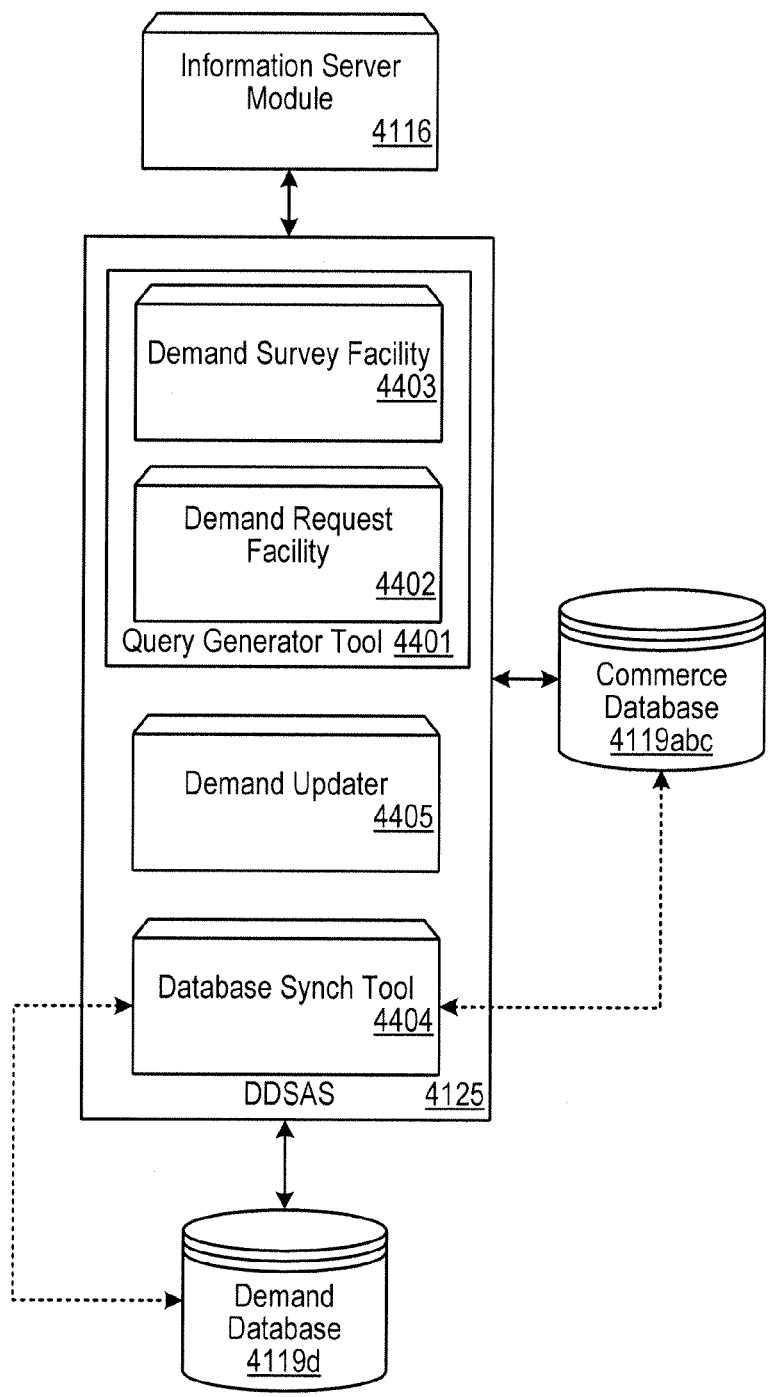
FIG. 4 illustrates another embodiment of the DDSAS and various system interactions.

FIG. 4 illustrates one embodiment of a Dynamic Demand Survey & Affectation Server (DDSAS) and module components. In one non-limiting example embodiment, users, such as providers, engage the DDSAS 4125 through user interface interactions as discussed in FIG. 3 that are fed through an information server module 4116 running on an information server controller 2201 of FIG. 2, commonly called an "information server" or a "web server." Upon the user's traversal of the appropriate navigation location hosted by a particular information server module 4116, the information server module will obtain HTML from the DDSAS 4125 to relay to the requesting user. The QGT handles the initial generation of the HTML. Information servers act as a gateway for users to access the DDSAS. Information servers obtain information to serve requests over communications networks in ways; and employ protocols, well known to those skilled in the art.

The DDSAS 4125 may include a Query Generator Tool (QGT) 4401, a Demand Updater 4405, and a Database Synchronization Tool (DST) 4404. The QGT is configured to provide a Demand Survey Facility (DSF) 4403 and Demand Request Facility (DRF) 4402. The DST duplicates the Commerce Database 4119abc of a commerce system such as, but not limited to, a CPO Management System to a Demand Database 4119d. The Commerce Database may be copied in full, or the DST may limit the data to be copied only to tables and/or data sets required for generating demand data as required. The DST is not strictly required. In an alternative embodiment the DDSAS may access and manipulate the Commerce Database directly. However, the copying of information provided by the DST improves reliability and increases performance by not having the DDSAS perform queries directly on the Commerce Database. The DST may initiate a transfer from the Commerce Database to the Demand Database on demand by a request from either the Demand Survey Facility or the Demand Request Facility. The DST functionality may be provided by tools such as, but not limited to Informatica. Informatica, which provides an API allowing the DSF, DRF, and/or QGT to identify what database to copy. In an alternative embodiment, the DST may be run from a cron job to refresh the Demand Database at a specified interval. The Demand Updater 4405 can direct the DST to update the strike price in the Commerce Database. In an alternative embodiment, the Demand Updater directly issues SQL commands to change the strike price in the Commerce Database.

Interaction with a Commerce System

Figure 5:
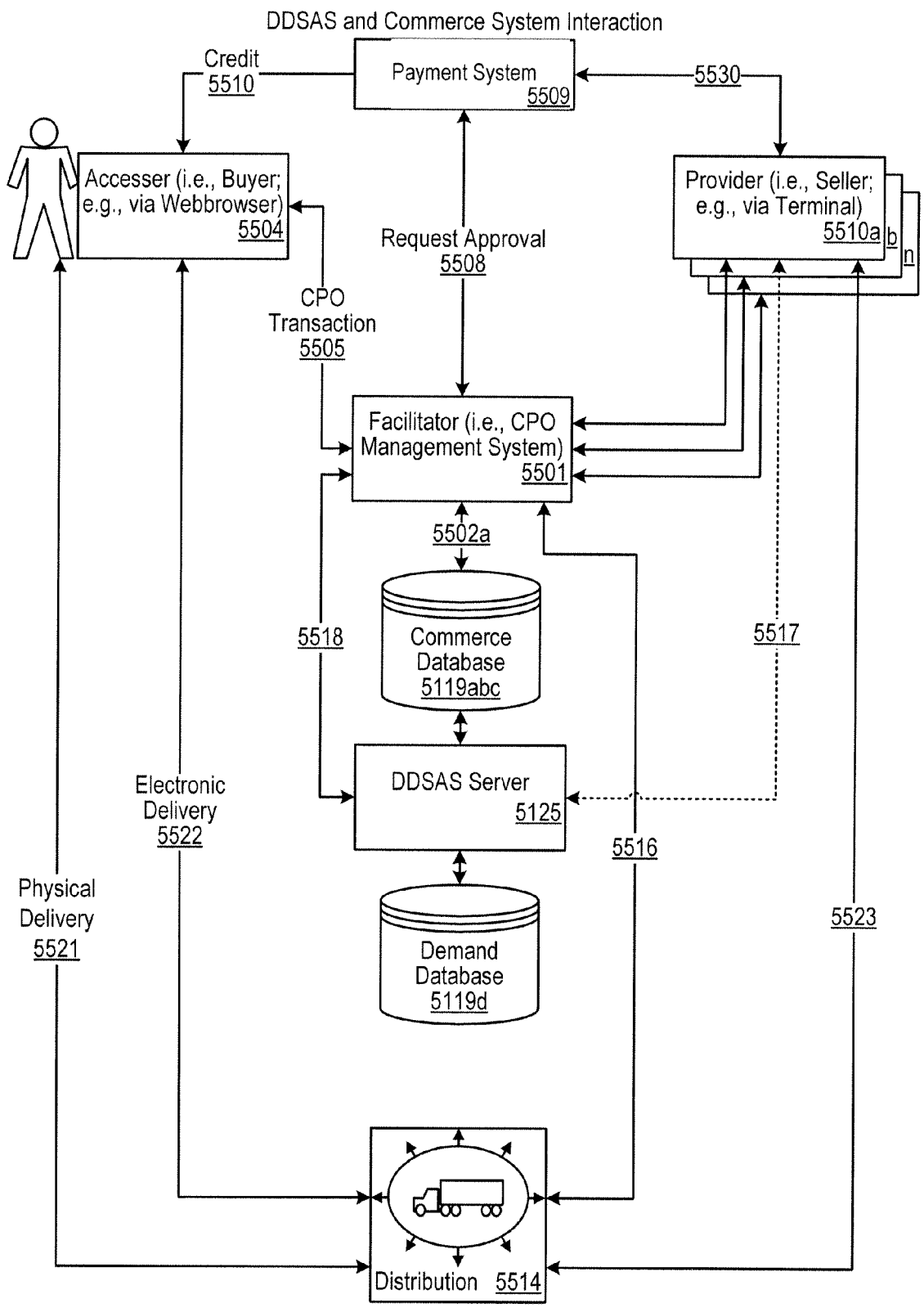
FIG. 5 illustrates another embodiment of the DDSAS and various commerce system interactions.

FIG. 5 illustrates a non-limiting example embodiment of how a DDSAS may be integrated into a commerce system such as, but not limited to, a CPO Management System. A facilitator 5501 may provide a commerce system (for example a CPO Management System) that obtains CPOs from CPO transactions 5505 with commerce system accessers, i.e., buyers 5504. The facilitator also may have several providers, i.e., sellers, 5510a . . . 5510n accepting CPOs. Upon a provider's acceptance of an accesser's CPO, the facilitator may request approval 5508 to charge an accesser with a payment system 5509. The payment system will either approve or deny the request. Upon approval the payment system will issue a credit 5510 to the accesser, and the facilitator will approve the transaction upon the obtaining a request approval from the payment system. Furthermore, the facilitator will forward fees due to the provider based on the provider's acceptance of the accesser's CPO terms. In an alternative embodiment, the facilitator will be charged a credit from a payment system, and the payment system may tender fees due to the provider 5530. Also, the upon approval of the transaction, the facilitator itself may affect 5516 distribution 5514 of the requested provisions either via electronic delivery 5522 or physical delivery 5521 to the accesser 5504, or alternatively may inform the provider to affect 5523 distribution 5514 to the accesser 5504. In one non-limiting example embodiment, distribution 5514 for purposes of electronic delivery may be by way of a communications network. Electronic delivery may include items such as, but not limited to, E-mail notification and information concerning electronic tickets and/or reservations, actual electronic distribution of software, and/or the like. The facilitator tracks and updates all such transactions in a Commerce Database 5119*abc*.

The DDSAS may be configured to communicate with outside systems. In one non-limiting example embodiment, accesses to the DDSAS is limited by a login facility. Login facilities are known to those skilled in the art. Providers typically will gain access to the DDSAS through a facilitator, but in an alternative embodiment providers may access the DDSAS 5517 through a communications network through an information server (not pictured). The facilitator may integrate a DDSAS into the commerce system and/or may similarly access 5518 the DDSAS through a communications network and/or information server.

The DDSAS may interact and update both Demand Databases 5519*d* and/or Commerce Databases 5119*abc* as was discussed in FIG. 4 and as further described in subsequent Figures.

Demand Survey Facility

Figure 6:
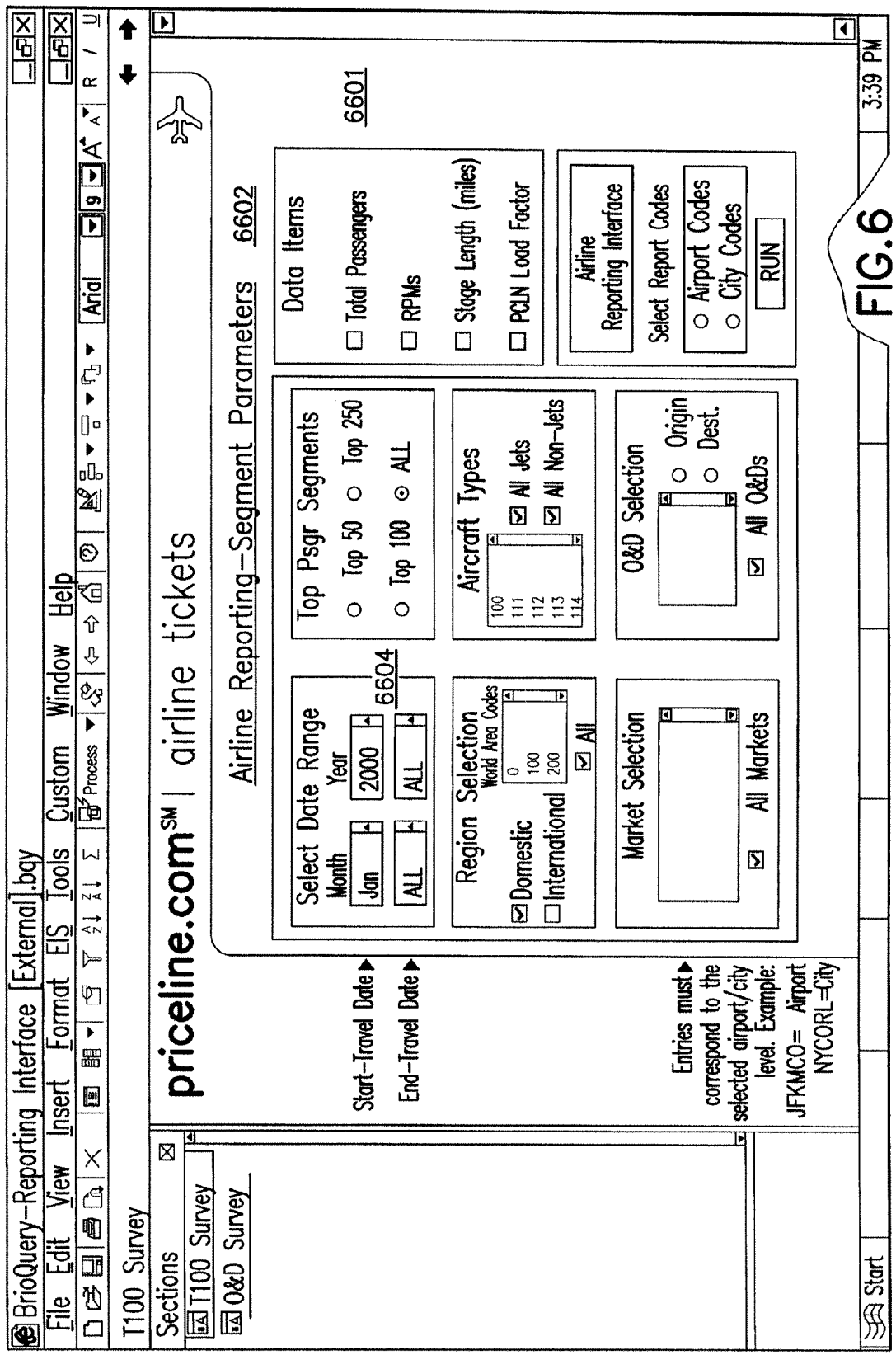
FIG. 6 illustrates one embodiment of a Demand Survey Facility (DSF)

FIG. 6 illustrates a non-limiting example embodiment of Demand Survey Facility (DSF) interface 6601. One non-limiting purpose of a Demand Survey Facility is to allow users to specify a Demand Survey Request (DSR). By making selections in the various GUI widget facilities provided in the DSF, a user both generates a query request and limits for that request (for example, selecting certain Data Items adds 7713 of FIG. 7 request items to a Query Generator Tool (QGT) Request Line 101001) while specifying a limited Date Range 7701, 7702 of FIG. 7 for those selected Data Items will add Limits to the QGT Limit Line 101002. By providing a facility that will obtain a DSR from a user, the system can then use the information specified by the DSR to return generated Demand Survey Request Results (DSRR), i.e., a demand survey, from a database and provide the results back to the user making the request. This demand information may be used by the user and/or other systems to affect and manipulate the demand for any individual and/or group of provisions.

A DSF facility may be embodied by employing standard development techniques such as, but not limited to, a QGT, such as Brio, various web form development tools, and/or the like. Also, other more proprietary deployments may be enabled such as, but not limited to other development tools such as C++ program development and Rapid Application Development (RAD) tools may allow for the construction of similar facilities.

However, web browsers have become ubiquitous user interfaces available across many platforms and as such provide a good vehicle for wide deploying of a DSF. Thus, employing JavaScript and/or web forms for deployment of a DSF allows one to take advantage of the wide availability of web browsers.

In one non-limiting example embodiment, the DSF is generated employing a QGT, which provides integration with an information server, to serve the DSF to users and associated databases. As a result, the DSF may contain hypertext 6602, web fields and/or widgets that allow a user to specify the parameters for obtaining a demand survey, i.e., a report of demand, i.e., DSRR, for specified parameters, i.e., a DSR. A DSR is constructed in response to a selection of GUI widget options by a user manipulating GUI widgets; an example of a DSR construction may be found in FIGS. 10, 11, and 12.

A DSF may be loaded by Web browsers that traverse web pages 6601 containing hypertext 6602 and/or web form elements. A web page with web form elements is a web form. A web form segment is a portion of a web form, which may be provided within a single HTML document at another location in that document (e.g., by using HTML positioning techniques such as anchors ("#")), or it may be provided by another HTML document. Initially, the DSF's interface is loaded and provided to the user. In the case of a web form embodiment, the HTML and embedded Javascript code is provided to a web browser. The embedded code provides a mechanism for the QGT to interpret user interactions with the DSF. A web form embodiment of a DSF for an air travel demand commerce system is illustrated with an example DSR 6601. The various GUI widget selections made within the DSF (for example, a date range from January 2000 through the present day) all work to establish the DSR 6601. However, many configurations can accept such DSR information. For example, rather than using popup list fields 6604 for selecting a date range, plain text fields (not shown) may be employed to allow the user to enter a date range. Not only may various web form configurations achieve, provide, and furnish a similar facility for obtaining DSRs, but alternative embodiments may be based on and developed with more proprietary tools as already mentioned. As will be evident to those skilled in the art, the particular arrangement and choice of user interface widgets capable of accepting DSRs may be varied while still providing the same basic functionality.

Demand Survey Facility Components

FIG. 7 illustrates non-limiting example embodiments of the survey components of a Demand Survey Facility (DSF) interface 7701 some of which was illustrated generally in FIG. 6. The components of a DSF generally may be arrangements of groups of widgets that allow for the specification of a DSR whereby manipulation of the GUI widgets by a user specifies the parameters of the DSR. These groups of widgets are themselves facilities that create flags that will be used by the DDSAS to obtain DSRR, and include facilities such as, but not limited to: a Date Range Selection Facility 7701, 7702; a Region Selection Facility 7703; a Market Selection Facility 7704; a Top Passenger Segments Selection Facility 7705; an Aircraft Types Selection Facility 7706; an Origin & Destination Selection Facility 7707; a Carrier Selection Facility 7708; a Flight Number & Service Class Selection Facility 7709; a Time Hour Selection Facility 7710; a Data Items Selection Facility 7713; a Run Facility 7711; and/or the like. With a user manipulating the widgets in each facility, a Query Generator Tool 4401 of FIG. 4 may create flags that are associated with database tables of a Commerce Database 1119 of FIG. 1 and represent an association between the manipulated widget and database tables. By so doing, essentially, a user is generating a request to query the Commerce Database for demand, i.e., a DSR. Of course, these facilities may be broken up or joined together in various manners and in different embodiments. For example, the Time Hour Selection Facility 7710 may be integrated into the Date Range Selection Facility 7701 and/or a Flight Number & Service Class Selection Facility 7709 may be broken up into individual facilities. Furthermore, the use of particular widget types is not restricted to the embodiments illustrated in the figures. For example, the Date Range Selection Facility 7701 may be implemented with a text field that parses user typed date ranges.

Date Range Selection Facility

The DDSAS is designed to report on a user-defined date range. The user must specify a primary start date range and an end date range. Note that the End Date should not occur chronologically before the Start Date. In one non-limiting example embodiment, a Date Range Selection Facility 7701 employs popup menu 7721 widgets and/or radio buttons 7720 to allow a user to specify a range of dates that limit the survey results of a demand survey. There may be several embodiments of a Date Range Selection facility as well as all the other facilities designed to obtain a DSR. A Date Range Selection facility may specify the month, day, year and Sales or Travel date option 7701. Alternatively, a more simple selection mechanism 7702 may allow for the specification of only the month and year. With regard to air travel and the Sales or Travel date option 7720, the user must select either the Sales Date or Travel Date option. The Sales Date option, if flagged, will allow the DDSAS to report the demand ticketed by a provider for the specified date rage. Similarly, the Travel Date option, if flagged, will allow the DDSAS to report the provider demand collected for the specified travel date range. In an alternative embodiment, the Date Range Selection Facility 7701 may be employed by the facilitator internally to generate more accurate reports, while a more limited Date Range Selection Facility 7702 may be employed externally by providers.

Region Selection Facility

A Region Selection Facility 7703 allows a user to limit the DSR and as a consequence the DSRR to a certain geographic areas. The user can specify a region: "Domestic," "International," or All by selecting both "Domestic" and "International" region options. The FIG. 7703 illustrates that only domestic flights are going requested as only the "Domestic" check box 7723 is selected. After selecting a region, the user can select specific World Area Codes (WAC) by deselecting the option "ALL" and then selecting the desired WAC. In one non-limiting example embodiment, WACs are loaded into the World Area Codes list 7703b by having the Query Generator Tool 4401 of FIG. 4 generate a query to retrieve a list of all known WACs. This widget load function is accomplished by querying an table containing WAC fields database table (see FIG. 8, e.g., Orig_City_Dim, Dest_City_Dim) in a Commerce Database 1119 of FIG. 1, obtaining the results and loading them into the widget. WACs assign numbers to certain geographic regions as is known to those skilled in the art. The user may select all WACs by selecting the "ALL" check box. If the Region does not match the Market or Origin & Destination information (e.g., selecting a New York City origin, a Los Angeles destination, and requesting an International only region), the DSR will produce no results.

Market Selection Facility

The Market Selection Facility 7704 allows the user can select which markets to be included in the demand survey. For specific market information, the user must enter the appropriate "CITY-CODE" market (e.g., "NYC," "SFO") or "AIRPORT-CODE" market (e.g., "LGA," "YOW"). These city codes and airport codes are commonly used in the airline travel industry, but many variations on the same theme may be employed (for example, instead of using codes, the full name of the city and/or airport maybe used in the selection lists). For all markets, the user may select the "ALL" check box. In one non-limiting example embodiment, markets are loaded into the Market Selection list 7704b by having the Query Generator Tool 4401 of FIG. 4 generate a query to retrieve a list of all known markets. This widget load function is accomplished by querying an market database tables (see FIG. 8, e.g., Airport_Market_Dim, City_Market_Dim) in a Commerce Database 1119 of FIG. 1, obtaining the results and loading them into the widget. In one non-limiting example embodiment, if the Market field is used, then the "ALL" option in the top passenger selection radio button 7705 is automatically selected.

Top Passenger Segments Selection Facility

The Top Passenger Segments Selection Facility 7705 allows the user to request the top "50," "100," "250" or "ALL" markets based on the number of passengers that flew in those markets. In one non-limiting example embodiment, to be able to rank and select top 50, 100, 250, or all markets, the user must leave blank the Market Selection Facility 7704 and the O&D Selection Facility 7707 and select the "ALL" check box.

Aircraft Types Selection Facility

The Aircraft Types Selection Facility 7706 allows the user to select jets or non-jets as the aircraft type by toggling radio buttons. In one non-limiting example embodiment, the system selects both options as the default. The user can select a specific aircraft type to be included in the report by unchecking the "All Jets" and "All Non-Jet" check boxes and selecting an aircraft type from the Aircraft Type selection list 7706b. In one non-limiting example embodiment, various aircraft types are loaded into the Aircraft Type selection list 7706b by having the Query Generator Tool 4401 of FIG. 4 generate a query to retrieve a list of all known airplane types. This widget load function is accomplished by querying an airplane type database tables (see FIG. 8, e.g., Equipment_Dim) in a Commerce Database 1119 of FIG. 1, obtaining the results and loading them into the widget.

Origin & Destination Selection Facility

The O&D Selection Facility 7707 allows the user to select an airport or city to be flagged as the basis of a DSR and ultimately to be included in a DSRR. For specific O&D information in the O&D selection list 7707b, the user must enter the appropriate "CITY-CODE" (e.g., "NYC," "SFO") or "AIRPORT-CODE" (e.g., "LGA," "SFO"). In one non-limiting example embodiment, flight origins and destinations may be entered into the O&D selection list 7704b. This widget load function is accomplished by querying a O&D database tables (see FIG. 8, e.g., Orig_Airport_Dim, Dest_City_Dim) in a Commerce Database 1119 of FIG. 1, obtaining the results and loading them into the widget. These airport codes and airport codes are commonly used in the airline travel industry, but many variations on the same theme may be employed (instead of using codes, the full name of the city and/or airport may be used in the selection lists). Alternatively, the user can select all flights departing or originating from a specific city or airport. If the user wishes to produce a DSSR for all airports or cities, the user should leave the selecting field blank and select the "ALL" check box. In one non-limiting example embodiment, if the O&D selection list is used, then the "ALL" option in the Top Passenger Segments Facility 7705 is automatically checked.

Carrier Selection Facility

The Carrier Selection Facility 7708 allows the user to select an airline carrier from Carrier selection lists 7708b, 7708c. The Carrier selection lists contain the carriers participating in the facilitator's offerings, and it is divided into US 7708b and Foreign 7708c carriers. However, if desired, the user can select all the carriers. For specific airline carrier, the user may select the appropriate carrier code (e.g., "AA" for American Airlines). In one non-limiting example embodiment, airline carriers are loaded into the Carrier selection lists 7704b, 7704c by having the Query Generator Tool 4401 of FIG. 4 generate a query to retrieve a list of all known carrier codes. This widget load function is accomplished by querying carrier database tables (see FIG. 8, e.g., Carrier_Dim) in a Commerce Database 1119 of FIG. 1, obtaining the results and loading them into the widget. These carrier codes are commonly used in the airline travel industry, but many variations on the same theme may be employed (instead of using codes, the full name of the carrier may be used in the selection lists). The "ALL" US carriers check box allows a user to select all the domestic participant carriers (and de-selects all the US carriers in the selection list). The "ALL" foreign carriers check box selects all the International participant carriers (and de-selects all the foreign carriers in the selection list). In an alternative embodiment, the Carrier Selection Facility 7708 may be employed by the facilitator internally to generate reports by and for specific carriers, while providers will not see the Carrier Selection Facility and their reports will be limited only to their own flights (in other words, each airline will only be able to generate reports for its flights and transactions).

Flight Number & Service Class Selection Facility

A Flight Number & Service Class Selection Facility 7709 allows a user to manually enter 4-digit flight numbers in the Flight Numbers field 7709b or check the "ALL" check box to select all flight numbers. The user can also select service classes from the Service Class selection list 7709c or check the "ALL" check box to select all service classes. In one non-limiting example embodiment, flight numbers and service classes are loaded into the selection lists 7709b, 7709c, respectively, by having the Query Generator Tool 4401 of FIG. 4 generate a query to retrieve a list of all known flight numbers and service class codes. This widget load function is accomplished by querying flight number and class database tables (see FIG. 8, e.g., Class_Dim, Flight_Number_Dim) in a Commerce Database 1119 of FIG. 1, obtaining the results and loading them into the widget. In an alternative embodiment, the Flight Number & Service Class Selection Facility 7709 may be employed by the facilitator internally to generate reports by and for specific flights and/or class selections, while providers will not see the Flight Number & Service Class Selection Facility.

Time Hour Selection Facility

A Time Hour Selection Facility 7710 allows a user to select the hour of the flights in the Time-Hour selection list 7710b or check the "ALL" check box to select all flight times. The user can also specify whether they are only interested in Departures or Arrivals for the hours selected by selecting the Departure or Arrival radio buttons.

Data Items Selection Facility

A Data Items Selection Facility 7713 allows a user to select a variety of options by way of check boxes for generation of a DSR and for ultimate inclusion in a DSRR. Each option represents an aggregate calculation. A user may select any of the data items for inclusion in a DSR, or alternatively, the user can select all options by selecting the "Select All" check box. The definitions for these aggregates, i.e., Computed Items, are defined as follows:

| | |
|---|---|
| Total Passengers: | PAX = Total number of tickets requested. |
| Revenue Passenger Miles (RPMs): | RPM = Sum of (Tickets Requested * Segment Distance). |
| Available Seat Mile (ASMs): | ASM = Sum of (Number of Seats * Segment Distance). |
| Facilitator Load Factor: | Facilitator Load Factor = Sum of offer price * Number of Tickets/Sum of Seats. |
| Stage Length (miles): | Stage Length = Sum of Segment Distance/Sum of Tickets Requested. |
| Segment Yield: | Segment Yield = Sum of (Offer Price * Number of Tickets)/Sum of (Number of Tickets * Segment Distance). |
| Segment Revenue ASM (RASM): | Segment RASM = Total Revenue/ASM. |
| Average Fare: | Average Fare = Sum of (Offer Price * Number of Tickets)/Sum of Number of Tickets. |

The "*" symbol above signifies a multiplication operation. The "/" symbol signifies a division operation. The various aggregates above are comprised from database fields such as those described in greater detail in FIG. 8. the calculations for the above aggregates are performed for ranges as specified throughout a DSR; this is accomplished by the Query Generator Tool's generation of a queries based on various selections made in the DSF.

Run Facility

A Run Facility 7714 allows a user to select the "RUN" button to process the reports. In the following non-limiting example embodiment, by selecting "RUN," ALL of the user's selections throughout the DSF will cause their respective flags, query generation, and aggregates to be constructed by the Query Generation Tool 4401 of FIG. 4. If the user forgets to make a selection of whether they want to use "Airport Codes" or "City Codes," the DSF prompts the user to select Airport or City through a window dialog 7712. Once the user makes the selection, an information dialog appears informing the user of their selection 7716. Next, the application prompts the user to select the desired file export type 7715. Then, it displays the type of export they have selected and the file location and file number 7716. The application, then proceeds to create a DSR, submit the resulting query, and affect the generation of results. In one non-limiting example embodiment, the DSRR will be returned and saved in Microsoft Excel, HTML, or Brio format based on the DSR.

Survey Schema User Interface Interactions

Figure 8:
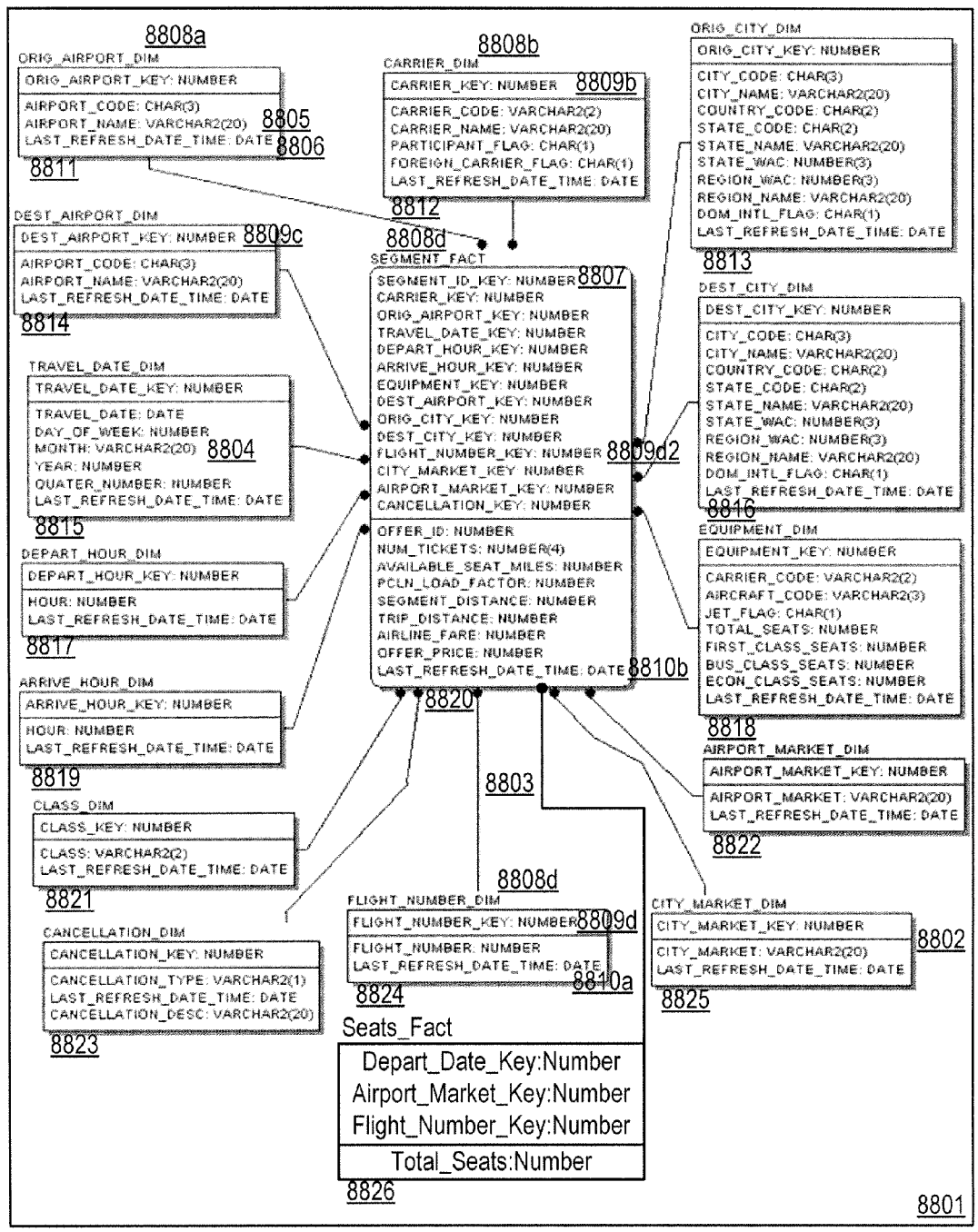
FIG. 8 illustrates database survey schema user interactions.

FIG. 8 illustrates a non-limiting example embodiment of a database schema for a Commerce Database 1119 of FIG. 1 as may be employed by a buyer-driven air travel commerce system, i.e., Facilitator or CPO Management System, 5501 of FIG. 5 and a DDSAS 5125 of FIG. 5. Various database tables represented by the segmented boxes 8802 and inter-relationships represented by interconnected lines 8803. Each table contains fields 8804. Fields represent table columns. Topic items or column headings, for each table and any listed rows thereunder correspond to the table columns. The fields themselves may be comprised of various data types. The data types may be as simple as character strings 8805, dates 8806, and/or numbers 8807. More complex and/or rich data types such as multimedia and file types may also be employed. The selection and types of data types will depend upon the requirements of the schema and the offerings of the underlying database (for example, a schema for surveying air travel transactions may be implemented as in FIG. 8 while a schema for surveying hotel transactions may include picture field types to show what the hotel and rooms look like). Each table represents a dimension 8808. Each table requires at least one key field 8809 to be used as a basis for forming relations with other tables. By designating key fields in constructing the database tables, and as a consequence a schema, other tables containing the same field may interrelate and act as relational pivot points in performing multi-dimensional analysis by way of standard data processing techniques such as, but not limited to, SQL queries including aggregations, joins, selections, and/or the like. For example, the Flight_Number_Key 8809d may act as a pivot point for the Flight_Number_Dim 8808d table (a dimension), within a Segment_Fact 8808c, 8809d2 and thus provide the Segment_Fact table with the capability producing query results with a Last_Refresh_Date_Time field 8810b as is found in the original Flight_Number_Dim table 8810a. The Flight_Number_Keys 8809d, 8809d2 establish a relationship between the two tables that allow for multi-dimensional querying. All of the tables are associated with a user's selections made in a DSF. The user's selection in essence selecting topics of interests that direct the QGT to include relevant tables for generating an SQL query. The schema includes Fact tables and non-Fact-tables both of which represent. Topics that a user may employ as the basis of conducting a demand survey. Fact tables, i.e. Fact Topics, such as the Segment_Fact table 8820 and Seats_Fact 8826 are built as vessels for obtaining, querying, and/or producing DSRR by the transformation tool as discussed in FIG. 14. The non Fact tables (tables with "Dim" suffixes in FIG. 8) are Dimensional Tables (Dimensional Topics) representing the various dimensions of topics available to a user in surveying for demand.

There is an almost infinite variety of ways to construct a schema for any given purpose. The schema may be embodied in one giant table with all required fields, or broken up into a one-field-per-table basis. However, regardless of the break up of these fields into logical groups within tables, these various embodiments ofttimes are equivalent to one another in purpose and functionality. The choice of how to construct and interrelate the tables raise performance issues known to those skilled in the art of database schema design outside the scope of this disclosure.

In one non-limiting example embodiment, a schema is designed with fields mirroring the Demand Survey Facility Component selection elements of FIG. 7. This provides for a logical basis for selecting data from a Commerce Database that will limit returned results to relevant information constrained by a DSR.

Airport Point of Origin Table

An airport point of origin table (Orig_Airport_Dim) 8811, provides: an airport code field (Airport_Code) for storing a code; an airport name field (Airport_Name) for storing the full name of the originating airport for a flight; a field indicating the last time an Orig_Airport_Dim record has been updated (Last_Refresh_Date_Time) for storing the date and time of updating; and an identification key field (Orig_Airport_Key) for uniquely identifying Orig_Airport_Dim records, which when used in other tables allows for pivotal access of Orig_Airport_Dim records for various database operations, such as, but not limited to joins, selects, aggregations, and/or others of the like. The QGT 4401 of FIG. 4 may flag the Orig_Airport_Dim when a user manipulates widgets in the O&D Selection Facility 7707 of FIG. 7 in the process of creating a DSR.

Airline Carrier Table

An airline carrier table (Carrier_Dim), 8812 provides: an airline carrier code field (Carrier_Code) for storing a code (for example AA); an airline carrier name field (Carrier_Name) for storing the full name of the airline carrier (for example, American Airlines); a field indicating the if the carrier participates in the Faciliator's CPO Management System (Participant_Flag) for storing a Boolean value representing participation; a foreign carrier flag field (Foreign_Carrier_Flag) for storing a Boolean value representing participation; a field indicating the last time a Carrier_Dim record has been updated (Last_Refresh_Date_Time) for storing the date and time of updating; and an identification key field (Carrier_Key) for uniquely identifying Carrier_Dim records, which when used in other tables allows for pivotal access of Carrier_Dim records. The QGT 4401 of FIG. 4 may flag the Carrier_Dim when a user manipulates widgets in the Carrier Selection Facility 7708 of FIG. 7 in the process of creating a DSR.

City Point of Origin Table

A city point of origin table (Orig_City_Dim) 8813, provides a city code (ity_Code) for storing a code; a city name field (City_Name) for storing the full name of the city point of origin for a flight; a country code field (Country_Code) for storing a code; a state code field (State_Code) for storing a code; a state name field (State_Name) for storing the full name of the state of the point of origin for a flight; a state WAC field (State_WAC) for storing a code for the state; a region WAC field (Region_WAC) for storing a code for the region; a region name field (Region_Name) for storing the full name of the region of the point of origin for a flight; a domestic or international flight flag field (Dom_Intl_Flag) for storing a Boolean value representing if a flight is domestic (for example, 0), or if a flight is international (for example, 1); a field indicating the last time an Orig_City_Dim record has been updated (Last_Refresh_Date_Time) for storing the date and time of updating; and an identification key field (Orig_City_Key) for uniquely identifying Orig_City_Dim records, which when used in other tables allows for pivotal access of Orig_City_Dim records. The QGT 4401 of FIG. 4 may flag the Orig_City_Dim when a user manipulates widgets in the O&D Selection Facility 7707 of FIG. 7 in the process of creating a DSR.

Destination Airport Table

A destination airport table (Dest_Airport_Dim) 8814, provides an airport code field (Airport_Code) for storing a code; an airport name field (Airport_Name) for storing the full name of the destination airport for a flight; a field indicating the last time a Dest_Airport_Dim record has been updated (Last_Refresh_Date_Time) for storing the date and time of updating; and an identification key field (Dest_Airport_Key) for uniquely identifying Dest_Airport_Dim records, which when used in other tables allows for pivotal access of Dest_Airport_Dim records. The QGT 4401 of FIG. 4 may flag the Dest_Airport_Dim when a user manipulates widgets in the O&D Selection Facility 7707 of FIG. 7 in the process of creating a DSR.

Destination City Table

A destination city table (Orig_City_Dim) 8816, provides a city code field (City_Code) for storing a code; a city name field (City_Name) for storing the full name of the destination city for a flight; a country code field (Country_Code) for storing a code; a state code field (State_Code) for storing a code; a state name field (State_Name) for storing the full name of the destination state for a flight; a state WAC field (State_WAC) for storing a code for the state; a region WAC field (Region_WAC) for storing a code for the region; a region name field (Region_Name) for storing the full name of the destination region for a flight; a domestic or international flight flag field (Dom_Intl_Flag) for storing a Boolean value representing if a flight is domestic, e.g., 0, or if a flight is international, e.g., 1; a field indicating the last time a Dest_City_Dim record has been updated (Last_Refresh_Date_Time) for storing the date and time of updating; and an identification key field (Dest_City_Key) for uniquely identifying Dest_City_Dim records, which when used in other tables allows for pivotal access of Dest_City_Dim records. The QGT 4401 of FIG. 4 may flag the Dest_City_Dim when a user manipulates widgets in the O&D Selection Facility 7707 of FIG. 7 in the process of creating a DSR.

Travel Date Table

A travel date table (Travel_Date_Dim) 8815, provides a travel date field (Travel_Date) for storing the date of travel for a flight; a week day field (Day_Of_Week) for storing the day of travel for a flight; a month field (Month for storing the month of travel for a flight); a year field (Year for storing the year of travel for a flight); a fiscal yearly quarter field (Quarter_Number) for storing the quarter of travel for a flight; a field indicating the last time a Travel_Date_Dim record has been updated (Last_Refresh_Date_Time) for storing the date and time of updating; and an identification key field (Travel_Date_Key) for uniquely identifying Travel_Date_Dim records, which when used in other tables allows for pivotal access of Travel_Date_Dim records. The QGT 4401 of FIG. 4 may flag the Travel_Date_Dim when a user manipulates widgets in the Date Range Selection Facility 7701, 7702 of FIG. 7 in the process of creating a DSR.

Departure Hour Table

A departure hour table (Depart_Hour_Dim) 8817, provides a time of departure field (Hour for storing the time of travel departure for a flight); a field indicating the last time a Depart_Hour_Dim record has been updated (Last_Refresh_Date_Time) for storing the date and time of updating; and an identification key field (Depart_Hour_Key) for uniquely identifying Depart_Hour_Dim records, which when used in other tables allows for pivotal access of Depart_Hour_Dim records. The QGT 4401 of FIG. 4 may flag the Depart_Hour_Dim when a user manipulates widgets in the Time Hour Selection Facility 7710 of FIG. 7 in the process of creating a DSR.

Arrival Hour Table

An arrival hour table (Arrive_Hour_Dim) 8819, provides a time of arrival field (Hour for storing the time of travel arrival for a flight); a field indicating the last time a Arrive_Hour_Dim record has been updated (Last_Refresh_Date_Time) for storing the date and time of updating; and an identification key field (Arrive_Hour_Key) for uniquely identifying Arrive_Hour_Dim records, which when used in other tables allows for pivotal access of Arrive_Hour_Dim records. The QGT 4401 of FIG. 4 may flag the Arrive_Hour_Dim when a user manipulates widgets in the Time Hour Selection Facility 7710 of FIG. 7 in the process of creating a DSR.

Equipment Table

An equipment table (Equipment_Dim) 8818, provides an airline carrier code field (Carrier_Code) for storing a code; an aircraft type code field (Aircraft_Code) for storing a code representing an aircraft type, e.g., 747 representing a Boeing Model 747; a jet flag field (Jet_Flag) for storing a Boolean value representing if an aircraft type is a jet, e.g., 1, or non-jet, e.g., 0, aircraft; a total number of seats field (Total_Seats) for storing the number of seats available for a particular aircraft for a flight; a number of first class seats field (First_Class_Seats) for storing the number of first class seats available for a particular aircraft for a flight; a number of business class seats field (Business_Class_Seats) for storing the number of business class seats available for a particular aircraft for a flight; a number of economy class seats field (Econ_Class_Seats) for storing the number of economy class seats available for a particular aircraft for a flight; a field indicating the last time an Equipment_Dim record has been updated (Last_Refresh_Date_Time) for storing the date and time of updating; and an identification key field (Equipment_Key) for uniquely identifying Equipment_Dim records, which when used in other tables allows for pivotal access of Equipment_Dim records. The QGT 4401 of FIG. 4 may flag the Equipment_Dim when a user manipulates widgets in the Aircraft Type Selection Facility 7706 of FIG. 7 in the process of creating a DSR.

Class Table

A class table (Class_Dim) 8821, provides a flight classification field (Class for storing the various classifications of flights available); a field indicating the last time an Class_Dim record has been updated (Last_Refresh_Date_Time) for storing the date and time of updating; and an identification key field (Class_Key) for uniquely identifying Class_Dim records, which when used in other tables allows for pivotal access of Class_Dim records. The QGT 4401 of FIG. 4 may flag the Class_Dim when a user manipulates widgets in the Flight Number & Service Class Selection Facility 7709 of FIG. 7 in the process of creating a DSR.

Cancellation Table

A cancellation table (Cancellation_Dim) 8823, provides a flight cancellation field (Cancellation_Type) for storing a various types of flight cancellations; a field indicating the last time an Cancellation_Dim record has been updated (Last_Refresh_Date_Time) for storing the date and time of updating; a flight cancellation description field (Cancellation_Desc) for storing a descriptions regarding flight cancellations; and an identification key field (Cancellation_Key) for uniquely identifying Cancellation_Dim records, which when used in other tables allows for pivotal access of Cancellation_Dim records. The QGT 4401 of FIG. 4 may flag the Cancellation_Dim when a user manipulates widgets in designed to include it (not pictured).

Airport Market Table

An airport market table (Airport_Market_Dim) 8822, provides an airport market field (Airport_Market) for storing the names of airports representing the various markets available for air travel; a field indicating the last time an Airport_Market_Dim record has been updated (Last_Refresh_Date_Time) for storing the date and time of updating; and an identification key field (Airport_Market_Key) for uniquely identifying Airport_Market_Dim records, which when used in other tables allows for pivotal access of Airport_Market_Dim records. The QGT 4401 of FIG. 4 may flag the Airport_Market_Dim when a user manipulates widgets in the Market Selection Facility 7704 of FIG. 7 in the process of creating a DSR.

City Market Table

A city market table (City_Market_Dim) 8825, provides an airport market field (City_Market) for storing the names of cities representing the various markets available for air travel; a field indicating the last time an City_Market_Dim record has been updated. (Last_Refresh_Date_Time) for storing the date and time of updating; and an identification key field (City_Market_Key) for uniquely identifying City_Market_Dim records, which when used in other tables allows for pivotal access of City_Market_Dim records. The QGT 4401 of FIG. 4 may flag the City_Market_Dim when a user manipulates widgets in the Market Selection Facility 7704 of FIG. 7 in the process of creating a DSR. Airport 8822 or city 8825 codes will be used based on a user's selection of Airport or City report codes in the Run Facility 7711 of FIG. 7.

Flight Number Table

A flight number table (Flight_Number_Dim) 8824, provides a flight number field (Flight_Number) for storing the flight number of a flight; a field indicating the last time an Flight_Number_Dim record has been updated (Last_Refresh_Date_Time) for storing the date and time of updating; and an identification key field (Flight_Number_Key) for uniquely identifying Flight_Number_Dim records, which when used in other tables allows for pivotal access of Flight_Number_Dim records. The QGT 4401 of FIG. 4 may flag the Flight_Number_Dim when a user manipulates widgets in the Flight Number & Service Class Selection Facility 7709 of FIG. 7 in the process of creating a DSR.

Seats Fact Table

A seats fact table (Seats_Fact) 8826, provides a total number of seats field (Total_Seats) for storing, typically, the aggregate, total number of seats based on queries provided by key field values in a Seats_Fact table; an identification key field (the primary key is the composite of a Depart_Date_Key, Airport_Market_Key, and Flight_Number_Key, uniquely identifying the number of seats available for any particular flight). Thus, the number of seats may be computed for an aggregate or a particular flight number, airport market, and departure date.

Segment Fact Table

A segment fact table (Segment_Fact) 8820, provides Segment Fact aggregate information based on Segment Fact aggregate identifier keys. The Segment_Fact aggregate information includes an offer identification field (Offer_ID) for storing and/or identifying offers, such as, but not limited to CPOs, based on queries provided by key field values in a Segment_Fact table; an offer price (Offer_Price) for storing offer prices, such as, but not limited to CPOs, based on queries provided by key field values in a Segment_Fact table; a number of tickets requested (Numb_Tickets) for storing the number of requested tickets based on queries provided by key field values in a Segment_Fact table; an airfare (Airline_Fare) for storing the airfare for requested tickets for an airline based on queries provided by key field values in a Segment_Fact table; a segment distance (Segment_Distance) for storing the distance, e.g., in miles, for a segment of a requested flight based on queries provided by key field values in a Segment_Fact table; a trip distance (Trip_Distance) for storing the distance, e.g., in miles, for a requested flight including all segments based on queries provided by key field values in a Segment_Fact table; an available number of seats per mile (Available_Seat_Miles) for storing the number of seats that are available per mile for a requested flight based on queries provided by key field values in a Segment_Fact table; an amount of revenue generated per passenger per mile (Revenue_Passenger_Miles) for storing the revenue generated per mile per passenger for a requested flight based on queries provided by key field values in a Segment_Fact table; and a field indicating the last time an Segment_Fact record has been updated (Last_Refresh_Date_Time) for storing the date and time of updating. Furthermore, the Segment_Fact aggregate identifier keys include an identification key field (the primary key is the composite of a Segment_ID_Key, Carrier_Key 8812, Orig_Airport_Key 8811, Travel_Date_Key 8815, Depart_Hour_Key 8817, Arrive_Hour_Key 8819, Equipment_Key 8818, Dest_Airport_Key 8814, Orig_City_Key 8813, Dest_City_Key 8816, Flight_Number_Key 8809d2,; City_Market_Key 8825, Airport_Market_Key 8814, and Cancellation_Key 8823, uniquely identifying the Segment_Fact aggregate information for any particular flight).

FIGS. 9Z, 9A, 9B, 9C, 9D, 9F, 9G, 9H, 9Q, 9J, and 9L illustrate a non-limiting example embodiment of a Dynamic Demand Survey & Affectation Server of 4125 of FIG. 4 by way of flow diagrams. Of course, the particular logic flows may be re-ordered, executed in parallel, and generally recombined achieving much the same, i.e., equivalent, effect.

Demand Survey Facility Illustration

Figure 9A:
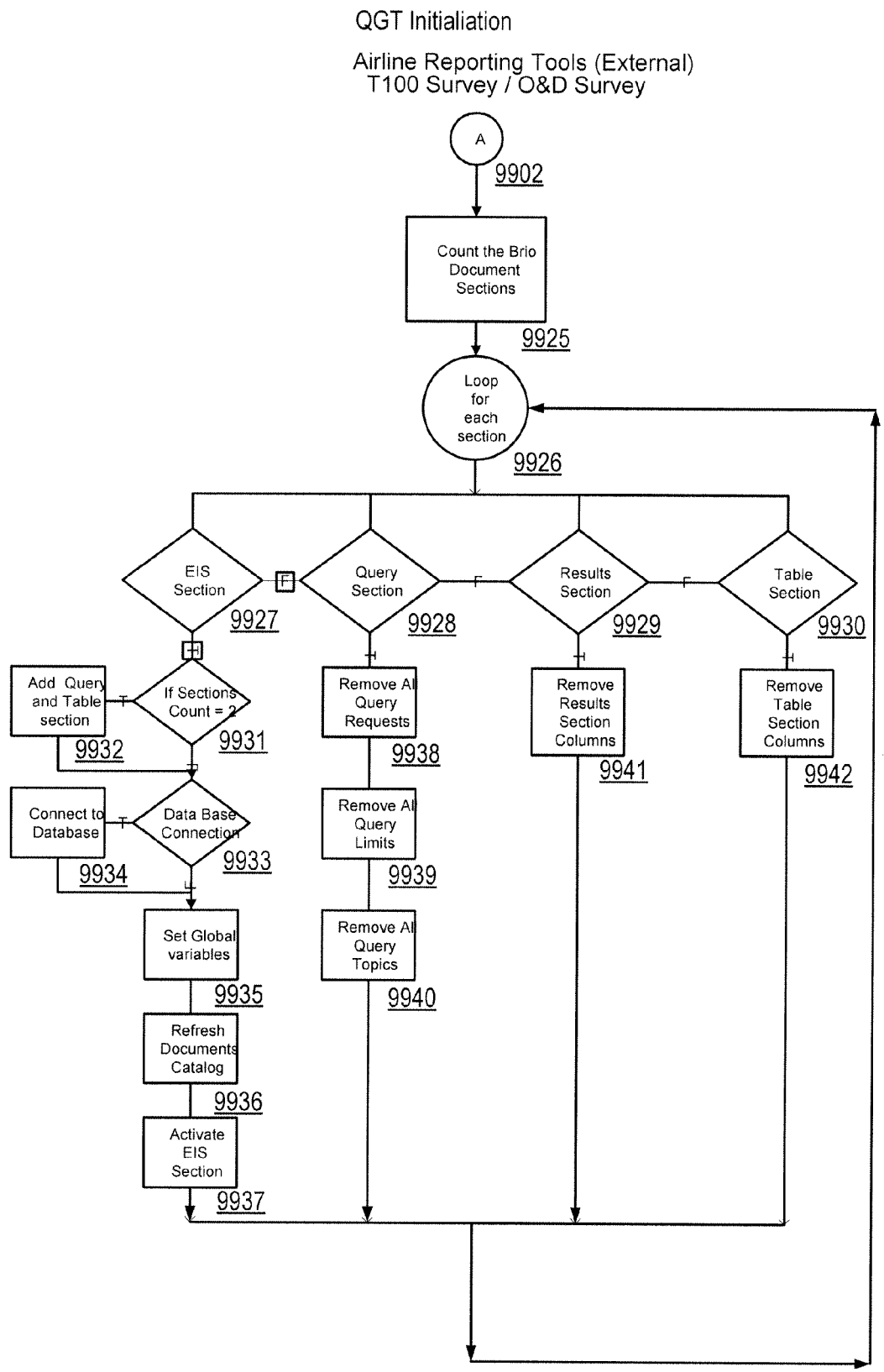
FIG. 9A is a flowchart illustrating one embodiment of a Query Generator Tool (QGT) Initialization.
Figure 9B:
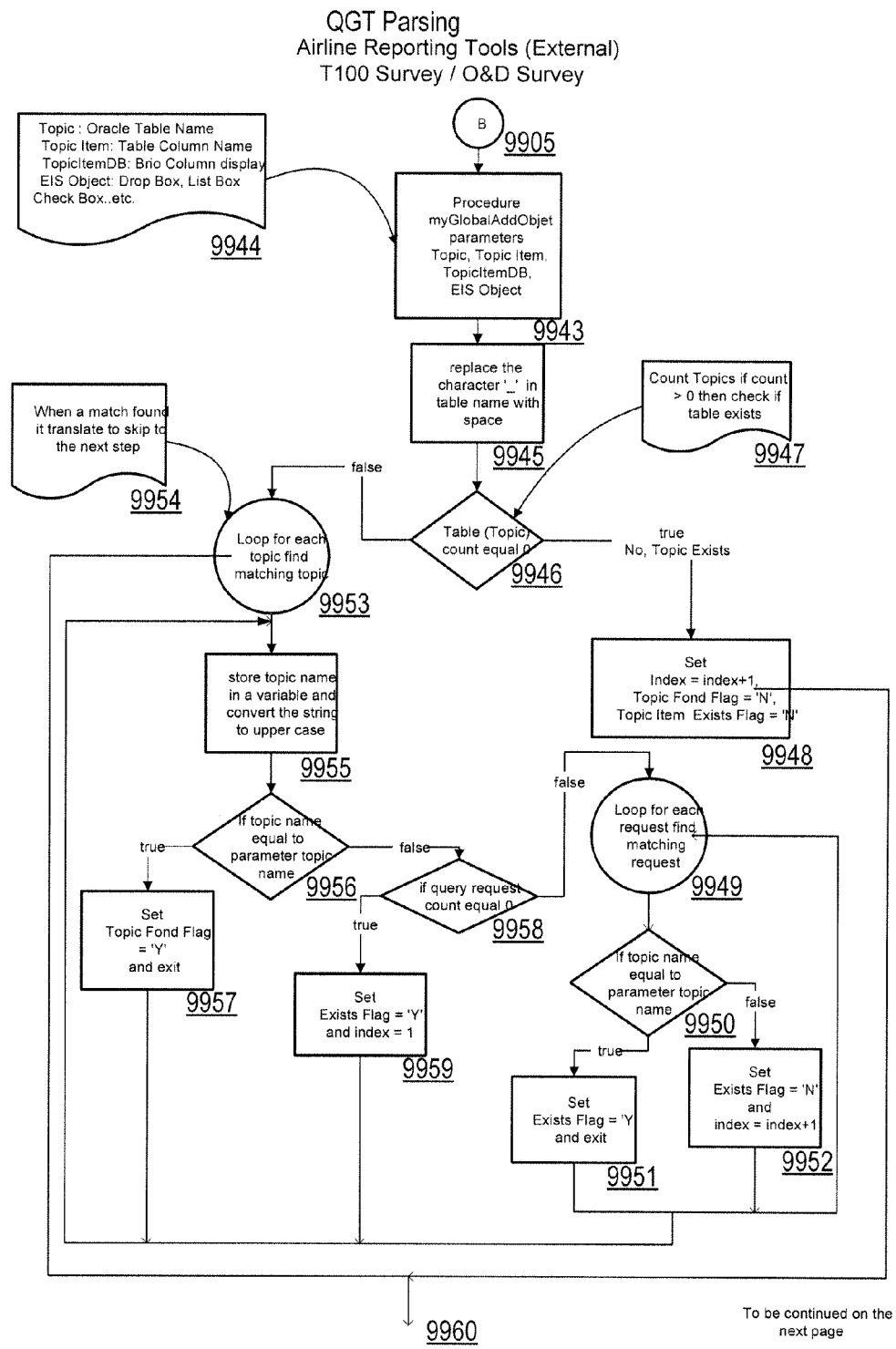
FIG. 9B is a flowchart illustrating one embodiment of QGT parsing.
Figure 9C:
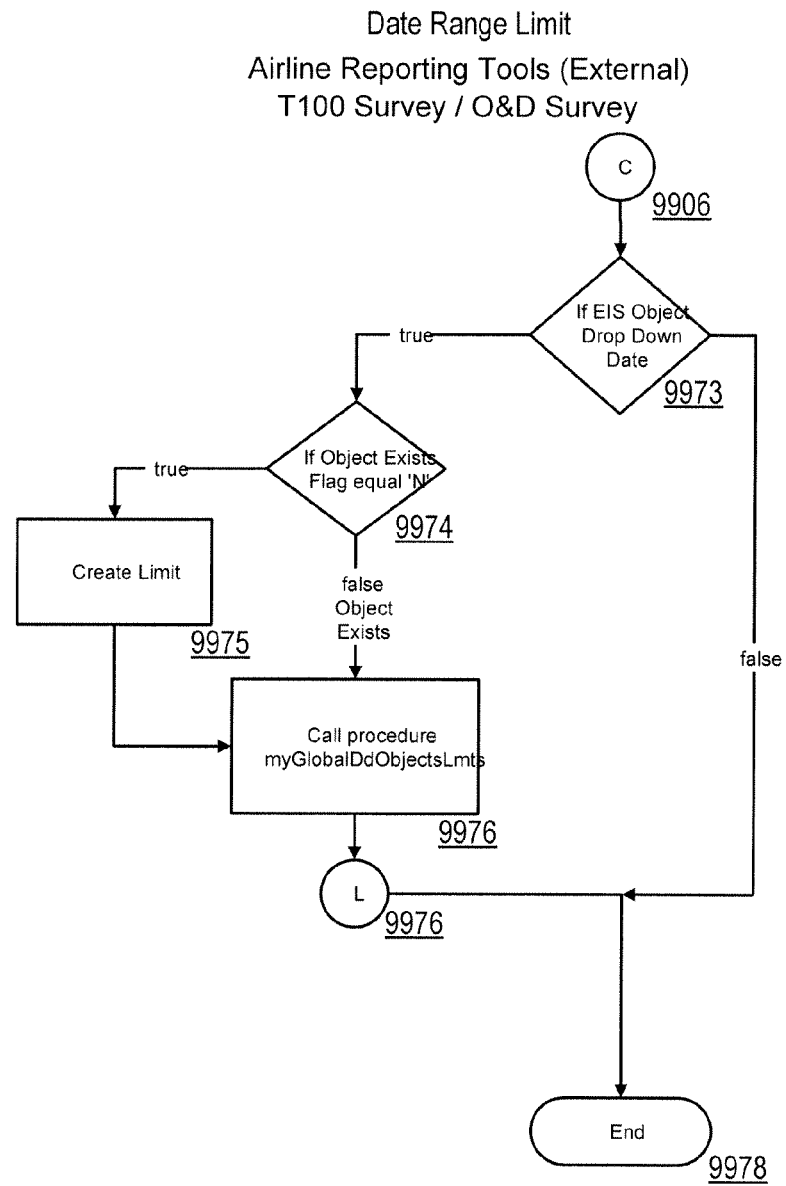
FIG. 9C is a flowchart illustrating one embodiment of date range limits.
Figure 9D:
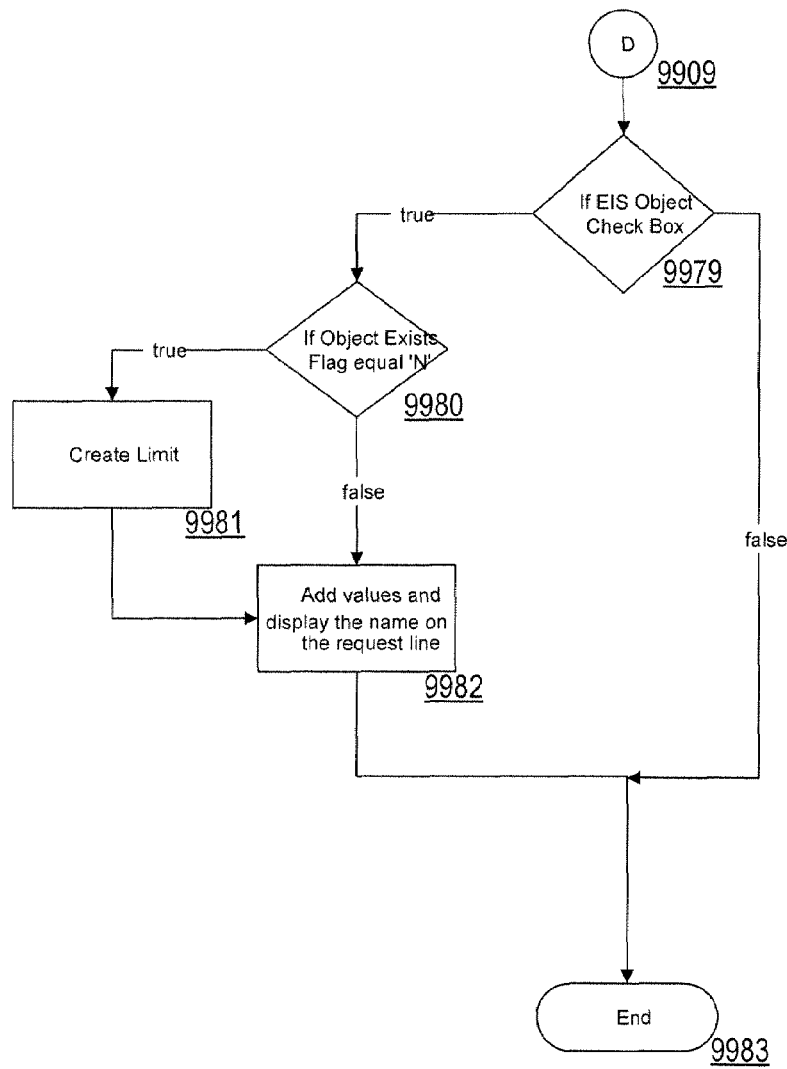
FIG. 9D is a flowchart illustrating one embodiment of check box limits.
Figure 9E:
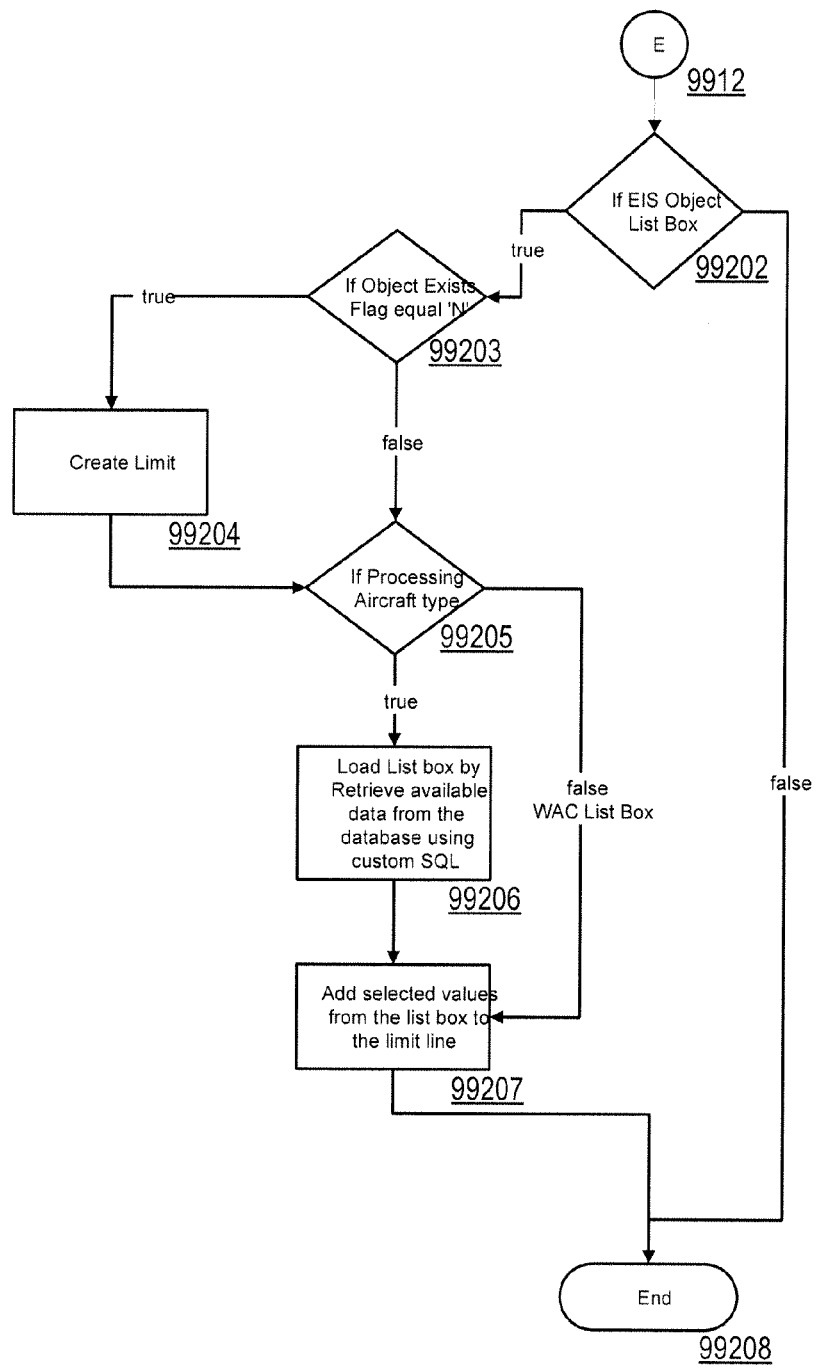
FIG. 9E is a flowchart illustrating one embodiment of list box limits.
Figure 9F:
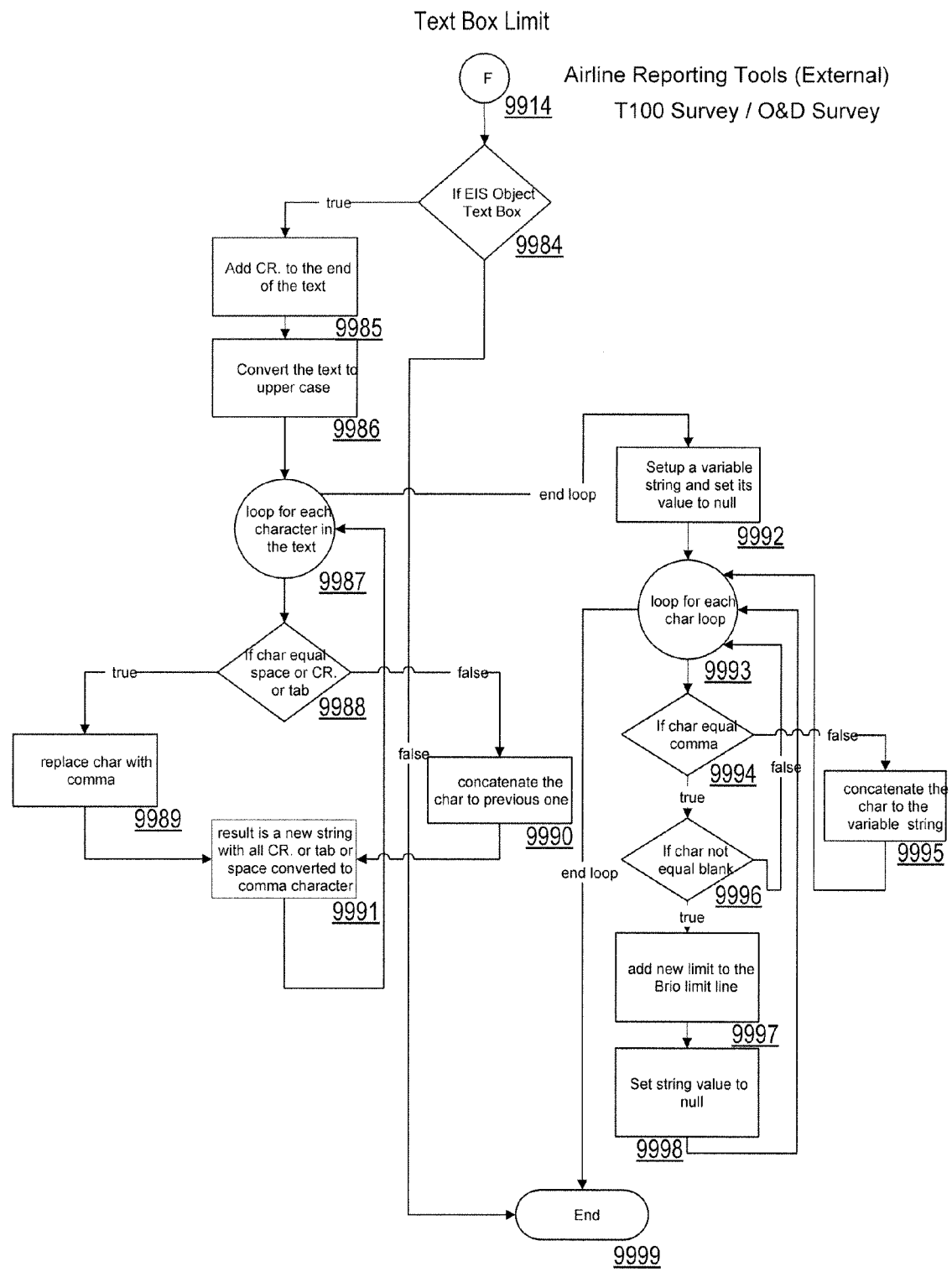
FIG. 9F is a flowchart illustrating one embodiment of text box limits.
Figure 9G:
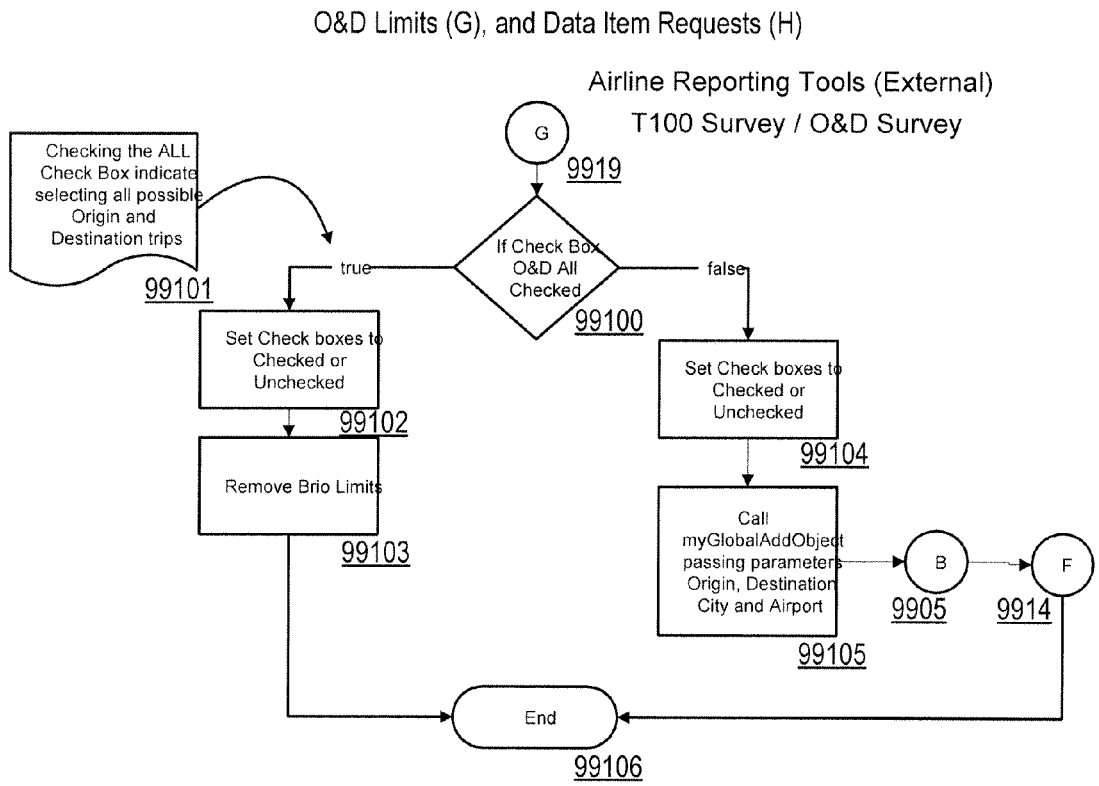
FIG. 9G is a flowchart illustrating one embodiment of Origin and Destination (O&D) limits.
Figure 9H:
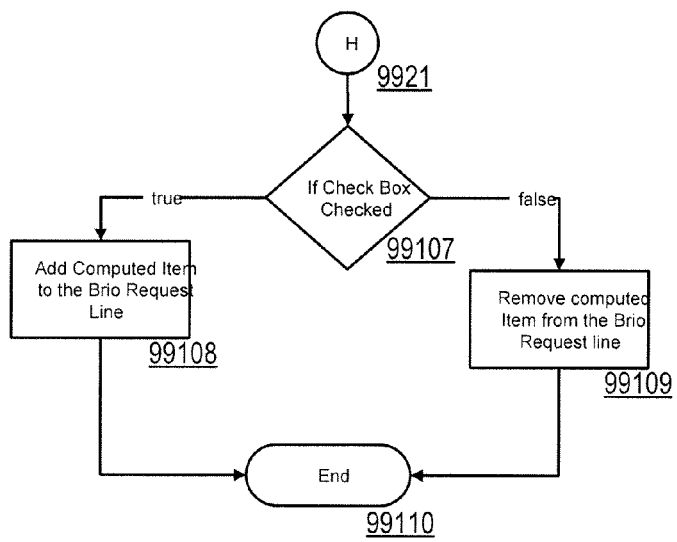
FIG. 9H is a flowchart illustrating one embodiment of data item requests.
Figure 9J:
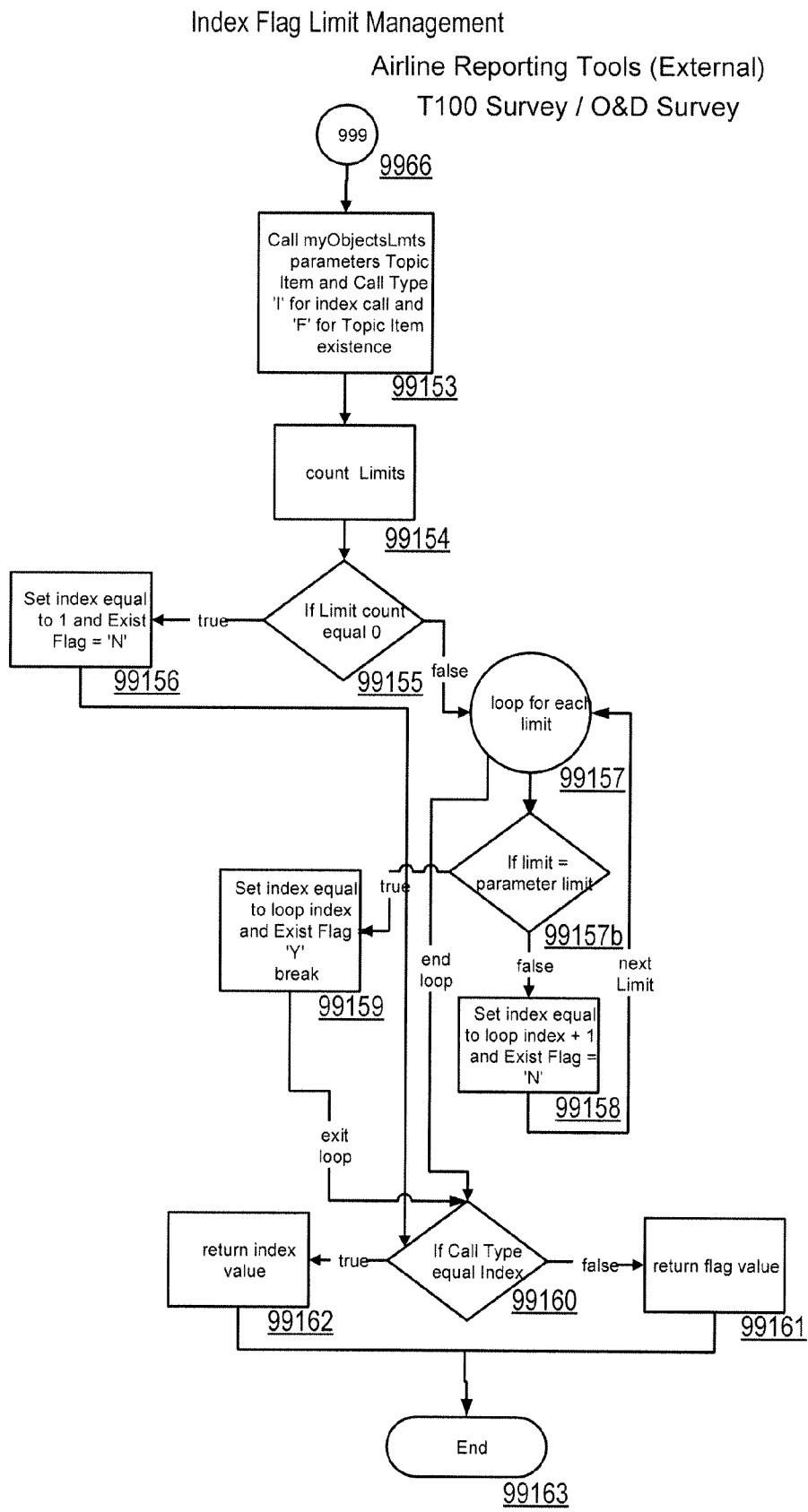
FIG. 9J is a flowchart illustrating one embodiment of index and flag limit management.
Figure 9L:
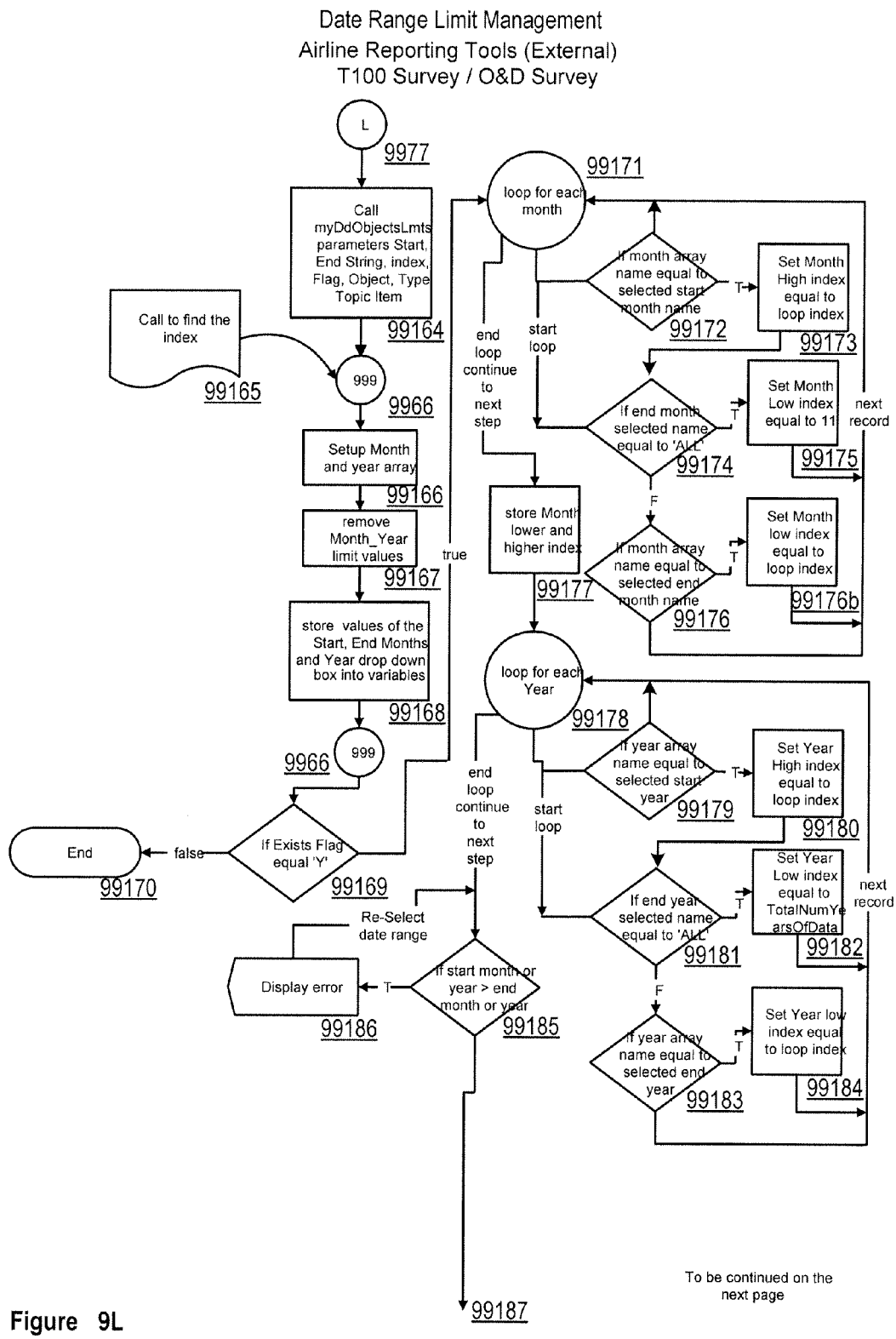
FIG. 9L is a flowchart illustrating one embodiment of date range limit management.
Figure 9Q:
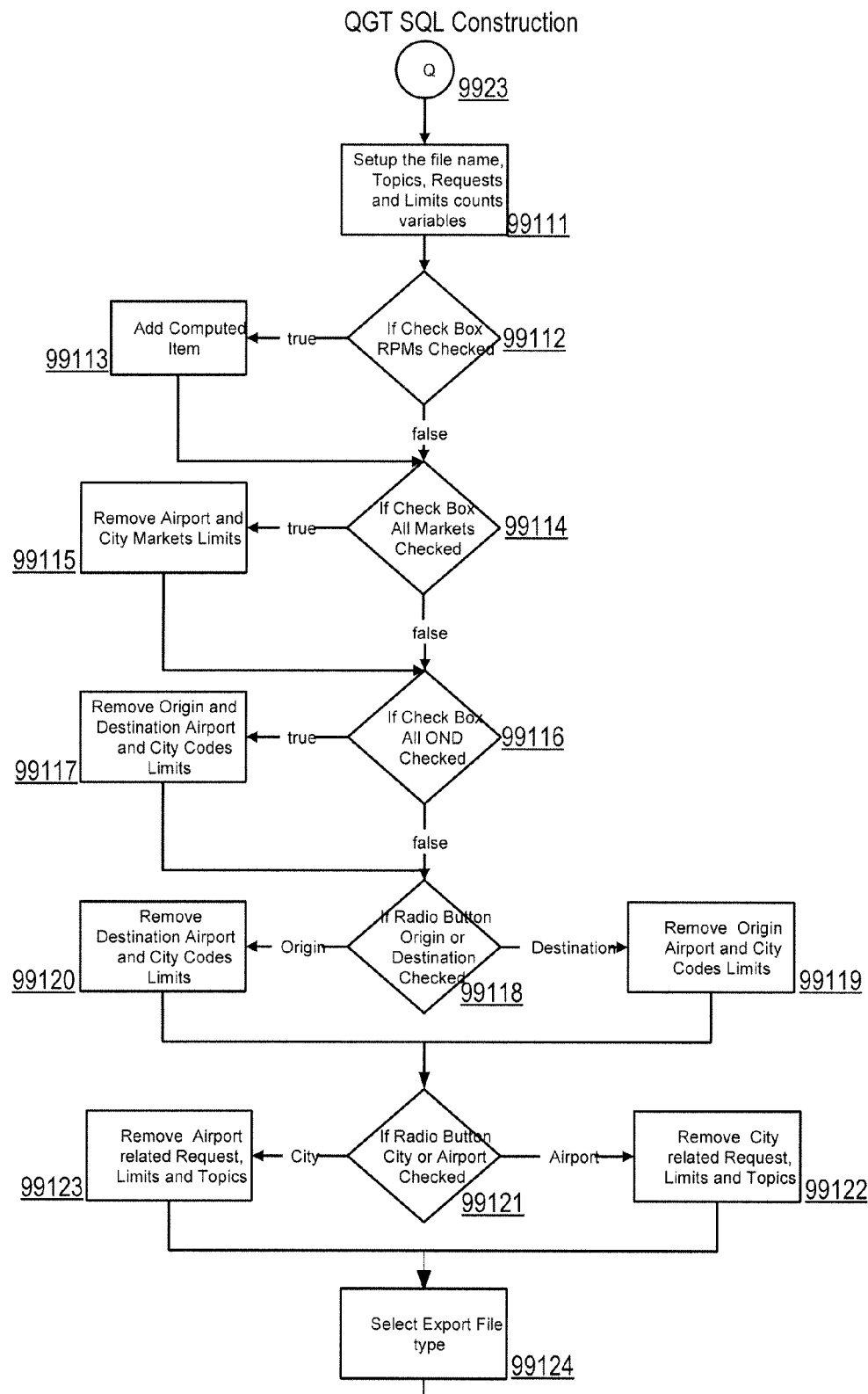
FIG. 9Q is a flowchart illustrating one embodiment of QGT SQL construction.
Figure 9Z:
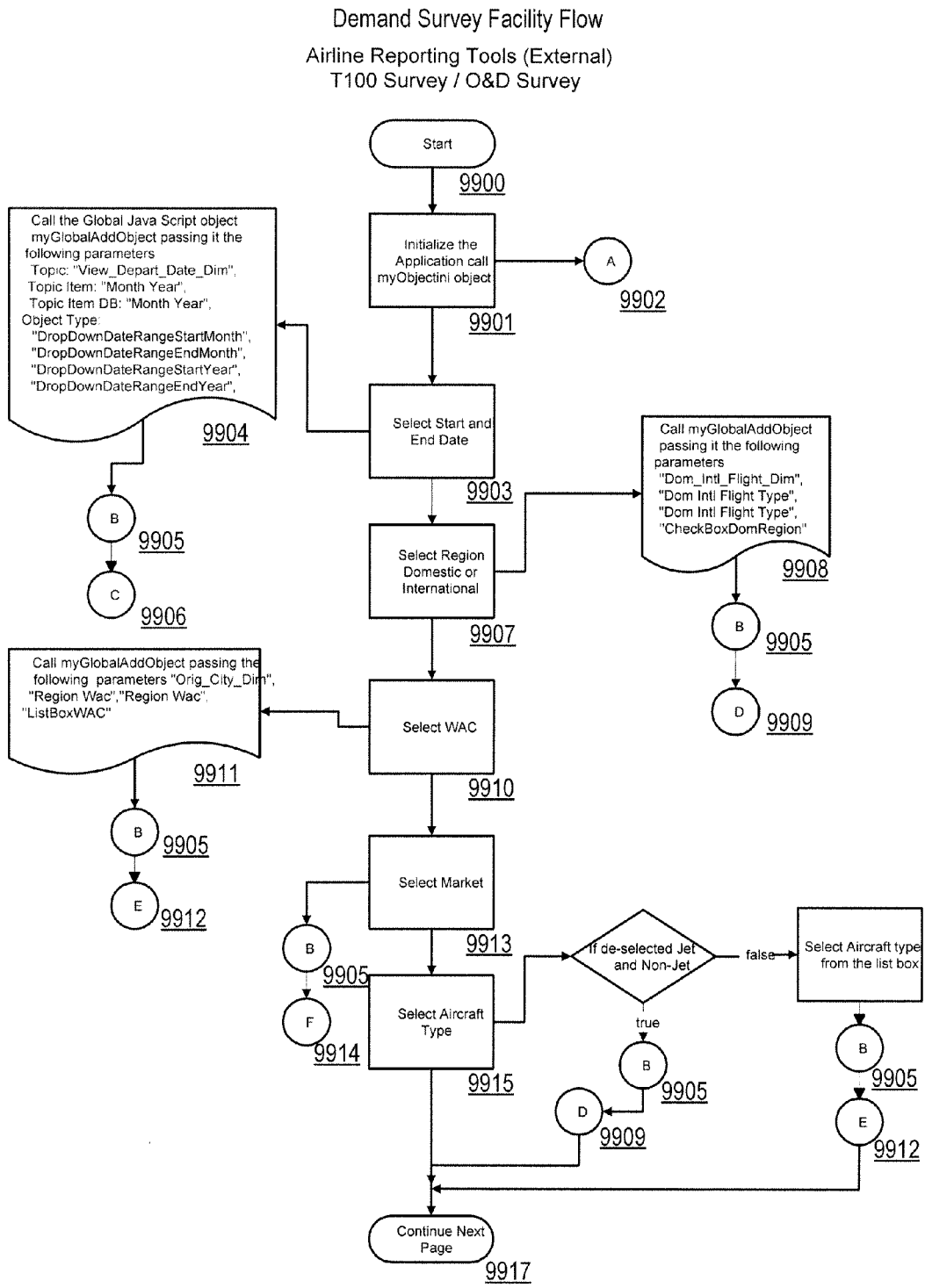
FIG. 9Z is a flowchart illustrating another embodiment of a DSF.

FIG. 9Z illustrates a non-limiting example embodiment of a Demand Survey Facility (DSF) 6601 of FIG. 6 by way of a flow diagram. The following example flow is based on the generation of a DSR from a DSF, but DRRs similarly may be generated from DRFs.

Upon a user having traversed to a navigation location and loading a DSF, execution of embedded logic will commence 9900. The embedded logic may be provided by employing Javascript and/or the like, Query Generation Tools, and/or combinations thereof, and/or the like. Upon commencing execution of a DSF, the DSF initializes requisite memory areas, data structures, user interfaces, and/or the like 9901, 9902.

With initialization 9901, 9902, the DSF will provide Date Range Selection Facility 7701 of FIG. 7 logic 9903. The Date Range Selection Facility logic 9903 provides that: a "View_Depart_Date_Dim" (this dimension is created dynamically upon call and is a view, i.e., copy of, "Travel_Date_Dim") Topic (table) that is identified 9904 for subsequent DSR query parsing 9905; a "Month Year" Topic Item (table column in QGT) will be added to the "View_Depart_Date_Dim" Topic 9904; a "Month Year" Topic Item DB (table column in the database) will be added to the "View_Depart_Date_Dim" Topic 9904; and various user interface widget settings are set for instantiation for the Date Range Selection Facility 7701 of FIG. 7. Upon provision of Date Range Selection Facility logic setup 9904, logic setup settings are provided for subsequent DSR query parsing 9905 based on user selections, and thereafter checking to make sure that the date range is valid 9906 (for example, that the start of the date range is not later than the end of the date range).

With Date Range Selection Facility logic provision 9903, the DSF provides Region Selection Facility 7703 of FIG. 7 logic 9907. The Region Selection Facility logic 9907 provides a "Dom_Intl_Flight_Dim" 111012 of FIG. 11 Topic that is identified 9908 for subsequent DSR query parsing 9905; a "Dom Intl Flight Type" Topic Item will be added to the "Dom_Intl_Flight_Dim" Topic; a "Dom Intl Flight Type" Topic Item database will be added to the "Dom_Intl_Flight_Dim" Topic; a "CheckBoxDomRegion" user interface widget settings are set for instantiation of the Regeion Selection Facility 7703 of FIG. 7. Upon provision of Region Selection Facility logic 9907, logic setup settings are provided for subsequent DSR query parsing 9905 based on user selections, and thereafter checking to make sure that proper regions are displayed 9909 in the Region Selection Facility.

With Region Selection Facility logic provision 9907, the DSF provides WAC logic 9910. The WAC logic 9910 provides an "Orig_City_Dim" 8813 of FIG. 8 Topic that is identified 9911 for subsequent DSR query parsing 9905; a "Region WAC" Topic Item selected from the "Orig_City_Dim" Topic; a "Region WAC" Topic Item selected from the "Orig_City_Dim" Topic; a "ListBox-WAC" user interface widget is identified for obtaining a listing of WACS. Upon provision of Region Selection Facility logic 9907, logic setup settings are provided for subsequent DSR query parsing 9905 based on user selections, and thereafter checking to make sure that proper regions are displayed 9909 in the Region Selection Facility. Upon provision of WAC logic 9910, logic setup settings are provided for subsequent DSR query parsing 9905 based on user selections, and thereafter checking to make sure that proper regions are displayed 9912 in the Region Selection Facility.

With WAC logic provision 9910, the DSF provides Market Selection Facility 7704 of FIG. 7 logic 9913. The Market Selection Facility logic 9913 provides selections made within the Market Selection Facility for subsequent DSR query parsing 9905 and thereafter checking to make sure that proper markets are displayed 9912 in the Market Selection Facility 7704 of FIG. 7.

With Market Selection Facility logic provision 9913, the DSF provides Aircraft Types Selection Facility 7706 of FIG. 7 logic 9915. The Aircraft Types Selection Facility logic 9915 provides selections made within the Aircraft Types Selection Facility for subsequent DSR query parsing 9905 based on user selections, and if the "Jet" and "Non-Jet" options are deselected 9916, thereafter checking to make sure that proper regions are displayed 9909 in the Region Selection Facility. Otherwise, if the "Jet" and "Non-Jet" options are selected 9916, then checking for selections in the aircraft type selection list 7706b of FIG. 7 and providing selections made within aircraft type selection list 7706b of FIG. 7 for subsequent DSR query parsing 9905 based on user selections, thereafter checking to make sure that proper markets are displayed 9912 in the Market Selection Facility 7704 of FIG. 7.

Continuing from FIG. 9Z, FIG. 9Z2 illustrates a non-limiting example embodiment of a DSF by way of a flow diagram 9917. With Aircraft Types Selection Facility logic provision 9915, the DSF provides O&D Selection Facility 7707 of FIG. 7 logic 9918. The O&D Selection Facility logic 9918 provides selections made within the O&D Selection Facility for subsequent DSR query parsing 9905 based on user selections, thereafter checking to make sure that proper origins and destinations are displayed 9919 in the O&D Selection Facility 7707 of FIG. 7.

With O&D Selection Facility logic provision 9918, the DSF provides Data Item Selection Facility 7713 of FIG. 7 logic 9920. The Data Item Selection Facility logic 9918 provides selections made within the Data Item Selection Facility for subsequent DSR query parsing based on user selections, thereafter adding computed items 9921.

With Data Item Selection Facility logic provision 9920, the DSF provides Run Selection Facility 7711 of FIG. 7 logic 9922. The Run Selection Facility logic 9920 provides selections made within the Run Selection Facility for subsequent DSR query parsing based on user selections 9923.

QUERY Generator Tool Illustration

FIGS. 9A, 9B, 9C, 9D, 9F, 9G, 9H, 9Q, 9J, and 9L illustrate a non-limiting example embodiment of a Query Generator Tool (QGT) of 4401 of FIG. 4 logic by way of flow diagrams.

QGT Initialization

FIG. 9A illustrates a non-limiting example embodiment of a QGT Initialization by way of a flow diagram. The following example flow is based on the generation of a DSR from a DSF, but DRRs similarly may be generated from DRFs.

Upon a request for initialization 9902 in a DSF 6601 of FIG. 6, the QGT counts the Brio document sections 9925 to ensure all areas are flushed of previous queries.

Upon counting the Brio document sections 9925, iteration for each document section begins 9926. With document section iteration 9926, the type of document section is determined. A determination is made if the section is of type Executive Information System (EIS), i.e., GUI widget and any user selection settings 9927; query 9928; results 9929; or table 9930.

Upon determination that the current section is an EIS Section 9927, the QGT determines if the Sections Count (a count representing intermediary QGT query application areas) is equal to "2" 9931 because in one non-limiting example embodiment two DSF interfaces may allow for different querying paramaters (for example, an internal and external interface). If true, a Query and Table section are added 9932 for initialization. If the Sections Count does not equal "2" 9931, or after adding sections 9932, the QGT determines if a database connection has been established 9933 and if not, the QGT establishes a connection to the database 9934 as provided by passed parameters (login information and the demand database). Thereafter, global variables are initialized 9935, the documents catalog, (the list of all available tables) is refreshed 9936, and the EIS section is activated 9937 and/or displayed.

Upon determination that the current section is a Query Section 9928, the QGT removes all query requests 9938, removes all query limits 9939, and removes all Query Topics 9940 (i.e., initializes clearing out any previous query remnants).

Upon determination that the current section is a Results Section 9929, the QGT removes results section columns 9941.

Upon determination that the current section is a Table Section 9930, the QGT removes table section columns 9942.

Section iteration 9926 will continue until all sections have been processed, thereafter, flow will return from the point of call.

QGT Parsing

FIG. 9B illustrates a non-limiting example embodiment of QGT Parsing by way of a flow diagram. The following example flow is based on the generation of a DSR from a DSF, but DRRs similarly may be generated from DRFS.

Upon a request for parsing 9905 in a DSF, the QGT obtains passed parameters from a DSF calling point including a Topic, Topic Item, TopicItemDB, and EIS Object 9943. The Topic is an oracle table name; the Topic Item is a table column name; the TopicItemDB is a QGT column name; the EIS Object is a GUI widget and any user and/or default settings 9944.

Upon obtaining passed parameters 9943, certain string processing and data alignment may be required for parsing user selections by the QGT 9945 et al.; such processing and alignment may be implemented in numerous and varying arrangements to similar effect, and the particular following example embodiment should not be considered in anyway limiting. Upon obtaining passed parameters 9943, the Topic is stripped of its "_" character and replaced with a space character 9945.

Upon replacing "_" characters 9945, the QGT determines if the Topic Count equals zero 9946. If the Topic Count equals zero, i.e., no Topic exists, then the Index is incremented by one, the Topic Found Flag is set to "N" and the Topic Item Exists Flag is set to "N." If the Topic Count does not equal zero 9946, Matched Topic Iteration 9953 begins. Iteration will begin and cycle through all Topics until it the current topic matches the passed parameter Topic 9943, 9953, 9954. Initially, the Topic name is stored in a variable and the string is converted into upper case 9955. Thereafter, the QGT determines if the converted Topic name is equal to the passed parameter Topic 9943, 9956, and if so the Topic Found Flag is set to "Y" 9957 and QGT parsing is exited back to the point of call. However, if the QGT determines the converted Topic name is not equal to the passed parameter Topic 9956, then the QGT determines if the Query Request Count equals zero (i.e., checking for duplicate column requests) 9958. If the QGT determines the Query Request Count equals zero 9958, then the Topic Item Exists Flag is set to "Y" and the Index is set to "1" (i.e., a duplicate does exist and an iteration starting point is provided) 9959. However, if the Query Request Count does not equal zero 9958, then Request iteration begins 9949.

Request Iteration 9949 will occur upon a Query Request Count not equaling "0" 9958, or upon flag setting 9957, 9959, 9951, 9952. Request Iteration 9949 begins with the QGT determining if the converted Topic name 9955 is equal to the passed parameter Topic 9943, 9950, and if so the Topic Item Exists Flag is set to "Y" 9951 and QGT parsing is exited back to the point of call. If the converted Topic name is not equal to the passed parameter Topic 9950, then the Topic Item Exists Flag is set to "N" and the Index is incremented by one 9952.

Continuing from FIG. 9B, FIG. 9B2 illustrates a non-limiting example embodiment of QGT Parsing by way of a flow diagram 9960.

Upon Topic Iteration 9953 completion or the setting of flags and indexes 9948, the QGT determines if the Topic Found Flag equals "N" 9961. If the Topic Found Flag equals "N" 9961, then a Topic (table) is added 9962 in the QGT work area 101012 of FIG. 10. Once a Topic is found to exist 9961 or a Topic is added 9962, the QGT determines if the Topic Item Exist Flag equals "N" 9963. If the topic item exists (the Topic Item Exists Flag does not equal "N" 9963), then the QGT adds Limits to the Limit Line based on user selections 9964. Upon adding Limits 9964, then the Limit Index and the existing Topic Items are found, and the Topic Item and call type ("1" for index and "F" for Topic Item Exists Flag) are passed 9965, 9966. Upon parameters passing 9965, 9966, Limits are added based on EIS Object parameters (the user GUI widget settings) and flow proceeds to the next call 9967. Alternatively, if the QGT determines if the Topic Item Exist Flag does not equal "Y" 9963, then Topic Item Iteration begins 9968.

Topic Item Iteration begins 9968 with setting the Topic Item name to upper case 9969. Upon changing the Topic Item case 9969, the QGT determines if the converted Topic name 9969 is equal to the passed parameter Topic 9943, 9970, and if so the QGT stores the Topic Item in a variable 9971. If the QGT determines the converted Topic name 9969 is not equal to the passed parameter Topic 9943, 9970, then Topic Item Iteration continues 9968 until all Topic Items have been examined at which point Limits are added 9964. Upon storing the Topic Item 9971, the Topic Item is added to the Query Request Line 9972 in the QGT 101001 of FIG. 10. Upon adding to the Query Request Line 101001 of FIG. 10, the Topic Item is added to the Query Request Line 9972b in the QGT 101001 of FIG. 10, thereafter continuing with Topic Item Iteration 9968.

Date Range Limit

FIG. 9C illustrates a non-limiting example embodiment of establishing a limit for a Date Range Selection Facility by way of a flow diagram.

Upon having obtained parameters 9904, 9906, the QGT determines if the EIS Object drop down dates have been established 9973. If there are no valid dates 9973, then flow terminates 9978. If there are valid dates 9973, then the QGT determines if the Object Exists Flag equals "N" (i.e., a flag to test if this GUI widget has been clicked before, and if not it will go and create a limit for this object) 9974. If no object exists, then a Limit is created 9975 (i.e., creating a limit in the Limit Line for untouched widgets), otherwise if the object exists, then a procedure may be called to ensure there are proper Date Range Limits 9976, 9977. After Date Range Limits have been properly established 9977, flow terminates 9978.

Check Box Limit

FIG. 9D illustrates a non-limiting example embodiment of establishing a limit for items selected in a EIS check boxes by way of a flow diagram.

Upon having obtained parameters 9904, 9909, the QGT determines if the EIS Object check boxes are set 9979. If there are no valid selections 9979, then flow terminates 9983. If there are valid selections 9979, then the QGT determines if the Object Exists Flag equals "N" 9980. If no object exists, then a Limit is created 9981. After limit creation 9981 or determination that an object exists 9980, then the QGT adds and displays values on the Request Line 101001 of FIG. 10. Upon Request Line display 9982 or EIS Object determination 9979, flow terminates 9983.

List Box Limit

FIG. 9E illustrates a non-limiting example embodiment of establishing a limit for items selected in EIS list boxes by way of a flow diagram.

Upon having obtained parameters 9904, 9912, the QGT determines if the EIS Object list boxes are set 99202. If there are no valid selections 99202, then flow terminates 99208. If there are valid selections 99202, then the QGT determines if the Object Exists Flag equals "N" 99203. If no object exists, then a Limit is created 99204. After limit creation 9981 or determination that an object exists 99203, then the QGT determines if its processing an Aircraft type 99205. If an Aircraft type is being processed, then the list box is loaded with data retrieved from a database using custom SQL 99206. Upon loading the list box 99206 or determining the that no Aircraft type is being loaded 99205, then items selected from the list box are added to the Limit Line 101002 of FIG. 10. Upon Limit Line display 99207 or EIS Object determination 99202, flow terminates 9983.

Text Box Limit

FIG. 9F illustrates a non-limiting example embodiment of establishing a limit for items entered in EIS text boxes by way of a flow diagram.

Upon having obtained parameters 9904, 9914, the QGT determines if the EIS Object text boxes are set 9984. If there are no valid entries 9984, then flow terminates 9999. If there are valid entries 9984, then the QGT adds a carriage return character to the end of the text 9985, and converts the text to upper case 9986.

Upon text conversion 9986, Text Iteration begins 9987 with determination if the current character is equal to a space, a carriage return, a tab, and/or other white space characters 9988. If no white space is found 9988, then current character is concatenated to the previous character 9990. Alternatively, if no white space is found 9988, then it is replaced with a comma character (or any other such character may be deemed appropriate) 9989. Upon concatenation 9990 or replacement 9989 of characters, a new string results 9991 and Text Iteration continues 9987 until all characters have been examined.

Upon completion of Character Iteration 9987, then a variable string is instantiated and its value is set to "null" 9992. Upon variable string setup 9992, Character Iteration begins 9993 with determining if the current character is a comma 9994. If the current character is not a comma, the current character is then concatenated to the variable string 9995 and Character Iteration continues 9993. However, if the current character is a comma 9994, then the QGT determines if the current character is not equal to a blank 9996, and the current character is other than blank, then Character Iteration will continue 9993. However, if the current character is blank 9996, then variable string is added as a new limit 9997 to the Limit Line 101002 of FIG. 10. After adding to the Limit Line 9997, the QGT sets the string value to "null" 9998 and Character Iteration continues 9993 until all text in the EIS Object text boxes have been examined 9984; thereafter flow terminates 9999.

O&D Limit

FIG. 9G illustrates a non-limiting example embodiment of establishing a limit for items selected in O&D check boxes by way of a flow diagram.

Upon having obtained parameters 9904, 9919, the QGT determines if the O&D "ALL" check box is set 99100. If there are no valid selections 99100, then check boxes (e.g., in the Market Selection Facility 7704, the O&D Selection Facility 7707, etc.) are set to checked or unchecked states (i.e., depending on user interaction) 99104. If the "ALL" check box is selected 99100 (a user checking "ALL" indicates that all possible Origin and Destination trips should be selected 99101) then check boxes are set to checked or unchecked states 99102 and Limit Line Entries (e.g., Brio Limits) are removed 99103. Upon setting the check boxes 99104, Origin, Destination, City and Airport parameters are passed 99105 for parsing 9905 and text limit establishment 9914. After removal 99103 or establishing 9914 Limits, flow terminates 99106.

Data Item Request

FIG. 9H illustrates a non-limiting example embodiment of establishing a request for items selected in Data Items check boxes by way of a flow diagram.

Upon having obtained parameters 9904, 9921, the QGT determines if the Data Items check boxes is set 99107. For each checked box, a respective Computed Item (formulas for which are shown above in 7713 of FIG. 7) is added 99108 to the Request Line 101001 of FIG. 10. For each unchecked box in the Data Items Selection Facility, a respective Computed Item is removed 99109 from the Request Line. Upon establishing the Request Line 99108, 99109, flow terminates 99110.

SQL Construction

FIG. 9Q illustrates a non-limiting example embodiment of a QGT SQL Construction by way of a flow diagram. The following example flow is based on the generation of a DSR from a DSF, but DRRs similarly may be generated from DRFs.

Upon a user having made selections in a DSF 6601 of FIG. 6, the QGT sets up the file name, topics, requests and limit count variables based on the selections made within the DSF (which results in a DSR) 99111; i.e., these variables limits, and the topics requested for survey depend upon the user's selections in a DSF.

Upon setup 99111, the QGT checks if the RPMs check box is selected 99112. If the check box is selected, an item is added for computation 99113 based on the formula as described in 7713 of FIG. 7. This item for computation is added based on a formal defining RPM=Sum of (Tickets Requested*Segment Distance). In one non-limiting example embodiment, the formula is embedded as javascript into the QGT (e.g., providing javascript code into BRIO for ultimate integration translation into a DSF).

Figure 10B:
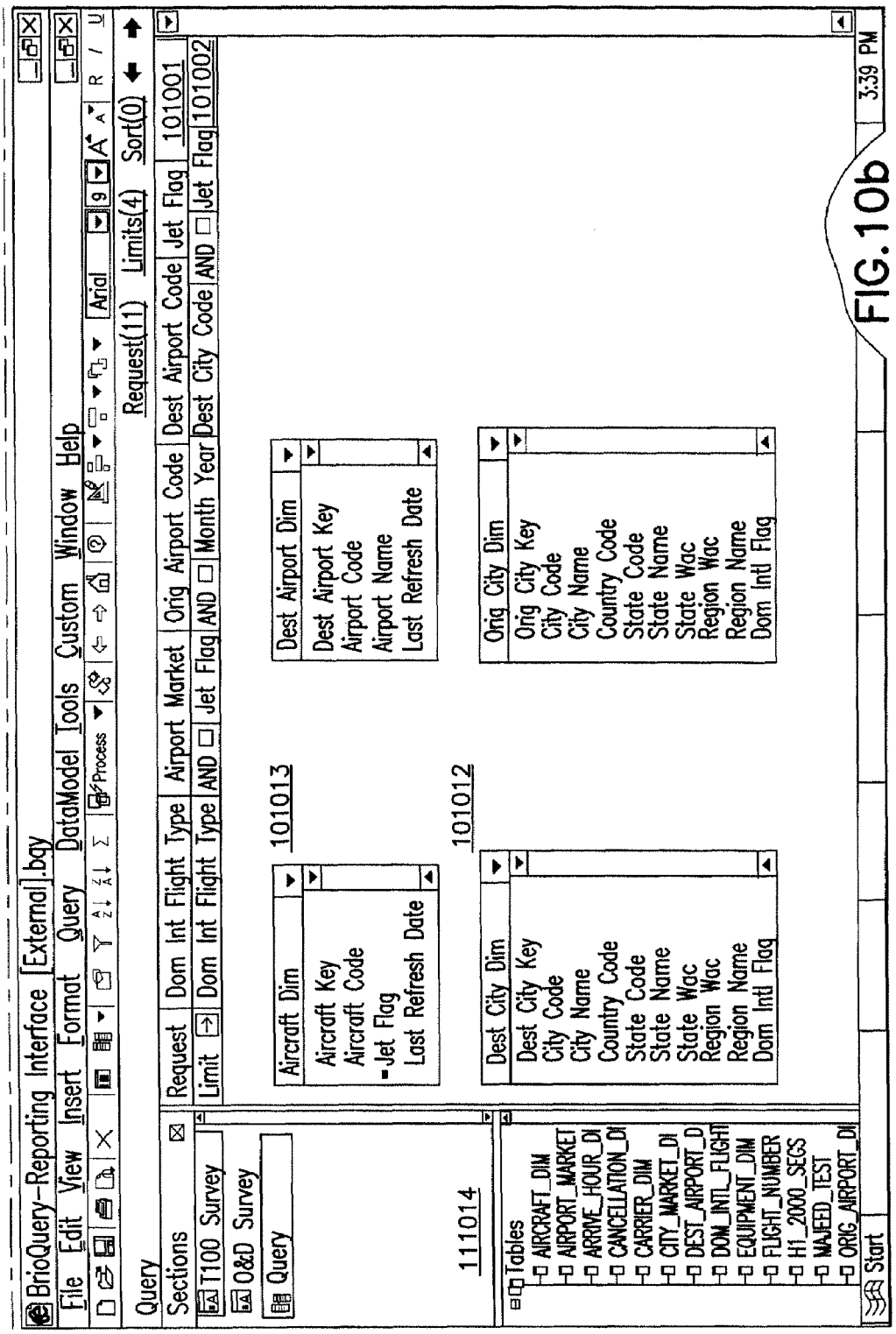
FIG. 10 illustrates one embodiment of Demand Survey Request (DSR) generation interactions.

Upon adding the computed item 99113 or upon determination that the RPMs check box is not selected in the Data Items Selection Facility 7713 of FIG. 7, then the QGT determines if the "ALL Markets" check box in the Market Selection Facility 7704 of FIG. 7 has been selected 99114. If the "ALL Markets" check box has been selected, then airport and city market limits shall be removed 99115. FIG. 10 will illustrate building request 101002 and limit 101002 based on user selections in a DSF 101003.

Upon removing airport and city market limits 9915 or upon determination that the "ALL Markets" check box is not selected in the Data Items Selection Facility 7713 of FIG. 7, then the QGT determines if the "ALL O&Ds" check box is selected 9916 in the O&D Selection Facility 7707 of FIG. 7. IF the "ALL O&D" check box is selected, then origin and destination airport and city code limits will be removed 99117.

Upon removing origin and destination airport and city code limits 99117 or upon determination that the "ALL O&D" check box is not selected 99116, then the QGT determines if the Origin or Destination radio button is selected 99118 in the O&D Selection Facility 7707 of FIG. 7. If the origin radio button is selected, then destination airport and city code limits will be removed 99120. Otherwise, if the destination radio button is selected, then the origin airport and city code limits will be removed 99119.

Upon determination of the origin or destination selection 99118, the QGT determines if the city or airport codes radio button is selected 99121 in the Run Selection Facility 7711 of FIG. 7. If the city radio button is selected, then the airport related request, limits and topics will be removed 99123. Otherwise, if the airport radio button is selected, then the city related requests, limits, and topics will be removed 99122. Thereafter, the QGT allows for the selection of an export file type for the DSRR 99124 through a selection mechanism 7715 of FIG. 7.

Continuing from FIG. 9Q, FIG. 9Q2 illustrates a non-limiting example embodiment of a Query Generator Tool (QGT) 4401 of FIG. 4 by way of a flow diagram 99125. Upon selection of an export file type 99124 of FIG. 9Q, the QGT determines if a month and year have been selected 99126 in the Date Range Selection Facility 7701, or 7702 of FIG. 7. If no month or year are specified, then the QGT will create a default month and year request and limit 99127.

Upon creation of month and year limits 99127 or upon determination that a month and year were specified 99126, then the QGT determines if the table count (the number of tables employed by the QGT for servicing a DSR) is equal to zero 99128. If no fact tables have been created, a Topic Flag is set to "N" 99130, otherwise the QGT will loop for each existing Fact table setting the Topic Flag to "Y" 99129.

Upon setting of the Topic Flag 99129, or 99130, then the QGT determines if the Topic Flag is equal to "N" 99131, and if so, a segment fact table (a Segment Fact Topic) will be created 99132 similar to the Segment Fact 8820 of FIG. 8.

Upon adding a Segment Fact Topic 99132 or upon determining if the Topic Flag is equal to "N" 99131, then the QGT will determine if the number of fact tables is not equal to zero 99137. If the table count does not equal zero 99137, then the QGT will iterate through each Topic 99133.

Topic iteration starts with determining if a Topic Item is not a Fact Topic Item 99134. If a Topic Item is a Fact Topic Item then the QGT iterates to the next Topic 99133; otherwise, the QGT finds a Dimensional Topic Item name amongst the tables of a Commerce Database 99135. Upon having found a Dimensional Topic Item (a dimensional table column) the QGT will find the primary key for the found Dimensional Topic Item 99136. Upon identification of a primary key for a topic dimension 99136, the QGT will iterate through each Topic Item 99138.

Topic Item iteration 99136 begins with determining if the found primary key for the Dimensional Topic item 99136 is equal to a primary key for a Fact Table 99139. The Fact Table was created for the particular DSR, e.g., 99132. If the fact and dimensional primary keys do not match 99139, the next Topic Item is examined, and Topic Item iteration continues 99138. If the fact and dimensional primary keys match 99139, then the Topic is selected on the basis of the found Topic Item's primary key 99140. Upon Topic selection 99140, the next Topic Item is examined and Topic Item iteration continues 99138. Topic Item iteration 99138 will continue until all Topics Items in a Topic have been examined, thereafter, iteration will end and Fact and Dimensional tables will be joined 99141.

If no fact tables remain to be iterated (the table count equals zero) 99137, or upon the joining of Fact and Dimensional tables 99141, then data will be processed and a resulting SQL query will be executed 99142.

Continuing from FIG. 9Q2, FIG. 9Q3 illustrates a non-limiting example embodiment of a Query Generator Tool (QGT) 4401 of FIG. 4 by way of a flow diagram 99142. Upon executing the resulting SQL query 99142 of FIG. 9Q2, the DDSAS will obtain the query results in tabular form 99142, i.e., DSRs are obtained. Upon obtaining the query results 99142, the DDSAS determines if the "ALL" radio button option was not selected by the user 99143 in the Top Passenger Segments Selection Facility 7705 of FIG. 7. If the "ALL" option was selected 99143, then all of the query results 99144 in a format based on the user's file export selection 7715 of FIG. 7 are exported.

Alternatively, upon determining that the "ALL" option was not selected 99143, then the DDSAS will add a Computed Item Rank column 99145 to the obtained query results 99142. Upon adding the Computed Item Rank, then Column iteration begins for the obtained result 99146. Iteration begins by copying columns from the Results Section to the Table Section (e.g., the results section is based on query results, and then put into a table for ranking purposes) 99147. Upon copying a column from the Results Section to the Table Section 99147, Column iteration continues 99146 until all columns from the Results Section have been copied.

Upon copying all columns from the Results Section 99146, 99147, the resulting Table Section is sorted and ranked 99148 (e.g., ranking is based on user selections such as, but not limited to "top 50 selections," numerical weight (e.g. highest number of people). Upon sorting and ranking 99148, a limit based upon the users selection in the Top Passenger Segments Selection Facility 7705 of FIG. 7 (for example, 50, 100, 250) is applied upon the Rank column with the "<=" operator, and/or the like limit operation 99149. Upon applying a limit to the Ranked and Sorted results 99149, the limited results and Table Sections are made visible 99150. Upon making the results visible 99150, the limited ranked results 99149 are stored in a format 99151 based on the user's file export selection 7715 of FIG. 7. Program flow terminates upon file export 99151, 99144.

Index Flag Limits Management

FIG. 9J illustrates a non-limiting example embodiment of Index Flag Limit Management by way of a flow diagram. The following example flow is based on the generation of a DSR from a DSF, but DRRs similarly may be generated from DRFs.

Upon having obtained parameters 9966, i.e., Topic Item and Call Type ("I" for Index and "F" for Topic Item Existence calls) 99153, the QGT counts the Limits in the Limit Line of the QGT 99154. Upon counting the Limits 99154, the QGT determines if the Limit Count equals zero 9915. If the Limit count equals "0" 99155, i.e., there are no Limits for the DSR, then the Index is set equal to "1" and the Topic Item Exist Flag is set to "N" 99156. Upon setting the Index and the Exist Flag 99156, the QGT determines if the Call Type is of type Index, i.e., the passed parameters call of 9966, has a Call Type equal to "I" 99153, 99160, then the Index value is returned to the point of call 99162 upon flow termination 99163. If the QGT determines the Call Type is not of type Index (the passed call of 9966 has a Call Type equal to "F" 99153, 99161), then the Flag value is returned to the point of call 99162 upon flow termination 99163

However, if the Limit count does not equal "0" 99155 (there are Limits for the DSR), then the Limit Iteration begins 99157 with the QGT determining if the current Limit (current through iteration selection 99157) equals the Limit passed as a parameter 99153, 99157*b*. If the current Limit does not match the parameter Limit 99157*b*, then the Index is set to the Limit Iteration loop counter 99157 plus "1" and the Item Topic Exists Flag is set to "N" (e.g., the Index may be an internal key captured from the QGT) 99158. If the current Limit matches the parameter Limit 99157*b*, then the Index is set to the Limit Iteration loop counter 99157 and the Item Topic Exists Flag is set to "Y" 99158. Upon adjusting the Flags and Index 99158, Iteration continues to the next Limit 99157 until all limits have been examined. Upon Limit Iteration termination, Index and Flag setting 99159, 99156, the QGT determines the Call Type 99160 and returns either an Index 99162 of Flag 99161 to the point of call upon flow termination 99163.

Date Range Limit Management

FIG. 9L illustrates a non-limiting example embodiment of Date Range Limit Management by way of a flow diagram. The following example flow is based on the generation of a DSR from a DSF, but DRRs similarly may be generated from DRFs.

Next, parameters are obtained 9977 (a Start Date string, an End Date string, an Index, a Flag (e.g., have flags for user selections been made (i.e., has the user made any user selections))), an Object (the target widget that a user has selected), a Type (the type of widget that a user has selected), and a Topic Item 99164. Upon obtaining parameters 9977, Index Flag Limits are established 9966, 99165. Upon establishing Index Flag Limits, the QGT: creates a Month and Year array 99166; removes Month_Year Limit values 99167 from the QGT Limit Line; stores the Start Month, Start Year, End Month, and End Year values from the Date Range Facilities drop down text boxes into variables; and Index Flag Limits are established 9966. Thereafter, the QGT determines if the Topic Item Exists Flag equals "Y" 99169, and if not, flow terminates 99170. If the Exists Flag equals "Y" 99169, then Month Iteration begins 99171.

Month Iteration 99171 begins with the QGT determining if the Month array name equals the Selected Start Month name 99172 (the start month selected by the user in the Date Range Facility). If the Month array value is equal to the selected Start Month 99172, then the Month High Index is set equal to the Month Iteration Counter Index 99171, 99173 and End Month determination begins 99173. If the Month array and Start Month values are not equal 99172, then Month Iteration continues 99171 until a Start Month is selected. Upon Selecting a Start Month 99171, 99172, then the End Month is determined 99174. The QGT determines if the Date Range Facility End Month date selection equals "ALL" 99174. If the End Month selection equals "ALL" 99174, then the Month Low Index is set equal to "11," i.e., the months being represented by the data set of "0–11" for each of the 12 months of the year 99175, and Month Iteration continues 99171. However, if the Date Range Facility End Month date selection is not "ALL" 99174, then the QGT determines if the Month array name equals the Date Range Facility End Month date selection. If the Month array matches the selected month 99176, then the Month Low Index is set equal to the Month Iteration Counter Index 99176*b* and Month Iteration continues 99171. If the Month array does not match the selected month 99176, then Month Iteration continues 99171. Upon completion of Month Iteration 99171, the Month Lower and Month Higher indexes are stored (e.g., variables) 91777 and Year Iteration begins 99178.

Year Iteration 99178 begins with the QGT determining if the Year array name equals the Selected Start Year name 99179 (the start year selected by the user in the Date Range Facility). If the Year array value is equal to the selected Start Year 99179, then the Year High Index is set equal to the Year Iteration Counter Index 99178, 99180 and End Year determination begins 99181. If the Year array and Start Year values are not equal 99179, then Year Iteration continues 99178 until a Start Year is selected. Upon Selecting a Start Year 99178, 99179, then the End Year is determined 99181. The QGT determines if the Date Range Facility End Year date selection equals "ALL" 99181. If the End Year selection equals "ALL" 99181, then the Year Low Index is set equal to the TotalNumYearsOfData (e.g., the maximum number of years of data available in a Demand Database) of the year 99182, and Year Iteration continues 99178. However, if the Date Range Facility End Year date selection is not "ALL" 99181, then the QGT determines if the Year array name equals the Date Range Facility End Year date selection. If the Year array matches the selected year 99183, then the Year Low Index is set equal to the Year Iteration Counter Index 99184 and Year Iteration continues 99178. If the Year array does not match the selected year 99183, then Year Iteration continues 99178. Upon completion of Year Iteration 99178, the QGT determines if the Start Mont and Year is greater than the End month and Year 99185 and displays an error 99186 if so and allowing for Date Range re-Selection. Once the Date Range is appropriately set 99185, flow continues 99187.

Continuing from 99187 of FIG. 9L, FIG. 9L2 illustrates a non-limiting example embodiment of a Date Range Limit Management by way of a flow diagram. Upon determining valid Date Range 99187, Month Array Iteration begins 99188 with the QGT determining if the Year Lower Index equals "1" 99189. If the Year Lower Index does not equal "1" 99189, then Month Array Iteration continues 99188, otherwise the Month Lower Index is set equal to "1" 99190 and Month Array Iteration continues 99188. Upon determining the Year Lower Index 99189, the QGT determines if the Month Array Iteration Count Index is between the High and Low Month indexes 99191. If the Month Array Iteration Count Index is between the High and Low Month indexes 99191, then Values (e.g., in the array) are added to the Month Year Limit in the QGT Limit Line 99192. Month Array Iteration continues 99188 upon adding values 99192 or if the Counter is not between the High and Low Month Indexes 99191.

Month Array Iteration 99188 continues for all Month Arrays thereafter the QGT determines if the Year High Index is less than the Year Lower Index. If Year High Index is not less than the Year Lower Index, then an error is displayed 99193*b* and there is a prompt for reselection. If Year High Index is less than the Year Lower Index, then the QGT determines if the Year Lower Index equals "1" 99194, and if so, the QGT sets the Month Lower Index equal to the Month High Index plus the stored Month Lower Index 99177, 99195. Otherwise or thereafter, the QGT determines if the Year Lower Index equals "1" and if the Month Lower Index does not equal "0" 99196, and if so, the QGT sets the Month High Index to "0" and the Month Lower Index to the Stored Month Lower Index 99177, 99197. Otherwise or thereafter, a Second Month Array Loop begins 99198.

Upon Second Month Array Loop Iteration 99198, the QGT determines if the Second Month Array Counter Index 99198 is between the High and Low Month Indexes 99199. If the Second Month Array Counter Index 99199 is between the High and Low Month Indexes 99199, then Values are added to the Month Year Limit 99200. Month Array Iteration continues 99198 upon adding values 99200 or if the Counter is not between the High and Low Month Indexes 99199. Upon Second Month Array Loop Iteration exhaustion 99198, flow terminates 99201.

Demand Survey Request Generation Interactions

Figures 11, 11A:
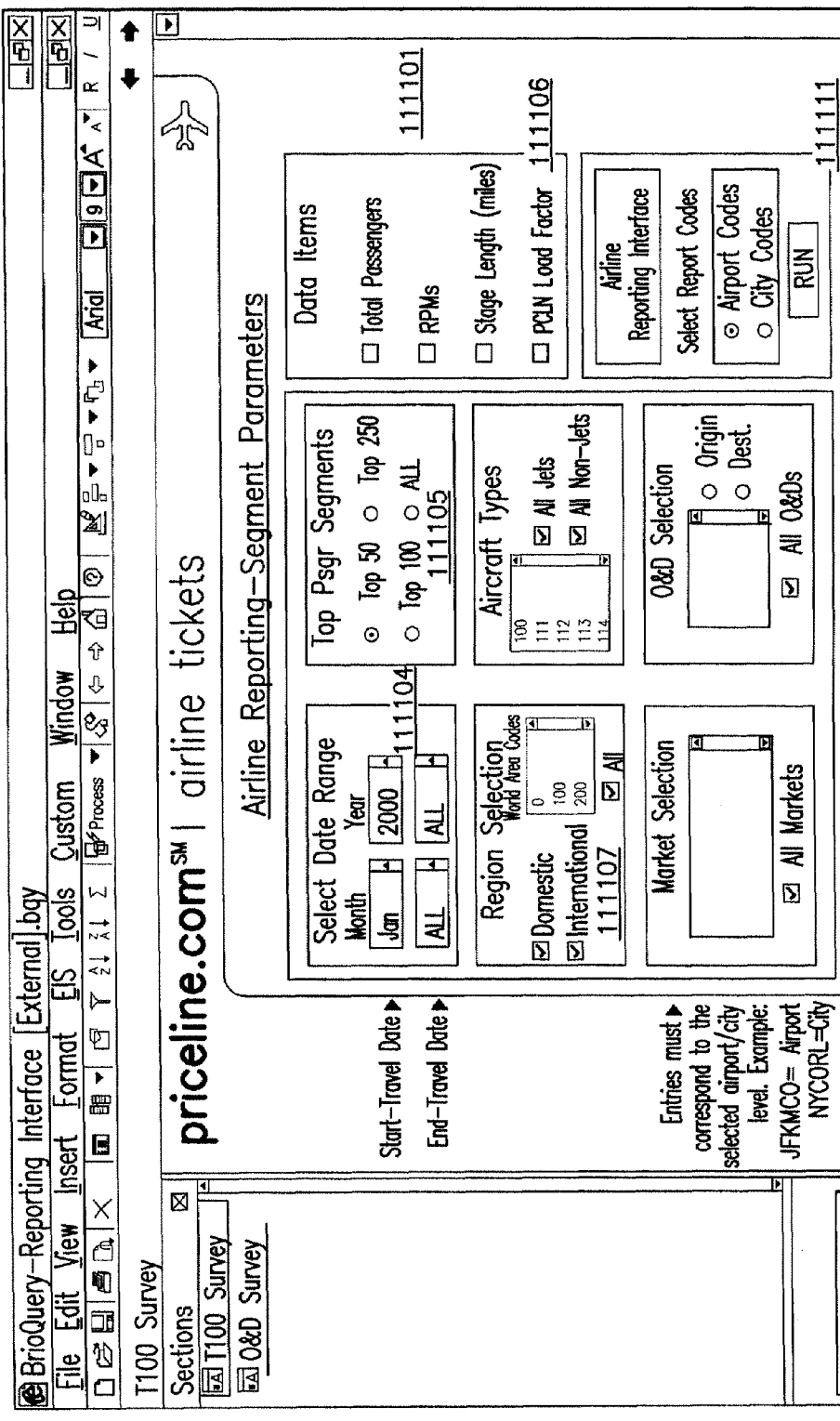
FIG. 11 continues to illustrate one embodiment of DSR generation interactions.
Figure 11B:
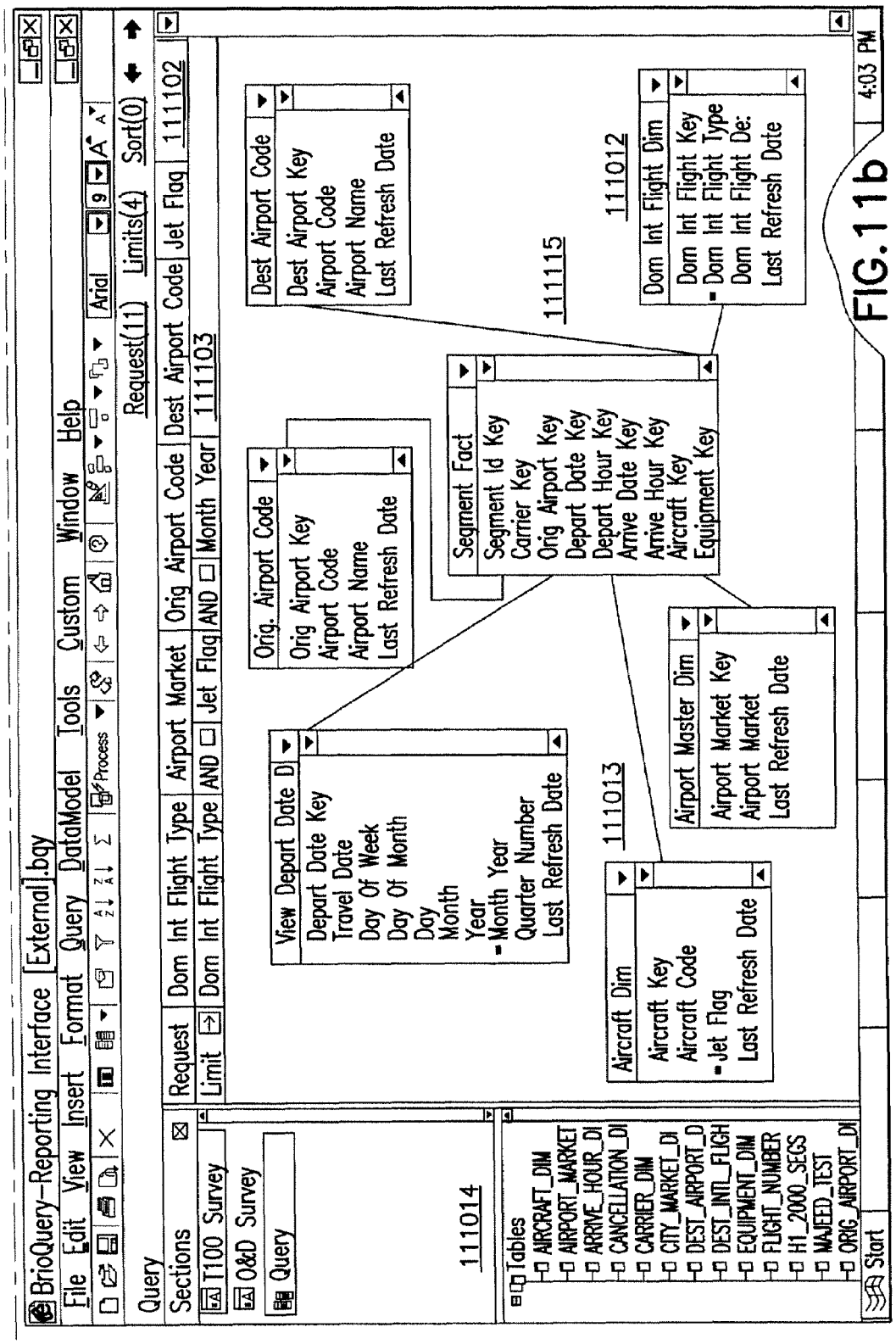
Figures 12, 12A, 12B:
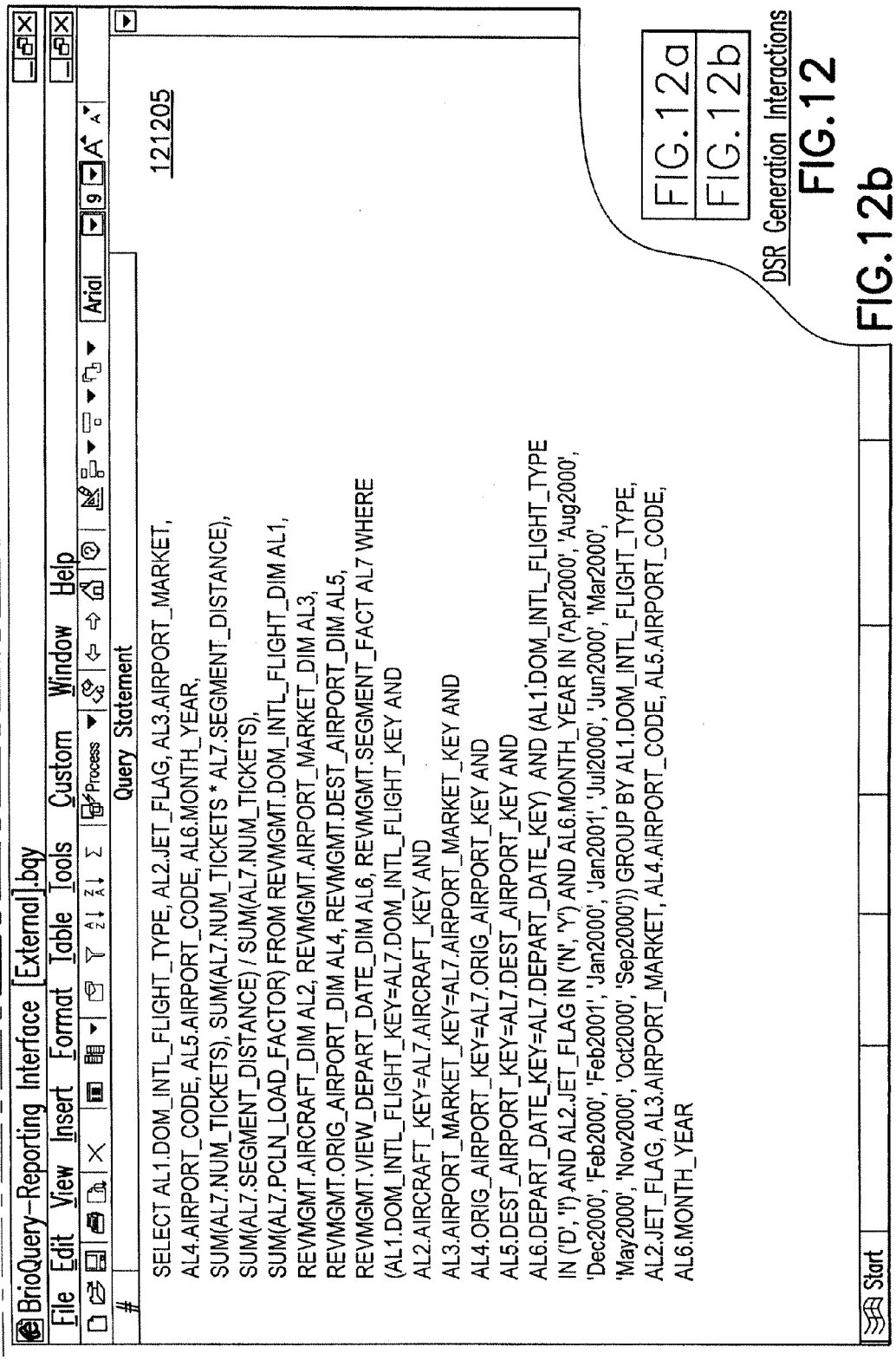
FIG. 12 continues to illustrate one embodiment of DSR generation interactions.

FIGS. 10, 11, and 12 illustrate a non-limiting example of a Demand Survey Request (DSR) and the various DSF and QGT interactions that result from the user's interaction with the DSF in generating the DSR. Initially in FIG. 10, a user traverses upon a DSF 101003 and it is displayed with certain GUI widget default settings (for example, a Select Date Range Selection Facility 101004 Start Month Year of "Jan" "2000" and "ALL" subsequent times); a Top Passenger Segments Selection Facility 101005 set to "ALL"; a Data Items Selection Facility 101006 with no items selected; a Region Selection Facility 101007 with "Domestic" and "ALL" WACs options set; an Aircraft Types Selection Facility 101008 with "All Jets" and "All Non-Jets" options selected; a Market Selection Facility 101009 with "All Markets" option selected; an O&D Selection Facility 101010 with "ALL O&Ds" option selected; and an unselected Run Facility 101011.

Based on the above example default DSF selections, a QGT would parse the a resulting DSR in the QGT Request Line 101001 and QGT Limit Line 101002: a Request Line having selected a Dom Intl Flight Type, an Airport Market, City Market, Orig Airport Code, Orig City Code, Dest Airport Code, Dest City Code, and Jet Flag; and a Limit Line limiting the request to "Dom Intl Flight Type" and "Airport Market" and "City Market" and "Orig Airport Code" and "Orig City Code" and "Dest Airport Code" and "Dest City Code" and a "Jet Flag" 101002. Topics 101012, i.e., Tables 101014, are selected based on the requested Topic Items 101001, i.e., Table Columns 101013. For example, because the "ALL Jets" option was selected in the Aircraft Types Selection Facility 101008, the QGT parsed the user selection and put in an entry into the Request Line for a "Jet Flag" 101001 and Limit Line 101002, which resulted in selecting the Aircraft_Dim Topic 101013.

FIG. 11 continues from FIG. 10 with a user specifying a DSR by changing various GUI widget default settings (for example, a Select Date Range Selection Facility 111104

Start Month Year of "Jan" "2000" and "End Month of "Feb" through "ALL" subsequent years); a Top Passenger Segments Selection Facility 111105 now set to "50"; Data Items Selection Facility 111106 with all items selected; an Run Facility 111111 with the "Airport Codes" option now selected; and all other DSF options remaining as in FIG. 10.

Based on the above example default DSF selections, a QGT would parse the a resulting DSR in the QGT Request Line 11101 and QGT Limit Line 111102: a Request Line having selected a Dom Intl Flight Type, an Airport Market, Orig Airport Code, Dest Airport Code, Jet Flag, Month Year, Month_Year, and computed items (SUM(PAX), SUM (RPMs), SUM(Miles), SUM(FacilityLoadFactor)); and a Limit Line limiting the request to "Dom Intl Flight Type" and "Jet Flag" and "Month Year" and "Month_Year" 1111102. Topics 111012, i.e., Tables 111014, are joined based on the requested Topic Items 111101, i.e., Table Columns 111013. For example, because the "All Jets" option was selected in the Aircraft Types Selection Facility 101008 of FIG. 10, the QGT parsed the user selection and put in an entry into the Request Line for a "Jet Flag" 111101, which resulted in selecting the Aircraft_Dim Topic 111013 being joined to the Segment_Fact Topic 111115 by way of the Jet Flag key 111013.

FIG. 12 continues from FIG. 11 with a user submitting a DSR by engaging the Run Facility's "RUN" button 121202 and selecting a DSRR export format 121203. Upon selection of an export format, the QGT parses the Request Line 111101 of FIG. 11 and Limit Line 111102 of FIG. 11 and an SQL query embodying the users DSR is generated 121205 and submitted to a Commerce Database that will return DSRR.

Demand Survey Request System Flow

Figure 13:
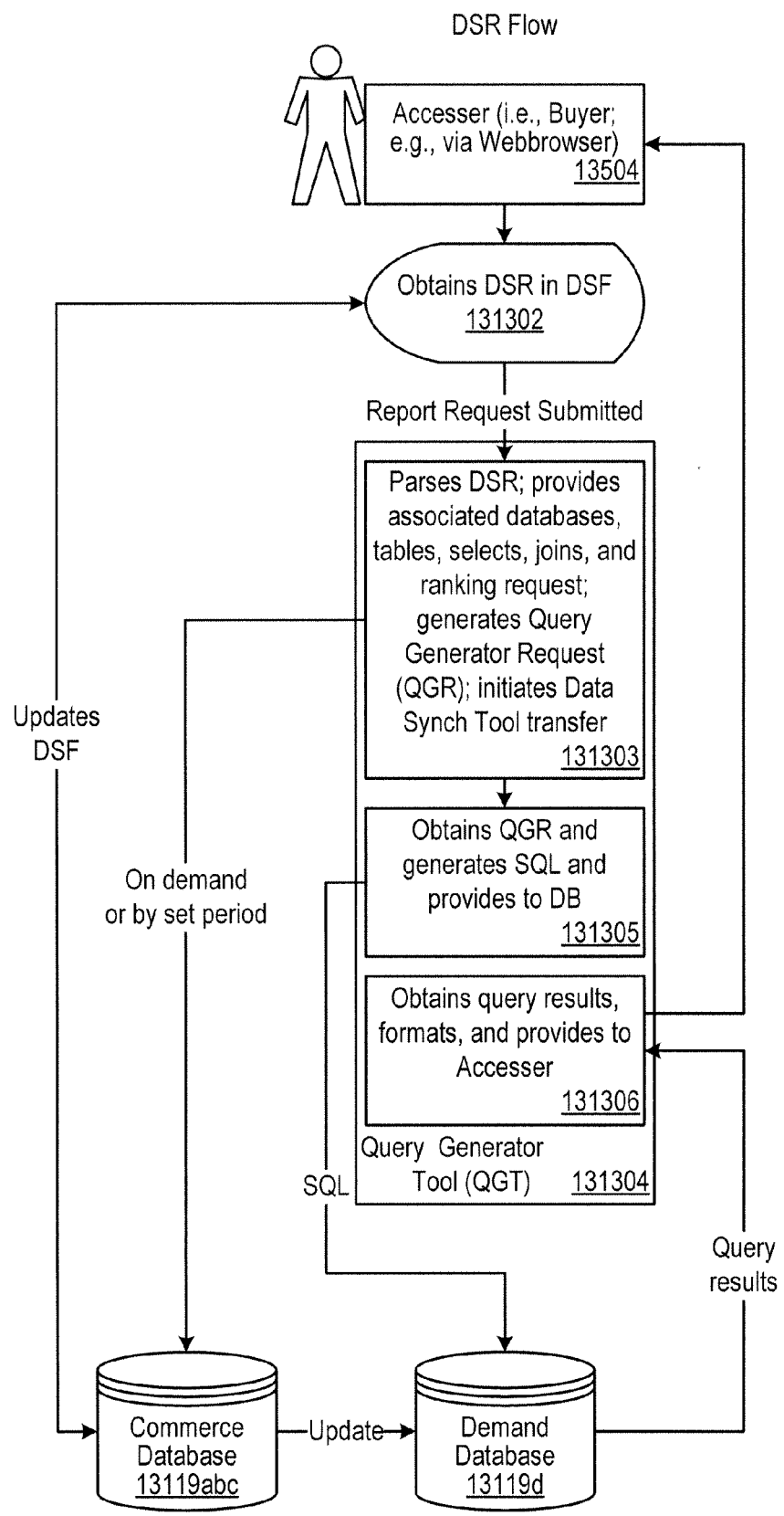
FIG. 13 illustrates one embodiment of DSR system flow.

FIG. 13 illustrates a non-limiting example of a Demand Survey Request data flow that results from the user's interaction with the DSF in generating the DSR. Initially, a user 13504, traverses upon and obtains a DSF 131302 from an information server. Upon the Accesser's system obtaining the DSF, the DSF may update its various facilities by updating information either from a Commerce Database 12119abc or Demand Database 13119d (for example, loading Aircraft Types in an Aircraft Type Selection Facility in the DSF). Upon the Accesser's constructing and submitting a DSR in the DSF 121202, the GUI widget settings selected by the Accesser are submitted to code either embedded within the DSF as Javascript or to a Query Generator Tool (QGT) 131303. The GUI widget Accesser selections are parsed; associated databases, tables, selects, joins, and ranking requests are all provided; a Query Generator Request (QGR) (the parsed DSR as embodied in the QGT's Request 111101 of FIG. 11 and Limit 111102 of FIG. 11 Lines) is generated; and if required, a Data Synch Tool 4404 of FIG. 4 is instructed to update a Demand Database 13119d from a Commerce Database 12119abce on demand/or by a set period (for example, via cron task).

Upon parsing the DSR and generating a QGR 131303, the QGT 131304 obtains the QGR and generates an SQL (as has already been discussed) version of the Accesser's DSR and provides it to a database 131305, e.g., a Demand Database 13119d. Upon obtaining the SQL query request 131305, the Demand Database 12119d provides the query results back to the QGT 131304. The QGT obtains the query results, formats the results according to Accesser selections, and provides the formatted results 131306 to the Accesser 13504.

Database Load Flow

Figure 14A:
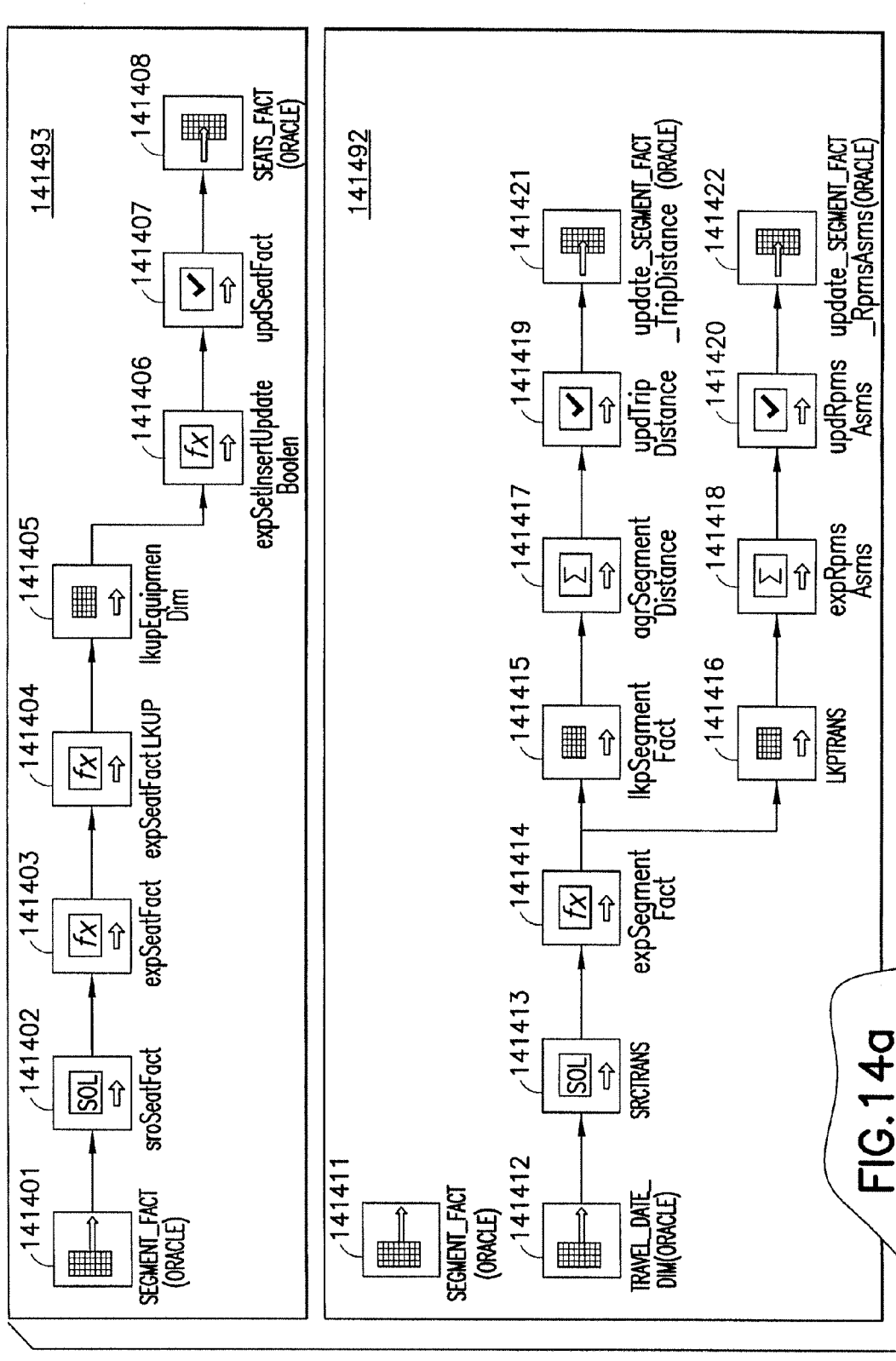
FIG. 14 illustrates one embodiment of database load flow.

FIG. 14 illustrates a non-limiting example of Database Load Flow that for a DDSAS to enable DSFs and DSRs.

To load the data in the Demand Database 13119d of FIG. 13, a Data Synch Tool (DST) 4404 of FIG. 4 may be employed to transform data (e.g., a tool such as, but not limited to Informatica). The DST allows developers to create transformation mappings to transfer the data from a transaction database (for example, a Commerce Database) to a data warehouse (for example, a Demand Database). In the mapping the developers code and enforce business rules on the data transformation.

Initially, to load a Demand Database all the offers, e.g., CPOs, that are booked by a Facilitator are captured. Next, the traveling period is determined. Next, the itinerary of the demand ("Origin & Destination of the round trip") are determined. Next, the distance ("round trip distance and single segment distance") traveled for each booked offer is determined. Next, the trip load factor and the available seat miles for each segment of the flight are determined. To create a Demand Database, a QGT will perform: a transformation mapping to load the data into the warehouse 141491, a transformation mapping to calculate the total trip distance 141492, and a transformation mapping to calculate Total Seats.

Transformation mappings start with a source Database Table 141401, 141411, 141431 and SQL 141402, 141413, 141432 to eventually result in a resulting target table 141408, 141421, 141422, 141444. Lookup transformations are depicted with a sphere over a table matrix and an arrow, e.g., 141405, 141415, 141416, 141430, 141440. Functions allow for the creation of variables for variable flow and are depicted with an arrow underneath an "fx" mark, e.g., 141403, 141404, 141406, 141414, 141417, 141418, 141439, 141441. Object transformations (e.g., insert or deletes for objects) are represented by a check mark above an arrow, e.g., 141407, 141419, 141420, 141443. A sequence generator (e.g., creating the next sequence of a number), e.g., 141438. A filter (e.g., for pruning unwanted results) is represented by an inverted cone over an arrow, e.g., 141442.

Transformation mapping to calculate Total Seats

The Transformation mapping to calculate Total Seats 141493 attempts to get an aggregate based on the Segment Fact. Starting with the segment fact table 141401, the DST pulls all the columns necessary for this transformation 141402, and then DST uses only the columns required for this transformation 141403, and then the DST looks up the fact tables (e.g., FIG. 8) required for the transformation 141404. Next, the DST looks up what equipment is available (for example, the number of seats for each plane) 141405. Next, the DST combines the results from the previous look ups 141404, 141405, and the location of those results will be stored there 141406. Next the DST updates the resulting data (e.g., removing duplicates, and/or the like) 141407, which results in a Seats_Fact table 141408 (e.g., showing a load and/or total seats for a particular market, etc.).

Transformation Mapping to Calculate the Total Trip Distance.

The transformation mapping to calculate the total trip distance 141492 attempts to get an aggregate based on the Segment Fact and Travel Date Dimension. Starting with the segment fact table 141411, the DST pulls all the columns necessary for this transformation 141413 limited to travel dates, and then DST uses only the columns required for this transformation 141414. Then the DST looks up the fact tables 141415, and looks up the distance and aggregates them 141417. Next the DST updates the resulting data(e.g., removing duplicates, and/or the like) 141419, which results in a Seats_Fact_TripDistance table 141421 (e.g., showing a total trip distance.) Also, the DST looks up the fact tables 141416, and calculates the RPMs and ASMs 141418. Next the DST updates the resulting data (e.g., removing duplicates, and/or the like) 141420, which results in a Segment_Fact_RPMsASMs table 141421 (e.g., showing a total distance calculated, ASMs, and RPMs.)

Transformation Mapping to Load the Data into the Demand Database

The transformation mapping to load the data into the Demand Database 141491 needs look up transformations 141430 (e.g., Commerce Database dimensions similar to those that may be found in FIG. 8) to determine the keys for the segment fact. The transformation mapping to load the data into the Demand Database 141491 attempts to get an aggregate based on the Offer table 141431 from a Commerce Database (e.g., Cops) and an Order_Trip_Leg table 141431b (e.g., segments for each flight). Starting with the Offer table 141431, the DST pulls all the columns necessary for this transformation 141432 limited to trip legs, and then DST uses only the columns required for this transformation 141433. Then the DST may make a procedure call 141431 to an external stored procedure that goes to the Commerce Database and returns information that may be used to calculate the segment distance. Also, the DST looks up the dimension tables 141435, and looks up the market share for an origin airport 141435. Also, the DST looks up the dimension tables 141436, and looks up the market share for a destination city 141436. Also, the DST looks up the dimension tables 141437, and looks up cancelled or voided tickets 141437. Next, the DST combines the results from the previous look ups 141435–141437, procedures 141434, and a sequence generator 141438, and the location of those results will be stored there 141439. The sequence generator 141438 gives a new incremented key for all results. Next, the DST looks up the dimension tables 141440, and looks up the airport market share 141440. And, the DST looks up the dimension tables 141440b, and looks up the city market share 141440b. The results 141439, 141440, 141440b, are combined, and the location of those results will be stored 141441. Next, the results 141441 will be filtered 141442 to remove unwanted data and/or demand (e.g., internal facilitator sales, accounting concerns, and/or the like). Next the DST updates the resulting data (e.g., removing duplicates, and/or the like) 141443, which results in a Segment_Fact_ALL table 141421 (e.g., finishing the creation and/or updating of the Demand Database.)

Alternative Demand Survey Facility Embodiments

Figure 15:
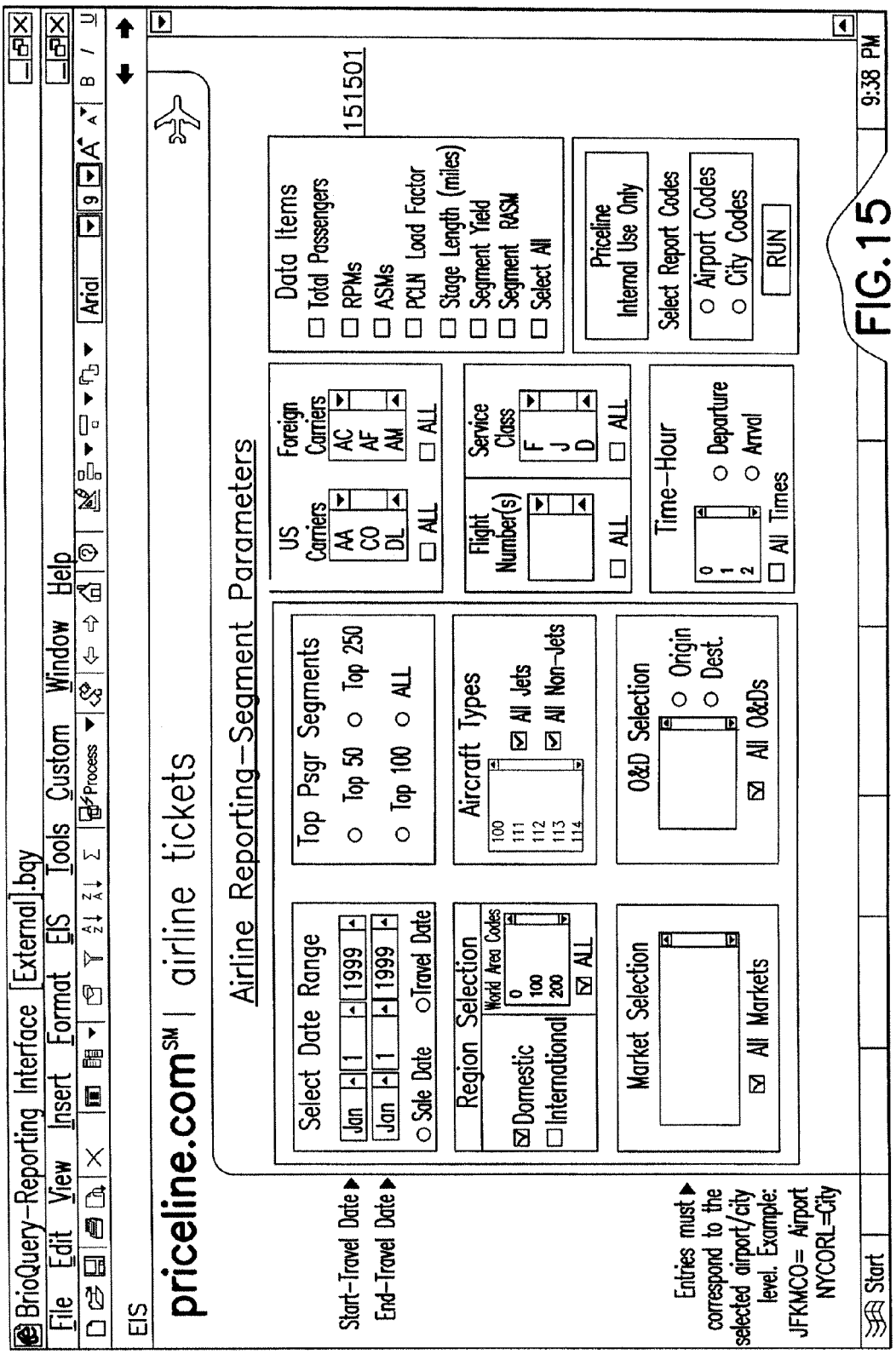
FIG. 15 illustrates an alternative example embodiment of a DSF with expanded facilities.

FIG. 15 illustrates a non-limiting, alternative example of a DSF for in-house, segment parameter surveying with expanded facilities 151501.

FIG. 16 illustrates a non-limiting, alternative example of a DSF for in-house, O&D parameter surveying with expanded facilities 161601. Also, FIG. 16 shows a Demand Cache Range text box 161602 allowing a user to set a time for non-executed CPOs to be cached.

Figure 17:
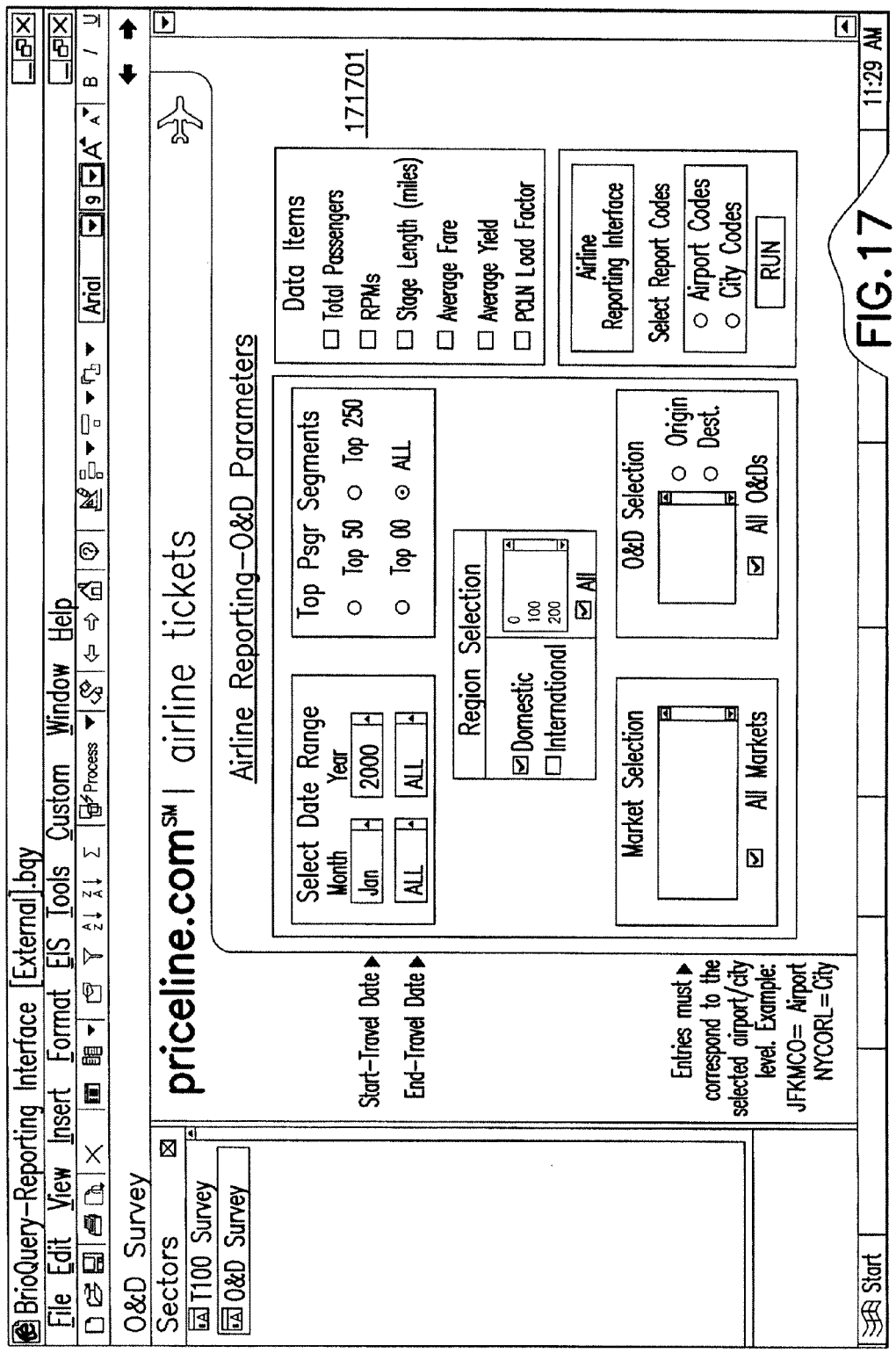
FIG. 17 illustrates an alternative example embodiment of a DSF.

FIG. 17 illustrates a non-limiting, alternative example of a DSF for segment, O&D parameter surveying 171701.

Demand Report and Affectation System

Figure 18:
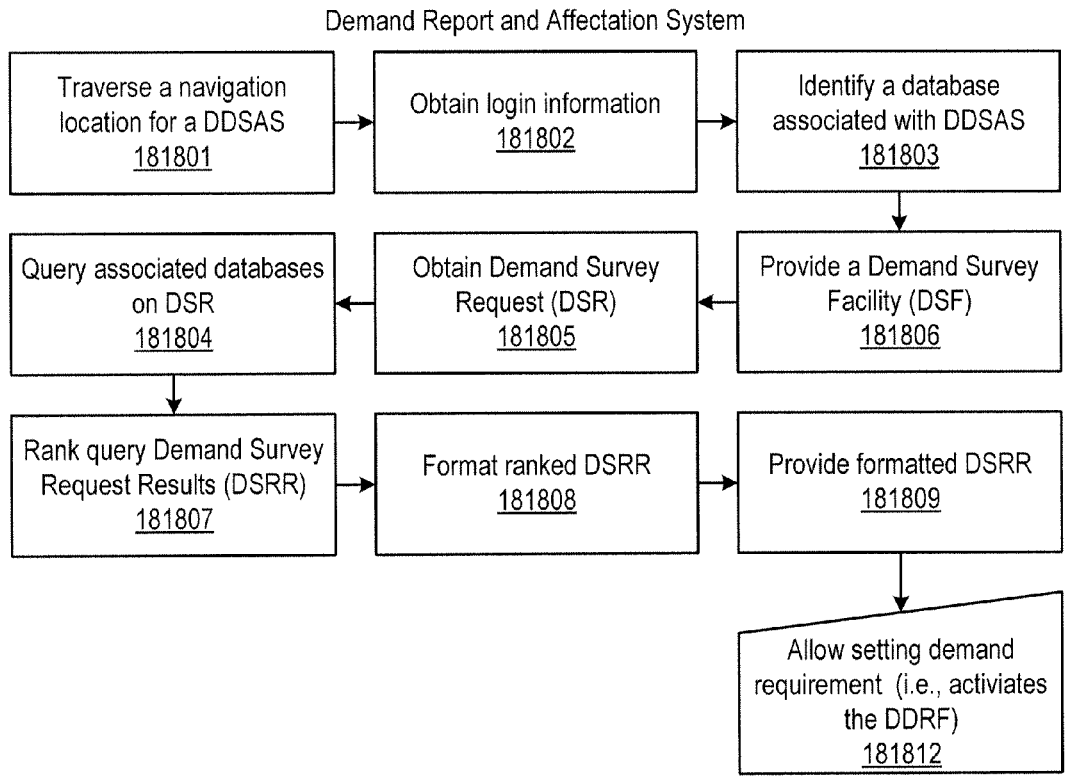
FIG. 18 is a flowchart illustrating one embodiment of a demand reporting and affectation system.

FIG. 18 illustrates a non-limiting example embodiment of a Demand Reporting and Affectation System by way of a flow diagram. Initially, an Accesser traverses a navigation location for a DDSAS 181801 to obtain any required login information 181802. Upon login, the DDSAS identifies an associated database 181803 (for example, a Demand Database may be identified based on login information). A DSF is provided to the Accesser 81806 wherein the Accesser specifies a DSR 181805. The associated databases are queried based on the DSR 181804. The QGT obtains Demand Survey Request Results (DSRR) and ranks them 181807, formats them 181808, and then provides the formatted DSRR to the Accesser 181809 with the option for setting a demand requirement by activating a Desired Demand Request Facility (DDRF) 181812. The DDRF allows one to set demand levels by affecting strike prices, i.e., prices at which CPOs will be accepted by Providers.

Demand Affectation

Figure 19:
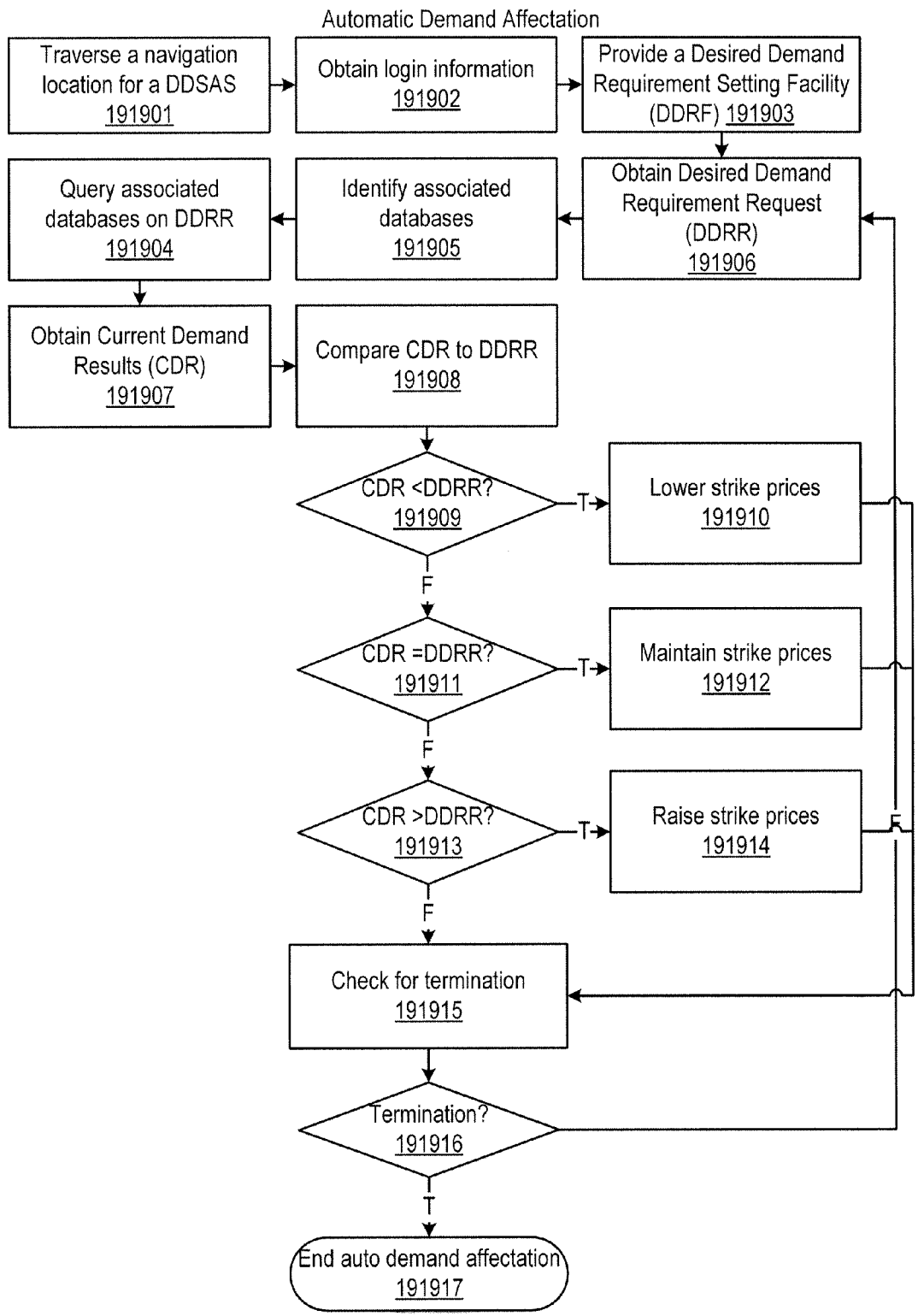
FIG. 19 is a flowchart illustrating one embodiment of a demand affectation system.

FIG. 19 illustrates a non-limiting example embodiment of an Automatic Demand Affectation system by way of a flow diagram. Initially, an Accesser traverses a navigation location for a DDSAS 191901 to obtain any required login information 191902. Upon login, the DDSAS provides a DDRF 191903. Similarly to DSR construction in a DSF, a DDRF obtains a Desired Demand Requirement Request (DDRR) specifying levels of demand that are desired 191906. Upon obtaining a DDRR 191906, the DDSAS identifies associated databases 191905, and queries the associated databases based on the DDRR 191904. The QGT then obtains the Current Demand Results (CDR) as has already been discussed with regard to obtaining DSRR 191907. Upon obtaining CDR, the CDRs are compared to the DDRR 191908. If the CDR is less than the DDRR (in other words, current demand is less than desired demand) 191909, then the strike prices for affected provisions are lowered 191910. If the CDR is equal to the DDRR (current demand is equals desired demand) 191911, then the strike prices for affected provisions are maintained 191912. If the CDR is greater than the DDRR (current demand is greater than desired demand) 191913, then the strike prices for affected provisions are raised 191914. The DDSAS will check for Automatic Demand Affectation termination from a passed parameter, or a user request for termination 191915. If no request for termination exists, the Automatic Demand Affectation system will once again obtain a DDRR 191906 either through a DDRF or through a settings file modified by a DDRF. By maintaining the last DDRF in a file or preference setting, Accesser interaction may be asynchronous in nature with regard to the Automat Demand Affectation system, and subsequent iterations to affect demand may continue to occur outside the presence of an Accesser automatically. Similarly, an Accesser may employ a DDRF to asynchronously set a termination flag to end affectation of strike prices and/or demand, and automatic cycling and affectation of demand will terminate upon the next iteration and check for termination from the settings file 191915, 191916, 191917.

Figure 20:
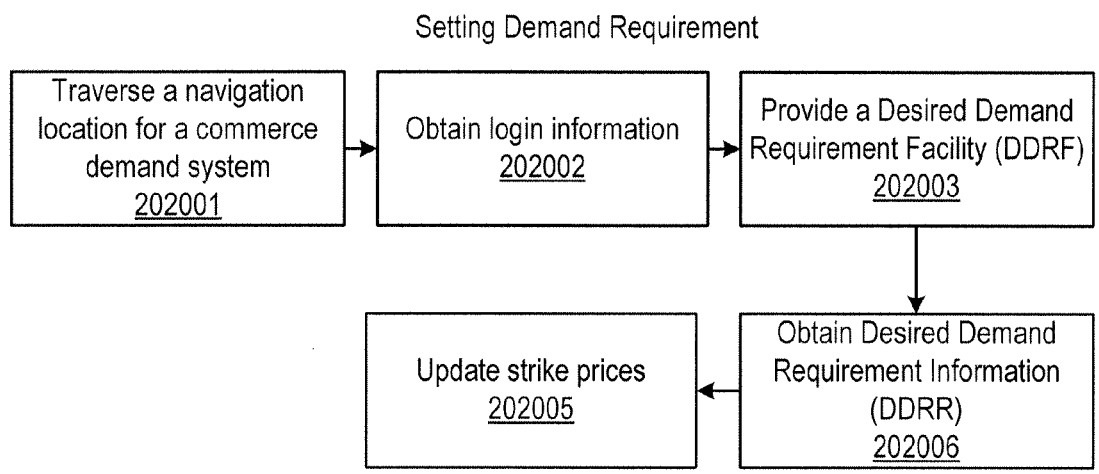
FIG. 20 is a flowchart illustrating one embodiment of a setting a desired demand.

FIG. 20 illustrates a non-limiting example embodiment of setting a desired demand requirement by way of a flow diagram. Initially, an Accesser traverses a navigation location for a DDSAS 202001 to obtain any required login information 202002. Upon login, the DDSAS provides a DDRF 202003. Similarly to DSR construction in a DSF, a DDRF obtains a Desired Demand Requirement Request (DDRR) specifying levels of demand that are desired 202006. Upon obtaining a DDRR 202006, the DDSAS will update strike prices in a Commerce Database to reflect the new demand requirements and all subsequent CPOs will be affected.

Figure 21:
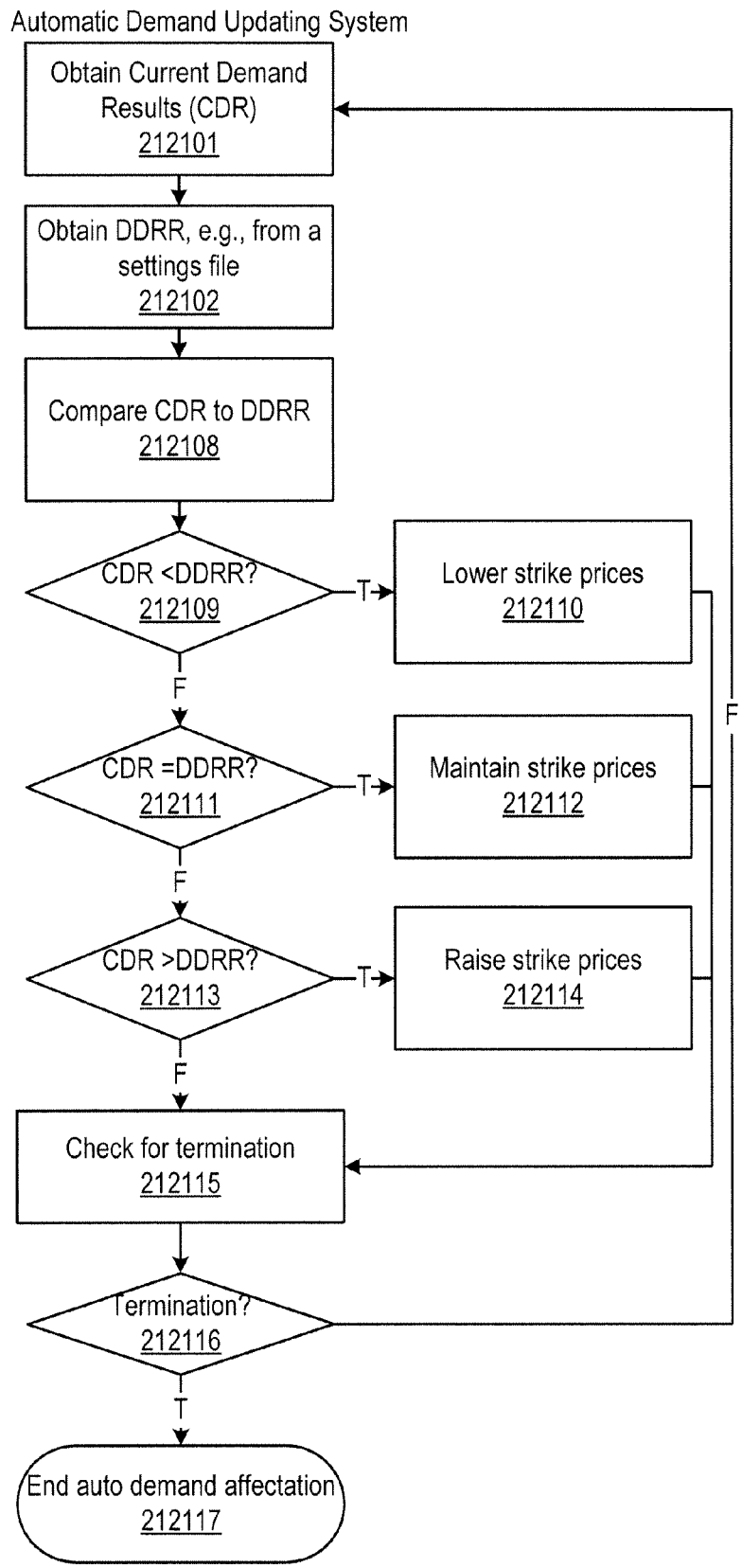
FIG. 21 is a flowchart illustrating one embodiment of an automatic demand updating system.

FIG. 21 illustrates a non-limiting example embodiment of an Automatic Demand Updating system by way of a flow diagram. Initially, the QGT then obtains the CDR 212101.

Upon obtaining CDR, the DDRR is obtained 212102. The DDRR may be saved in a database, or preferences file as was last asynchronously saved through a DDRF. Then, CDRs are compared to the DDRR 212108. If the CDR is less than the DDRR (current demand is less than desired demand) 212109, then the strike prices for affected provisions are lowered 212110. If the CDR is equal to the DDRR (current demand is equals desired demand) 212111, then the strike prices for affected provisions are maintained 212112. If the CDR is greater than the DDRR (current demand is greater than desired demand) 212113, then the strike prices for affected provisions are raised 212114. The DDSAS will check for Automatic Demand Updating termination a settings file 212115. An Accesser may at any time change a setting file specifying that Automatic Demand Updating should be terminated, or alternatively, that it be executed only at specified periodic intervals. If no flag for termination exists, the Automatic Demand Updating system will once again obtain CDR 212101. Similarly, an Accesser may employ a DDRF to asynchronously set a termination flag to end affectation of strike prices and/or demand, and automatic cycling and affectation of demand will terminate upon the next iteration and check for termination from the settings file 212115, 212116, 212117.

Demand Survey Reports

Demand Survey Reports provide a detailed overview of demand booked in a summary format based on a user's DSR. The basic structure of a report will vary based on a user's DSR (for example, whether the report shows airport markets versus city markets depends upon a user's selections). However, an example of a basic report structure follows:

| Month Year | Dom Intl Flight Type | Airport Market | Orig Airport Code | Dest Airport Code | PAX | RPMs | Miles | Facilitator Load Factor | ASMs | Avg Fare |
|---|---|---|---|---|---|---|---|---|---|---|
| June 2000 | D | SFONYC | SFO | NYC | 9999 | 99999 | 9999 | 9999 | 9999 | 99999 |

In the above example Demand survey Report, the user requested a survey report for June of 2000, for domestic flights for airport markets showing origins and destinations; in this case the market was from San Fransicso's airport to NYC's airport. The user also made Data Items selections in the Data Items Selection Facility to see PAX, RPMs, Miles, Facilitator Load Factor, ASMs, and Average Fare as discussed in 7713 of FIG. 7.

FIG. 22 illustrates a non-limiting example embodiment of a Demand Survey Report exported in HTML format for February 2000 showing demand (Facilitator Load factor results) for the top 50 airport origins and destination markets for non Jet aircraft with computed Data Items of PAX, RPMs, Miles, and the top 50 market rankings 222201.

FIG. 23 illustrates a non-limiting example embodiment of a Demand Survey Report exported in Microsoft Excel format for February 2000 showing demand (Facilitator Load factor results) for the top 50 airport origins and destination markets for non Jet aircraft with computed Data Items of PAX, RPMs, Miles, and the top 50 market rankings 232301.

FIG. 24 illustrates A non-limiting example embodiment of a Demand Survey Report exported in Brio Technology, Inc.'s Brio format for February 2000 showing (Facilitator Load factor results) for the top 50 airport origins and destination markets for non Jet aircraft with computed Data Items of PAX, RPMs, Miles, and the top 50 market rankings 242401.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed is:

1. A method of using a computer system to generate reports, comprising:

populating a database with collected commerce information, said collected commerce information including conditional purchase offers submitted by buyers, said conditional purchase offers including,
buyer-specified offer prices for goods or services, for use as a basis for determining levels of demand for the goods or services;

receiving a request specifying criteria for selecting collected commerce information, said criteria generated from requestor selections that includes targeted demand levels for the goods or services;

selecting demand information from collected commerce information based on the requestor selections;

calculating suggested strike prices at targeted demand levels based on the requested targeted demand levels, wherein the strike price is a desired price at which a conditional purchase offer will be accepted;

generating a report of the demand information for the goods or services based on the requestor selections, wherein the demand information includes current demand levels for the goods or services and suggested strike prices; and transmitting the report to the requestor.

2. The method of claim 1, wherein the computer system is accessible at a traversed navigation location and provides facilities tailored for a commerce system.

3. The method of claim 2, wherein the computer system is tailored for air travel commerce.

4. The method of claim 2, wherein the computer system is tailored for hotel commerce.

5. The method of claim 1, wherein the database is from an associated commerce system.

6. The method of claim 5, wherein the database association is based on login information.

7. The method of claim 5, wherein the database association is preset based on a tailored commerce system.

8. The method of claim 5, wherein the database association is limited to databases specific to a provider.

9. The method of claim 5, wherein the associations are based on selection results made in a database selection facility.

10. The method of claim 1, wherein selecting demand information is limited to a specified vendor.

11. The method of claim 1, wherein selecting demand information is limited to cached rejected conditional purchase offers.

12. The method of claim 1, wherein selecting demand information is limited to unaccepted unexpired conditional purchase offers.

13. The method of claim 1, wherein selecting demand information is limited to pending conditional purchase offers.

14. The method of claim 1, wherein selecting demand information includes accepted conditional purchase offers.

15. The method of claim 1, wherein selecting demand information includes historic demand information.

16. A medium readable by a processor storing instructions executable by the processor used to generate reports, comprising instructions to:
populate a database with collected commerce information, said collected commerce information including conditional purchase offers submitted by buyers, said conditional purchase offers including, buyer-specified offer prices for goods or services, for use as a basis for to determine levels of demand for the goods or services;
receive a request specifying criteria for selecting collected commerce information, said criteria generated from requestor selections and including targeted demand levels for the goods or services;
select demand information from collected commerce information based on the requester selections;
calculate suggested strike prices at targeted demand levels based on the requested targeted demand levels, wherein the strike price is a desired price at which a conditional purchase offer will be accepted;
generate a report of the demand information for the goods or services based on the requestor selections, wherein the demand information includes current demand levels for the goods or services and suggested strike prices; and
transmit the report to the requestor.

17. The medium of claim 16, wherein the computer system is accessible at a traversed navigation location and provides facilities tailored for a commerce system.

18. The medium of claim 17, wherein the computer system is tailored for air travel commerce.

19. The medium of claim 17, wherein the computer system is tailored for hotel commerce.

20. The medium of claim 16, wherein the database is from an associated commerce system.

21. The medium of claim 20, wherein the database association is based on login information.

22. The medium of claim 21, wherein the database association is preset based on a tailored commerce system.

23. The medium of claim 21, wherein the database association is limited to databases specific to a provider.

24. The medium of claim 21, wherein the associations are based on selection results made in a database selection facility.

25. The medium of claim 16, wherein selecting demand information is limited to a specified vendor.

26. The medium of claim 16, wherein selecting demand information is limited to cached rejected conditional purchase offers.

27. The medium of claim 16, wherein selecting demand information is limited to unaccepted unexpired conditional purchase offers.

28. The medium of claim 16, wherein selecting demand information is limited to pending conditional purchase offers.

29. The medium of claim 16, wherein selecting demand information includes accepted conditional purchase offers.

30. The medium of claim 16, wherein selecting demand information includes historic demand information.

31. An apparatus used to generate reports, comprising:
a processor configured to issue a plurality of processing instructions; and
a memory, disposed in communication with the processor, storing instructions executable by the processor, comprising instructions to:
populate a database with collected commerce information, said collected commerce information including conditional purchase offers submitted by buyers, said conditional purchase offers including, buyer-specified offer prices for goods or services, which may be used as a basis for to determine levels of demand for the goods or services;
receive a request specifying criteria for selecting collected commerce information, said criteria generated from requestor selections and includes targeted demand levels for the goods or services;
select demand information from collected commerce information based on the requestor selections;
calculate suggested strike prices at targeted demand levels based on the requested targeted demand levels, wherein the strike price is a desired price at which a conditional purchase offer will be accepted;
generate a report of the demand information for the goods or services based on the requestor selections, wherein the demand information includes current demand levels for the goods or services and suggested strike prices; and
transmit the report to the requestor.

32. The apparatus of claim 31, wherein the computer system is accessible at a traversed navigation location and provides facilities tailored for a commerce system.

33. The apparatus of claim 32, wherein the computer system is tailored for air travel commerce.

34. The apparatus of claim 32, wherein the computer system is tailored for hotel commerce.

35. The apparatus of claim 31, wherein the database is from an associated commerce system.

36. The apparatus of claim 35, wherein the database association is based on login information.

37. The apparatus of claim 35, wherein the database association is preset based on a tailored commerce system.

38. The apparatus of claim 35, wherein the database association is limited to databases specific to a provider.

39. The apparatus of claim 35, wherein the associations are based on selection results made in a database selection facility.

40. The apparatus of claim 31, wherein selecting demand information is limited to a specified vendor.

41. The apparatus of claim 31, wherein selecting demand information is limited to cached rejected conditional purchase offers.

42. The apparatus of claim 31, wherein selecting demand information is limited to unaccepted unexpired conditional purchase offers.

43. The apparatus of claim 31, wherein selecting demand information is limited to pending conditional purchase offers.

44. The apparatus of claim 31, wherein selecting demand information includes accepted conditional purchase offers.

45. The apparatus of claim 31, wherein selecting demand information includes historic demand information.

46. A system using a computer to generate reports, comprising:
  means to traverse a navigation location for a commerce demand system;
  means to obtain login information;
  means to provide a desired demand requirement facility;
  means to obtain a desired demand requirement request in the desired demand requirement facility;
  means to identify at least one associated database, said associated database including conditional purchase offers submitted by buyers;
  means to query the at least one associated database based on a demand survey request;
  means to obtain current demand results;
  means to compare current demand results to desired demand requirement request;
  means to lower strike prices if the current demand results is less than the desired demand requirement request;
  means to maintain strike prices unmodified if the current demand results is the same as the desired demand requirement request;
  means to raise strike prices if the current demand results is greater than the desired demand requirement request; and
  means to generate a report of a change to the strike price.

47. A system using a computer to generate reports, comprising:
  means to obtain current demand results;
  means to query at least one associated database based on a demand survey request, wherein the at least one associated database includes conditional purchase offers submitted by buyers;
  means to compare current demand results to a desired demand requirement request;
  means to lower strike prices if the current demand results is less than the desired demand requirement request;
  means to raise strike prices if the current demand results is greater than the desired demand requirement; and
  means to generate a report of a change to the strike price.

48. A method using a computer system to generate reports, comprising:
  populating a database with collected information for determining levels of demand, said collected information including conditional purchase offers submitted by buyers;
  receiving a request specifying criteria for selecting desired portions of collected information, said criteria generated from requestor selections that includes targeted demand levels;
  selecting desired portions of collected information based on the requester selections;
  calculating suggested strike prices at the targeted demand levels based on the requested targeted demand levels, wherein the strike price is a desired price at which a conditional purchase offer will be accepted;
  generating a report of results of desired portions of collected information from the information selected based on the requestor selections, wherein the information includes current demand levels and suggested strike prices; and
  transmitting the report to the requestor.

49. The method of claim 48, wherein the collected information is related to commerce.

50. The method of claim 48, wherein the computer system is accessible at a traversed navigation location and provides facilities tailored for a commerce system.

51. The method of claim 50, wherein the computer system is tailored for air travel commerce.

52. The method of claim 50, wherein the computer system is tailored for hotel commerce.

53. The method of claim 48, wherein the database is from an associated commerce system.

54. The method of claim 53, wherein the database association is based on login information.

55. The method of claim 53, wherein the database association is preset based on a tailored commerce system.

56. The method of claim 53, wherein the database association is limited to databases specific to a provider.

57. The method of claim 53, wherein the associations are based on selection results made in a database selection facility.

58. The method of claim 48, wherein selecting collected information is limited to a specified vendor.

59. The method of claim 48, wherein selecting collected information is limited to cached rejected conditional purchase offers.

60. The method of claim 48, wherein selecting collected information is limited to unaccepted unexpired conditional purchase offers.

61. The method of claim 48, wherein selecting collected information is limited to pending conditional purchase offers.

62. The method of claim 48, wherein selecting collected information includes accepted conditional purchase offers.

63. The method of claim 48, wherein selecting collected information includes historic demand information.

64. A method using a computer to generate reports, comprising:
  traversing a navigation location for a commerce demand system;
  obtaining login information;
  providing a desired demand requirement facility;
  obtaining a desired demand requirement request in the desired demand requirement facility;
  identifying at least one associated database, said associated database including conditional purchase offers submitted by buyers;
  querying the at least one associated database based on a demand survey request;
  obtaining current demand results;
  comparing current demand results to desired demand requirement request;
  lowering strike prices if the current demand results is less than the desired demand requirement request;
  maintaining strike prices unmodified if the current demand results is the same as the desired demand requirement request;

raising strike prices if the current demand results is greater than the desired demand requirement request; and generating a report of a change to the strike price.

65. A method using a computer to generate reports, comprising:

obtaining current demand results;

querying at least one associated database based on a demand survey request, wherein the at least one associated database includes conditional purchase offers submitted by buyers;

comparing current demand results to a-desired demand requirement request;

lowering strike prices if the current demand results is less than the desired demand requirement request;

raising strike prices if the current demand results is greater than the desired demand requirement; and generating a report of a change to the strike price.

66. An apparatus to generate reports, comprising:

a processor configured to issue a plurality of processing instructions; and a memory, disposed in communication with the processor, storing instructions executable by the processor, comprising instructions to:

traverse a navigation location for a commerce demand system;

obtain login information;

provide a desired demand requirement facility;

obtain a desired demand requirement request in the desired demand requirement facility;

identify at least one associated database, said associated database including conditional purchase offers submitted by buyers;

query the at least one associated database based on a demand survey request;

obtain current demand results;

compare current demand results to desired demand requirement request;

lower strike prices if the current demand results is less than the desired demand requirement request;

maintain strike prices unmodified if the current demand results is the same as the desired demand requirement request;

raise strike prices if the current demand results is greater than the desired demand requirement request; and generate a report of a change to the strike price.

67. An apparatus to generate reports, comprising:

a processor configured to issue a plurality of processing instructions; and a memory, disposed in communication with the processor, storing instructions executable by the processor, comprising instructions to:

obtain current demand results;

query at least one associated database based on a demand survey request, wherein the at least one associated database includes conditional purchase offers submitted by buyers;

compare current demand results to a-desired demand requirement request;

lower strike prices if the current demand results is less than the desired demand requirement request;

raise strike prices if the current demand results is greater than the desired demand requirement; and generate a report of a change to the strike price.

68. A medium readable by a processor storing instructions executable by the processor to generate reports, comprising instructions to:

traverse a navigation location for a commerce demand system;

obtain login information;

provide a desired demand requirement facility;

obtain a desired demand requirement request in the desired demand requirement facility;

identify at least one associated database, said associated database including conditional purchase offers submitted by buyers;

query the at least one associated database based on a demand survey request;

obtain current demand results;

compare current demand results to desired demand requirement request;

lower strike prices if the current demand results is less than the desired demand requirement request;

maintain strike prices unmodified if the current demand results is the same as the desired demand requirement request;

raise strike prices if the current demand results is greater than the desired demand requirement request; and generate a report of a change to the strike price.

69. A medium readable by a processor storing instructions executable by the processor to generate reports, comprising instructions to:

obtain current demand results;

query at least one associated database based on a demand survey request, wherein the at least one associated database includes conditional purchase offers submitted by buyers;

compare current demand results to a-desired demand requirement request;

lower strike prices if the current demand results is less than the desired demand requirement request;

raise strike prices if the current demand results is greater than the desired demand requirement; and generate a report of a change to the strike price.

* * * * *

UNITED STATES PATENT AND TRADEMARK OFFICE
CERTIFICATE OF CORRECTION

| | | |
|---|---|---|
| PATENT NO. | : 7,203,660 B1 | Page 1 of 1 |
| APPLICATION NO. | : 09/829488 | |
| DATED | : April 10, 2007 | |
| INVENTOR(S) | : Michael Majeed | |

It is certified that error appears in the above-identified patent and that said Letters Patent is hereby corrected as shown below:

On the title page:

Item (54) and Col. 1, line 1, delete "APPARATUS, SYSTEM, AND METHOD" and insert -- APPARATUS, METHOD AND SYSTEM --.

In the specification:

Col. 22, line 23, after Figure 8, delete "the" and insert -- The --.

Col. 23, line 26, delete "represent. Topics" and insert -- represent topics --.

In the claims:

Col. 45, line 42, delete "requester" and insert -- requestor --.

Col. 45, line 64, delete "claim 21" and insert -- claim 20 --.

Col. 45, line 66, delete "claim 21" and insert -- claim 20 --.

Col. 46, line 1, delete "claim 21" and insert -- claim 20 --.

Col. 47, line 64, delete "requester" and insert -- requestor --.

Signed and Sealed this

Thirtieth Day of June, 2009

JOHN DOLL
*Acting Director of the United States Patent and Trademark Office*